United States Patent
Morita et al.

(10) Patent No.: US 6,804,666 B2
(45) Date of Patent: Oct. 12, 2004

(54) INFORMATION PROCESSOR, PROCESSING METHOD THEREFOR, AND PROGRAM STORAGE MEDIUM

(75) Inventors: Toshihiro Morita, Kanagawa (JP); Mitsuyuki Hatanaka, Kanagawa (JP); Kiyonobu Kojima, Tokyo (JP); Ippei Tambata, Kanagawa (JP); Shin Shiroma, Tokyo (JP)

(73) Assignee: Sony Corporation, Tokyo (JP)

( * ) Notice: Subject to any disclaimer, the term of this patent is extended or adjusted under 35 U.S.C. 154(b) by 341 days.

(21) Appl. No.: 09/913,622

(22) PCT Filed: Dec. 15, 2000

(86) PCT No.: PCT/JP00/08915
§ 371 (c)(1),
(2), (4) Date: Jan. 25, 2002

(87) PCT Pub. No.: WO01/45084
PCT Pub. Date: Jun. 21, 2001

(65) Prior Publication Data
US 2002/0161762 A1 Oct. 31, 2002

(30) Foreign Application Priority Data
Dec. 17, 1999 (JP) .......................................... 11-358408

(51) Int. Cl.[7] .............................................. G06F 17/30
(52) U.S. Cl. ....................... 707/3; 707/2; 707/4; 707/5; 707/100; 707/104.1
(58) Field of Search ............................. 707/2, 3, 4, 5, 707/100, 104.1, 101, 102, 103 R, 1

(56) References Cited
U.S. PATENT DOCUMENTS 5,475,390 A * 12/1995 Morikawa et al. .......... 341/122
5,717,153 A * 2/1998 Morikawa et al. ........... 84/603
5,903,871 A * 5/1999 Terui et al. .................. 704/500
5,966,126 A * 10/1999 Szabo ......................... 345/762
6,351,736 B1 * 2/2002 Weisberg et al. ............. 705/14

FOREIGN PATENT DOCUMENTS

| EP | 0 467 208 B1 | 9/1995 | |
|---|---|---|---|
| EP | 0805455 A2 * | 5/1997 | ............ G11C/7/00 |
| JP | 4-271396 | 9/1992 | |
| JP | 11-306057 | 11/1999 | |
| WO | WO 99/54870 | 10/1999 | |

OTHER PUBLICATIONS

"Kogata Memory Card de Ongaku Chosakuken wo mamoru" Nikkei Electronics, vol. 739, Mar. 22, 1999, pp 49–53.

"Ongaku Haishin matta nashi," Nikkei Electronics, vol. 738, Mar. 8, 1999 pp 87–111.

Sakai et al., "A Grammatical Method for Transformation of Document Structure in SGML," Technical research report of Information Processing Society of Japan (IPSJ), IPSJ sig Notes, vol. 94, No. 37, 94–FI–33–5, pp 23–28 issued on May 18, 1994.

* cited by examiner

Primary Examiner—Frantz Coby
(74) Attorney, Agent, or Firm—Frommer Lawrence & Haug LLP; William S. Frommer; Samuel S. Lee

(57) ABSTRACT

An information processor for recoding at least two different types of content-related data. The first recording means records a predetermined number of types of data related to a first content as a first main data group, and records a predetermined number of types of data related to a second content as a second main data group. The second recording means records data of types related to the first content but not in the first main data group as a sub data group, and records data of types related to the second content but not in the second main data group the sub data group.

9 Claims, 54 Drawing Sheets

| CONTENTS ID | CHECKOUT POSSIBLE? | NUMBER OF MAXIMUM POSSIBLE CHECKOUTS | NUMBER OF POSSIBLE CHECKOUTS | MOVE POSSIBLE? | COPY POSSIBLE? | NUMBER OF POSSIBLE COPIES | USAGE PERIOD | | CONTENT-USABLE DISTRICT | SIGNATURE |
|---|---|---|---|---|---|---|---|---|---|---|
| | | | | | | | START DATE | END DATE | | |
| 123XDES3 | YES | 3 | 3 | NO | NO | — | 99.11.1 | 99.12.3 | JAPAN | XXYYSBYE |

| PACKAGE ID | PACKAGE TYPE | PACKAGE SOURCE | PACKAGE NAME | ARTIST NAME | GENRE NAME | PLAY TIME | REGISTRATION DATA | CORRESPONDING IMAGE FILE |
|---|---|---|---|---|---|---|---|---|
| PPP753 | ORIGINAL | CD | FIRST | A. TARO | POP | 54:23:00 | 99.11.1 | CoverArt1.JPG |

ID FOR CONTENT BELONGING TO PACKAGE

| | | | | | | | | |
|---|---|---|---|---|---|---|---|---|
| 123×DES3 | 123×DES4 | 123×DES5 | 123×DES6 | 123×DES7 | 123×DES8 | 123×DES9 | 123×DES0 | 123×DET1 |

FIG.7B

| CONTENT ID | ORIGINAL PACKAGE | CONTENT NAME | NUMBER OF POSSIBLE CHECKOUTS | NUMBER OF MAXIMUM POSSIBLE CHECKOUTS | PLAY TIME | CORRESPONDING IMAGE FILE |
|---|---|---|---|---|---|---|
| 123×DES3 | PPP753 | MINAMI-NO-SAKABA | 3 | 3 | 3:05 | CoverArt2.jpg |

FIG.7C

| CONTENT ID | DATA TYPE | DATA |
|---|---|---|
| 123×DES3 | CYBER CODE | XXXYYY |
| 123×DES3 | ISRC CODE | ZZZZZZ |
| 123×DES3 | SONGWRITER NAME | ABE |
| 123×DES3 | COMPOSER NAME | KATO |
| 123×DES4 | CYBER CODE | DDDDKK |
| 123×DES4 | ISRC | ZZZZZZ |
| 123×DES4 | REPRODUCTION PERIOD | 99.12.31 |
| 123×DES4 | NUMBER OF REPRODUCTION | 15 |
| 123×DES4 | EQUALIZER INFORMATION | $\alpha\alpha\alpha. \beta\beta\beta. \gamma\gamma\gamma$ |
| ... | ... | ... |

FIG.11

INFORMATION PROCESSOR, PROCESSING METHOD THEREFOR, AND PROGRAM STORAGE MEDIUM

FIELD OF THE INVENTION

The present invention relates to an information processing apparatus and method and a program storage medium, and more particularly, to an information processing apparatus and method, in which sound contents are recorded, and a program storage medium having stored therein a program to be used in the information processing apparatus and method, and under which such a sound information processing is effected.

DESCRIPTION OF THE RELATED ART

The information processing apparatus such as a personal computer can access an EMD (electrical music distribution) server via a predetermined network and receive a content such as musical data from the EMD server.

The EMD server transmits contents such as musical data along with data such as playback time limit or number of times of playback to the personal computer.

However, the type of data about the contents like the musical data such as the playback time limit or number of times of playback supplied along with the musical data is not always constant but vary from one EMD server or content to another.

The personal computer has to change the recording method including a data table correspondingly to the type of data about the supplied data and takes much time for processing the data.

DISCLOSURE OF THE INVENTION

Accordingly, the present invention has an object to overcome the above-mentioned drawbacks of the conventional information processing apparatus such as a personal computer by providing an information processing apparatus and method, capable of processing a variety of data about contents flexibly and quickly to record the various content-related data, and a program storage medium having stored therein an program which is to be used in the information processing apparatus and method to effect such an information processing.

The above object can be attained by providing an information processor including, according to the present invention, a first recording means for relating a predetermined number of types of data about a first content as a first main data group with the first content and recording the data, and a second recording means for relating data of types other than the first main data group about the first content and recording in a sub data group.

In the above information processor, the first recording means relates a predetermined number of types of data about the second content as a second main data group with the second content and records the data, and the second recording means relates data of types other than the second main data group about the second content with the second content and records the data in the sub data group.

The above information processor further includes, according to the present invention, means for judging, when reading data about a content, whether the type of data to be read is that of data recorded in either the main data group or sub data group, and means for searching for data from a plurality of main data groups or sub data groups based on the result of the search made by the data searching means.

Also, the above object can be attained by providing an information processing method including, according to the present invention, a first recording step of relating a predetermined number of types of data about a first content as a first main data group with the first content and recording the data, and a second recording step of relating data of types other than the first main data group about the first content and recording in a sub data group.

In the above information processing method, at the first recording step, a predetermined number of types of data about the second content is related as a second main data group with the second content and recorded, and at the second recording step, data of types other than the second main data group about the second content are related with the second content and recorded in the sub data group.

The above information processing method further includes, according to the present invention, a judging step of judging, when reading data about a content, whether the type of data to be read is that of data recorded in either the main data group or sub data group, and a data searching step of searching for data from a plurality of main data groups or sub data groups based on the result of the search made at the data searching step.

Also the above object can be attained by providing a program storage medium having stored therein a computer-readable program for use in the above information processing apparatus and method, the program including, according to the present invention, a first recording step of relating a predetermined number of types of data about a first content as a first main data group with the first content and recording the data, and a second recording step of relating data of types other than the first main data group about the first content and recording the data in a sub data group.

In the program stored in the above program storage medium, at the first recording step, a predetermined number of types of data about the second content is related as a second main data group with the second content and recorded, and at the second recording step, data of types other than the second main data group about the second content are related with the second content and are recorded in the sub data group.

The program stored in the above program storage medium further includes, according to the present invention, a judging step of judging, when reading data about a content, whether the type of data to be read is that of data recorded in either the main data group or sub data group, and a data searching step of searching for data from a plurality of main data groups or sub data groups based on the result of the search made at the data searching step.

These objects and other objects, features and advantages of the present intention will become more apparent from the following detailed description of the best modes for carrying out the present invention when taken in conjunction with the accompanying drawings.

BRIEF DESCRIPTION OF THE DRAWINGS

FIG. 5 shows an example of the content usage rule;

FIGS. 7A to 7C show an example of the composition of the display data file;

FIG. 11 shows an example of the display for execution of the registration;

FIG. 52 is a flow chart of the operations effected for checkout or check-in;

BEST MODE FOR CARRYING OUT THE INVENTION

In the following description, embodiments in which the present invention is applied to a music data management system will be exemplified with reference to the drawings.

Figure 1:
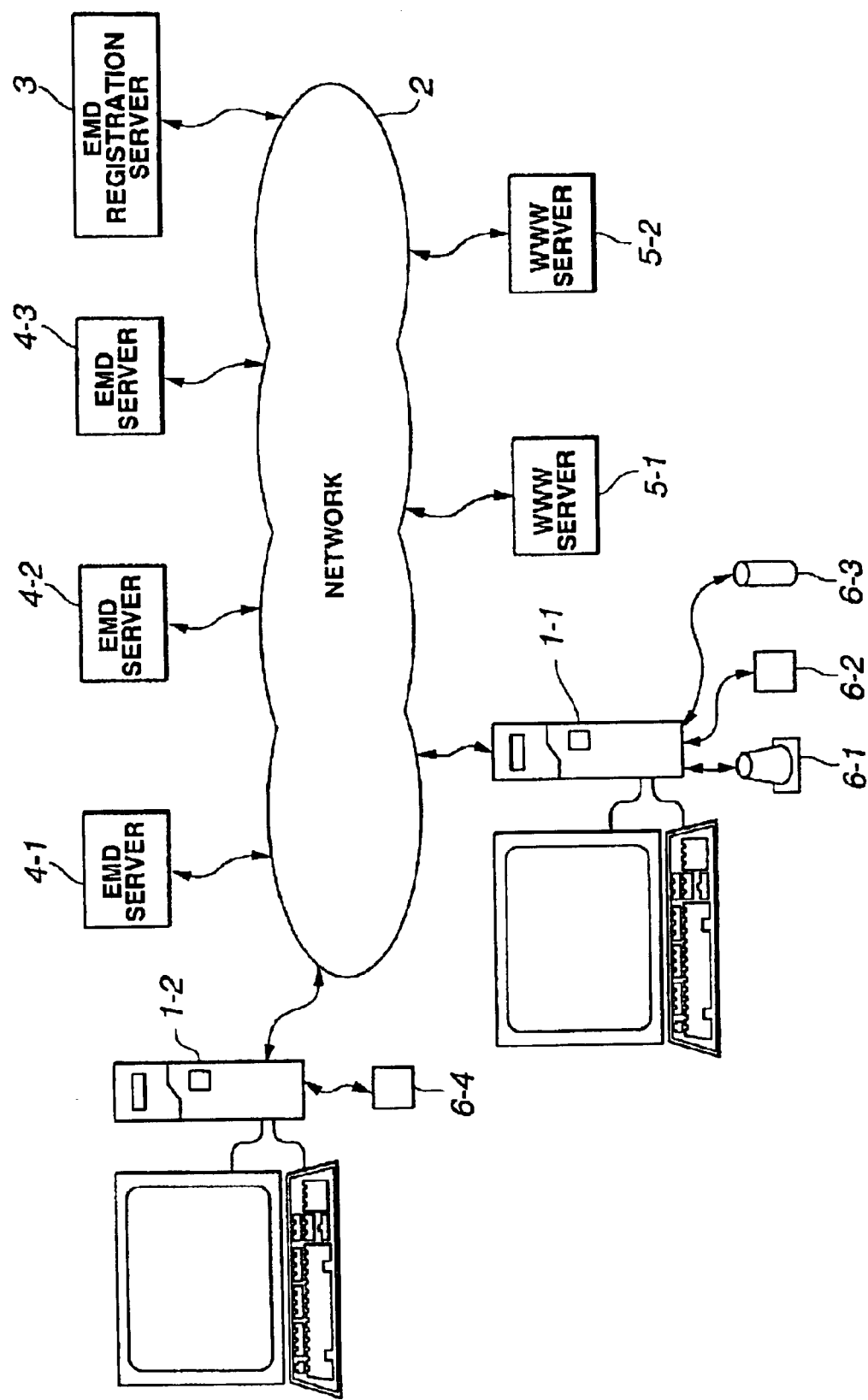
FIG. 1 is a schematic drawing of an embodiment of the music data management system incorporating the present invention.

Referring now to FIG. 1, there is illustrated an embodiment of the music data management system according to the present invention. As shown, the system includes a personal computer 1-1 connected to a network 2 composed of a local area network (LAN), Internet or the like. The personal computer 1-1 receives music data (will be referred to as "content" hereinafter) from EMD (electrical music distribution) servers 4-1 to 4-3 or those read from a CD (compact disc) which will further be described later, converts the music data to a one compressed by a predetermined method (e.g., ATRAC3 (trade mark)), encrypts the data by a method such as DES (Data Encryption Standard), and then records the data.

Correspondingly to the above content recorded as encrypted, the personal computer 1-1 records a usage rule under which the content should be used. The usage rule data concerns for example simultaneous use of the contents corresponding to the usage rule at three portable devices (also called "PD") 6-1 to 6-3, copy to the portable devices 6-1 to 6-3, move to another personal computer, etc. The usage rule data will further be described later.

The personal computer 1-1 stores the content recorded therein as encrypted as well as data related to the content such as music title, number of reproduction, reproduction period or equalizer information or the like into the portable device 6-1 connected thereto, and updates the usage rule data for the content having thus been stored into the portable device 6-1 (which will be referred to as "checkout" hereinafter). Also, the personal computer 1-1 stores the content recorded therein as encrypted as well as data related to the content into the portable device 6-2 connected thereto, and updates the usage rule data for the content having thus been stored into the portable device 6-2. Further, the personal computer 1-1 stores the content recorded therein as encrypted as well as data related to the contents into the portable device 6-3 connected thereto, and updates the usage rule data for the content having been thus stored into the portable device 6-3.

Moreover, the personal computer 1-1 has the portable device 6-1 connected thereto erase the content that the personal computer 1-1 has checked out to the portable device 6-1, and updates the usage rule data for the content having thus been erased (which will be referred to as "check-in" hereinafter). Also, the personal computer 1-1 has the portable device 6-2 connected thereto erase the content that the personal computer 1-1 has checked out to the portable device 6-2, and updates the usage rule data for the content having thus been erased. Further, the personal computer 1-1 has the portable device 6-3 connected thereto erase the content that the personal computer 1-1 has checked out to the portable device 6-3, and updates the usage rule data for the content having thus been erased.

The personal computer 1-1 cannot check in the content that the personal computer 1-1 has checked out to the portable device 6-1. The personal computer 1-1 cannot check in the content that the personal computer 1-1 has checked out to the portable device 6-2. The personal computer 1-1 cannot check in the content that the personal computer 1-1 has checked out to the portable device 6-3.

The system includes a personal computer 1-2 connected to a network 2 composed of a local area network (LAN), Internet or the like. The personal computer 1-2 receives a content from the EMD servers 4-1 to 4-3 or those read from a CD which will further be described later, converts the content to a one compressed by a predetermined method, encrypts the data by a method such as DES, and then records the data.

Correspondingly to the above content recorded as encrypted, the personal computer 1-2 records a usage rule under which the content should be used. The usage rule data concerns for example simultaneous use of the contents corresponding to the usage rule at three portable devices, copy to the portable devices, move to another personal computer, etc. The usage rule data will further be described later.

The personal computer 1-2 stores the content recorded therein as encrypted as well as data related to the content into the portable device 6-4 connected thereto, and updates the usage rule data for the content having thus been stored into the portable device 64, that is, checks out the content. That is, if there is an instruction of checking out of the content, the personal computer 1-2 does not check out the content to the portable device 6-4 when the usage period, the number of reproduction or the like described later is set to the content.

Moreover, the personal computer 1-2 has the portable device 6-4 connected thereto erase the content that the personal computer 1-2 has checked out to the portable device 6-4, and updates the usage rule data for the content having thus been erased.

The personal computer 1-2 cannot check in the content that the personal computer 1-2 has checked out to the portable device 64.

Hereinafter, when there is no need to distinguish between the personal computer 1-1 and the personal computer 1-2, it is merely called the the personal computer 1.

As shown, the music data management system includes an EMD (electrical music distribution) registration server 3. Upon reception of a request content distribution from the personal computer 1 starting acquisition of a content from the EMD servers 4-1 to 4-3, the EMD registration server 3 sends to the personal computer 1 via the network 2 an authenticate key necessary for mutual authentication between the personal computer 1 and EMD servers 4-1 to 4-3, and also a program required for connection to the EMD servers 4-1 to 4-3.

Correspondingly to the request from the personal computer 1, the EMD server 4-1 supplies a content as well as data related to the content such as music title, number of reproduction, reproduction period or equalizer information or the like to the personal computer 1 via the network 2. Also the EMD server 4-2 supplies a content to the personal computer 1 via the network 2 correspondingly to that request. Further the EMD server 4-3 supplies a content to the personal computer 1 via the network 2 correspondingly to the request from the personal computer 1.

The content supplied from the EMD servers 4-1 to 4-3 have been compressed by the same method or different methods, and also encrypted by the same method or different methods.

As shown, the music data management system further includes WWW (worldwide web) servers 5-1 and 5-2. Correspondingly to the request from the personal computer 1, the WWW server 5-1 supplies to the personal computer 1 via the network 2 data on a CD from which a content has been read (e.g., name of album recorded in the CD, distributor or supplier of the CD and the like) and data (e.g., music title (or content name), composer's name (or artist name) and the like) corresponding to the content having been read from the CD. Also correspondingly to the request from the personal computer 1, the WWW server 5-2 supplies to the personal computer 1 via the network 2 data on a CD from which a content have been read and data corresponding to the content having been read from the CD.

The portable device 6-1 stores the content supplied from the personal computer 1 (namely, "checked-out content")as well as data related to the content such as music title, number of reproduction, reproduction period or equalizer information or the like. The portable device 6-1 plays back the stored content based on the data related to the content and output them to a headphone or the like (not shown).

For example, when the content is to be played back more than the number of reproduction stored as the data related to the content, the portable device 6-1 terminates the reproduction of the content. When the content is to be played back after the reproduction period stored as the data related to the content, the portable device 6-1 terminates the reproduction of the content. The portable device 6-1 equalizes the sound based on the equalizer information stored as the data related to the content for output.

The user can disconnect from the personal computer 1 the portable device 6-1 having the content stored therein, carry it with him or her, and play back the stored content. Thus the user can listen to music pieces or the like corresponding to the content using an electrical acoustic converter such as a headphone or the like.

Also, the portable device 6-2 stores the content supplied from the personal computer 1 as well as data related to the content. The portable device 6-2 plays back the stored content based on the data related to the content and output them to a headphone or the like (not shown). The user can disconnect from the personal computer 1 the portable device 6-2 having the content stored therein, carry it with him, and play back the stored content. Thus the user can listen to music pieces or the like corresponding to the content using a headphone or the like.

Also, the portable device 6-3 stores the content supplied from the personal computer 1 as well as data related to the content. The portable device 6-3 plays back the stored content based on the data related to the content and output them to a headphone or the like (not shown). The user can disconnect from the personal computer 1 the portable device 6-3 having the content stored therein, carry it with him, and play back the stored content. Thus the user can listen to music pieces or the like corresponding to the content using a headphone or the like.

Also, the portable device 6-4 stores the content supplied from the personal computer 1, or the content whose usage period or number of reproduction described later is not set, as well as data related to the content. The portable device 64 plays back the stored content based on the data related to the content and output them to a headphone or the like (not shown). The user can disconnect from the personal computer 1 the portable device 64 having the content stored therein, carry it with him, and play back the stored content. Thus the user can listen to music pieces or the like corresponding to the content using a headphone or the like.

The personal computer 1-1 used on the music data management system shown in FIG. 1 has a structure shown in FIG. 2, and a CPU (central processing unit) 11 comprised in the personal computer 1-1 actually executes a variety of application programs (will be detailed later) and OS (operating system). Also, the personal computer 1 includes a ROM (read-only memory) 12 and a RAM (random-access memory) 13. Generally, the ROM 12 stores programs used by the CPU 11 and basically fixed data of arithmetic parameters. The RAM 13 stores programs executed by the CPU 11 and parameters which will appropriately vary during the execution of the programs.

These components are connected to each other via a host bus 14 composed of a CPU bus, etc. The host bus 14 is connected to an external bus 16 such as a PCI (peripheral component interconnect/interface) via a bridge 15.

The personal computer 1 is provided also with a keyboard 18, mouse 19, display unit 20 and an HDD 21. The keyboard 18 is operated by the user to input a variety of commands to the CPU 11. The mouse 19 is also operated by the user for pointing and selection on the screen of the display unit 20. The display 20 is an LCD (liquid crystal display) unit or a CRT (cathode ray tube) display unit to display a variety of information as a text or image. The HDD (hard disc drive) 21 drives a hard disc or hard discs to write or read a program executed by the CPU 11 and information to or from the hard disc.

Further the personal computer 1 is provided with a drive 22 to read data or program recorded in a magnetic disc 41, optical disc 42 (including CD), magneto-optical disc 43 or semiconductor memory 44 set in the drive 22, and supply it to the RAM 13 connected via an interface 17, external bridge 16, bridge 15 and host bus 14 to the drive 22.

Moreover the personal computer 1 is provided with USB (universal serial bus) ports 23-1 to 23-3, The portable device 6-1 is connected to the USB port 23-1 via a predetermined cable. The USB port 23-1 delivers to the portable device 6-1 the data (e.g., content or command to the portable device 6-1) supplied from the HDD 21, CPU 11 or RAM 13 via the interface 17, external bus 16, bridge 15 or host bus 14.

To the USB port 23-2, there is the portable device 6-2 via a predetermined cable. The USB port 23-2 delivers to the portable device 6-2 the data (e.g., content or command to the portable device 6-2) supplied from the HDD 21, CPU 11 or RAM 13 via the interface 17, external bus 16, bridge 15 or host bus 14.

The USB port 23-3 has the portable device 6-3 connected thereto via a predetermined cable. The USB port 23-3 delivers to the portable device 6-3 the data (e.g., content or command to the portable device 6-3) supplied from the HDD 21, CPU 11 or RAM 13 via the interface 17, external bus 16, bridge 15 or host bus 14.

The personal computer 1 is further provided with a speaker 24 which outputs a predetermined sound corresponding to a content based on data or sound signal supplied from the interface 17.

As shown, the above components from the keyboard 18 to speaker 24 are connected to the interface 17 which is connected to the CPU 11 via the external bus 16, bridge 15 and host bus 14.

Further the personal computer 1 is provided with a communications unit 25 to which the network 2 is connected. The communications unit 25 stores in the form of a predetermined packet data supplied from the CPU 11 or HDD 21 (e.g., request for registration, request for sending of a content or the like), and sends the data via the network 2, and outputs data stored in the received packet (e.g., authenticate key, content or the like) to the CPU 11, RAM 13 or HDD 21 via the network 2.

The communications unit 25 is connected to the CPU 11 via the external bus 16, bridge 15 and hist bus 14.

As the other personal computer 1-2 has a similar structure to that of the personal computer 1-1, the explanation is omitted.

Figure 3:
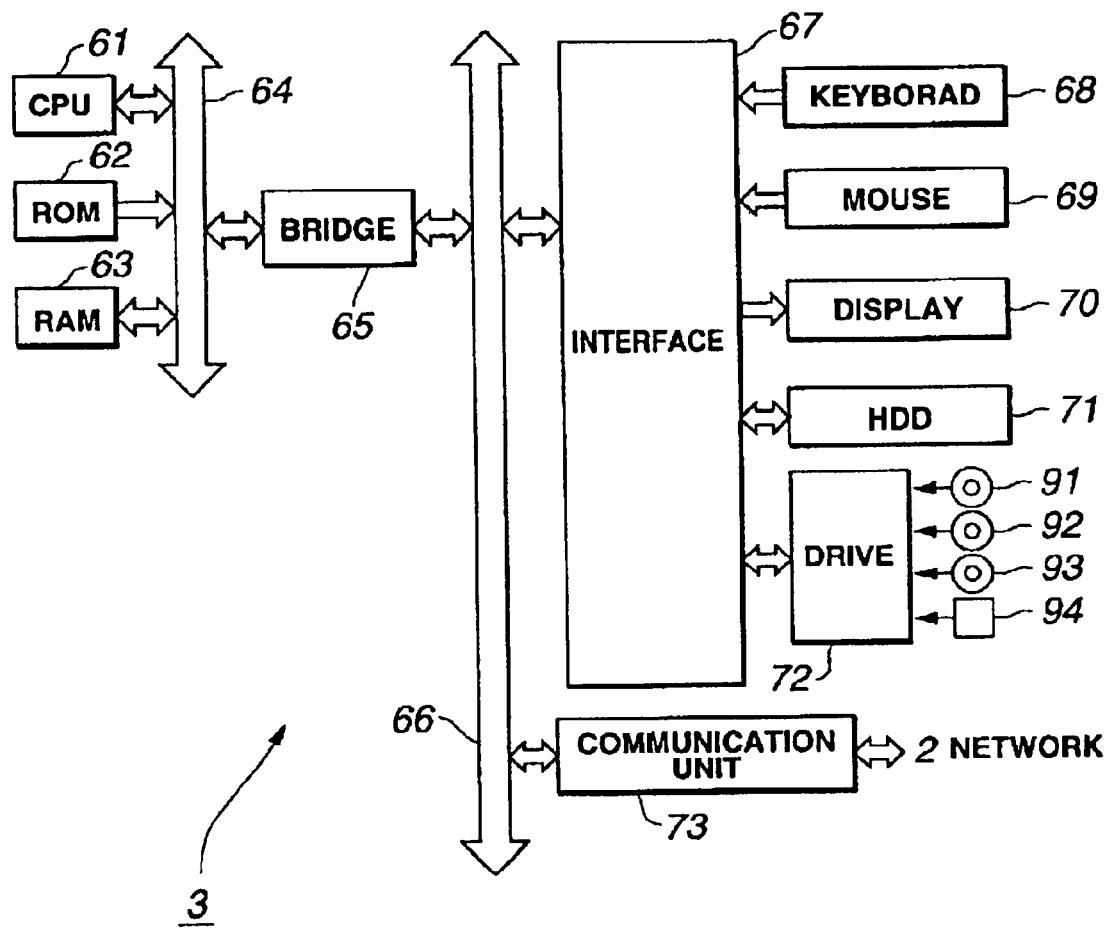
FIG. 3 shows the configuration of an EMD registration server used in the music data management system in FIG. 1.

Referring now to FIG. 3, there is shown the configuration of the EMD registration server 3. As shown, the EMD registration server 3 includes a CPU 61, ROM 62 and a RAM 63. The CPU 61 actually executes a variety of application programs and OS. Generally, the ROM 62 stores programs used by the CPU 61 and basically fixed data of arithmetic parameters. The RAM 63 stores programs executed by the CPU 61 and parameters which will appropriately vary during the execution of the programs. These components are connected to each other via a host bus 64 composed of a CPU bus, etc.

The host bus 64 is connected to an external bus 66 such as a PCI bus via a bridge 65.

The EMD registration server 3 is provided also with a keyboard 68, mouse 69, display unit 70 and an HDD 71. The keyboard 68 is operated by the user to input a variety of commands to the CPU 61. The mouse 69 is also operated by the user for pointing and selection on the screen of the display unit 70. The display 70 is an LCD unit or a CRT display unit to display a variety of information as a text or image. The HDD 71 drives a hard disc or hard discs to write or read a program executed by the CPU 61 and information to or from the hard disc.

Further the EMD registration server 3 is provided with a drive 72 to read data or program recorded in a magnetic disc 91, optical disc 92, magneto-optical disc 93 or semiconductor memory 94 set in the drive 72, and supply it to the RAM 63 connected via an interface 67, external bus 66, bridge 65 and host bus 64 to the drive 72.

As shown, the above components from the keyboard 68 to drive 72 are connected to the interface 67 which is connected to the CPU 61 via the external bus 66, bridge 65 and host bus 64.

Further the EMD registration server 3 is provided with a communications unit 73 to which the network 2 is connected. The communications unit 73 outputs data stored in the received packet to the CPU 61, RAM 63 or HDD 71 (e.g., data required for registration which will further be described later, predetermined program ID (identifier) or the like), and stores data supplied from the CPU 61 or HDD 71 (e.g., a predetermined number of authenticate keys, program or the like) in the form of a predetermined packet for sending via the network 2.

The communications unit 73 is connected to the CPU 61 via the external bus 66, bridge 65 and hist bus 64.

The EMD servers 4-1 to 4-3 and WWW servers 5-1 and 5-2 are constructed similarly to the EMD registration server 3. Therefore, they will not be described any further.

Figure 4:
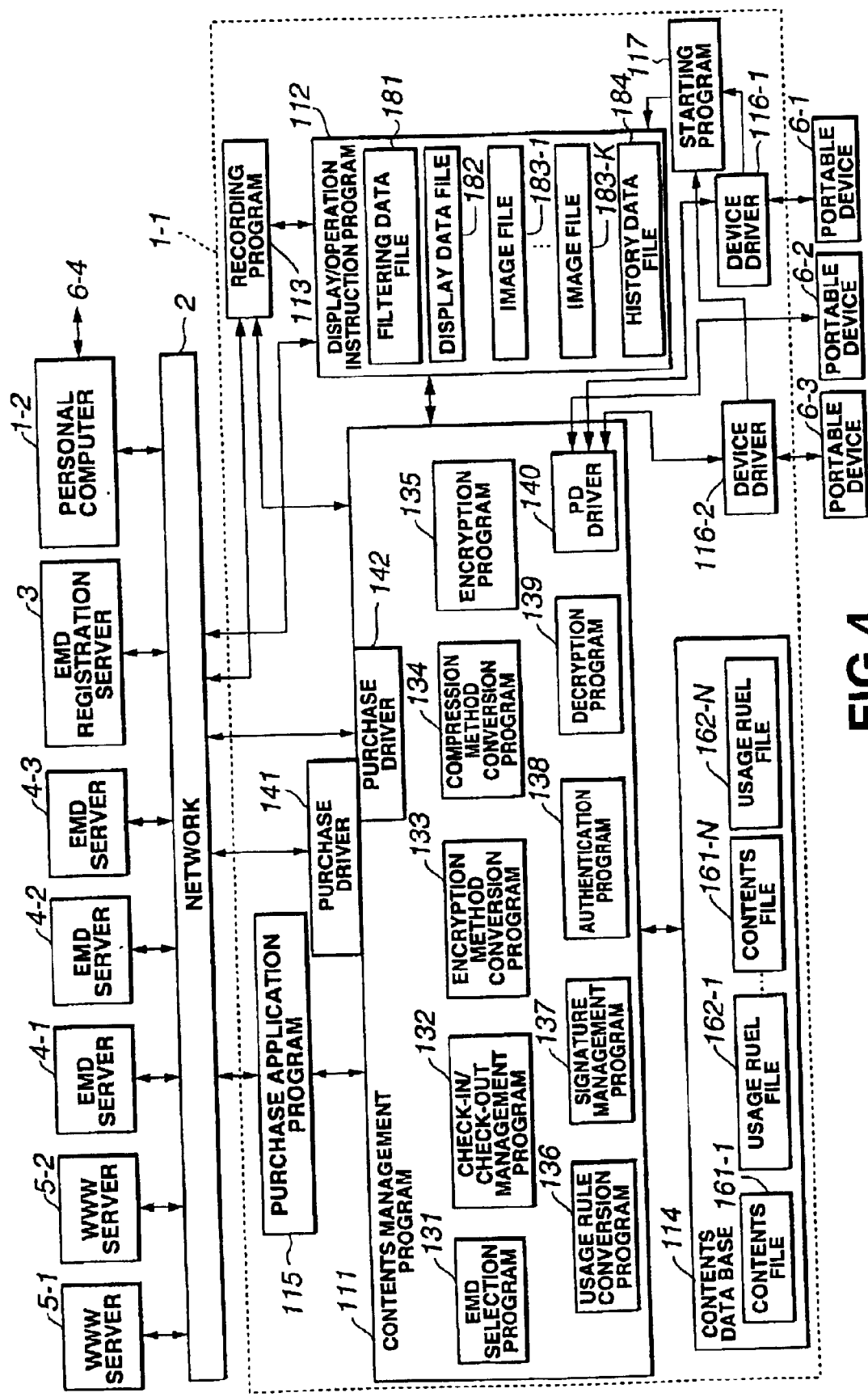
FIG. 4 is a block diagram of the personal computer, showing the functions of the personal computer.

Next, functions the personal computer 1 can perform by executing predetermined programs will be described herebelow:

Referring now to FIG. 4, there are shown in the form of a block diagram the functions of the personal computer 1, which can be performed by CPU 11 executing predetermined programs.

The CPU 11 executes a content management program 111 composed of a plurality of programs including an EMD selection program 131, check-in/checkout management program 132, encryption method conversion program 133, compression method conversion program 134, encryption program 135, usage rule conversion program 136, signature management program 137, authentication program 138, decryption program 139, PD driver 140, and purchase drivers 141 and 142.

The content management program 111 is stated with shuffled instructions, encrypted instructions or the like for example to conceal what are to be done under such instructions. Namely, it is difficult to know what is to be effected according to the content management program 111. For example, even if the content management program 111 is read directly by the user, no instructions included in the program 111 will not be identifiable.

When the content management program 111 is installed in the personal computer 1, the EMD selection program 131 will not be included in the content management program 111 but will be received from the EMD registration server 3 via the network 2 during EMD registration which will further be described later. The EMD selection program 131 is to select connection with any of the EMD servers 4-1 to 4-3 and have a purchase application program 115 or the purchase driver 141 or 142 communicate with any of the EMD servers 4-1 to 4-3 (for example, downloading of a content to be purchased or the like).

The check-in/checkout management program 132 is to set either check-in or checkout, and check out contents stored in content files 161-1 to 161-N to any of the portable devices 6-1 to 6-3 based on usage rule files 162-1 to 162-N recorded in a content data base 114 or check in contents stored in the portable devices 6-1 to 6-3.

Correspondingly to either the check-in or checkout set as in the above, the check-in/checkout management program 132 updates usage rule data stored in the usage rule files 162-1 to 162-N recorded in the content data base 114.

The encryption method conversion program 133 is to convert an encryption method having been used to encrypt a content the purchase application program 115 has received from the EMD server 4-1 via the network 2, a one having been used to encrypt a content the purchase driver 141 has received from the EMD server 4-2 via the network 2 or a one having been used to encrypt a content the purchase driver 142 has received from the EMD server 4-3 via the network 2, to the same encryption method as that having been used to encrypt contents stored in the content files 161-1 to 161-N the content data base 114 have recorded therein.

Also, when checking out a content to the portable device 6-1 or 6-3, the encryption method conversion program 133 is used to convert an encryption method by which a content to be checked out to a one the portable device 6-1 or 6-3 can use.

The compression method conversion program 134 is to convert a compression method having been used to compress a content the purchase application program 115 has received from the EMD server 4-1 via the network 2, a one having been used to compress a content the purchase driver 141 has received from the EMD server 4-2 via the network 2 or a one having been used to compress a content the purchase driver 142 has received from the EMD server 4-3 via the network 2, to the same compression method as that having been used to compress contents stored in the content files 161-1 to 161-N the content data base 114 having recorded therein.

The compression method conversion program 134 is read e.g. from a CD, and encodes the uncompressed contents supplied from the recording program 113 by the same encoding method as one of the contents stored in the content files 161-1 to 161-N the content data base 114 having recorded therein.

Also, when checking out a content to the portable device 6-1 or 6-3, the compression method conversion program 134 is used to convert the compression method having been used to compress the content to be checked out to a one the portable device 6-1 or 6-3 can use.

The encryption program 135 is to encrypt a content having been read from a CD for example and supplied from a recording program 113 (not yet encrypted) by the encryption method having been used to encrypt contents stored in the content files 161-1 to 161-N recorded in the content data base 114.

The usage rule conversion program 136 is to convert the usage rule data for content the purchase application program 115, purchase driver 141 or purchase driver 142 has received from the EMD server 4-1, 4-2 or 4-2, respectively, via the network 2, to the same format as that of the usage rule data stored in the usage rule files 161-1 to 161-N recorded in the content data base 114.

Also, when checking out a content to the portable device 6-1 or 6-3, the usage rule conversion program 136 converts the usage rule for the content to be checked out to a usage rule data the portable device 6-1 or 6-3 can use.

The signature management program 137 is to find, before check-in or checkout of a content, any falsification of the usage rule based on a signature (will further be described later) included in the usage rule data stored in the usage rule files 162-1 to 162-N recorded in the content data base 114, and updates the signature included in the usage rule data correspondingly to an update of the usage rule data stored in the usage rule files 162-1 to 162-N recorded in the content data base 114, the update having occurred after the check-in or checkout of the content.

The authentication program 138 is to provide a mutual authentication between the content management program 111 and purchase application program 115, and a mutual authentication between the content management program 111 and purchase driver 141. Also, the authentication program 138 stores authenticate keys for use in a mutual authentication between the EMD server 4-1 and purchase application program 115, a mutual authentication between the EMD server 4-1 and purchase driver 141, and a mutual authentication between the EMD server 4-3 and purchase driver 142.

The authenticate key used by authentication program 138 for the mutual authentication has not yet been stored in the authentication program 138 when the content management program 111 is installed in the personal computer 1 but it will be supplied from the EMD registration server 3 and stored in the authentication program 138 when a registration has successfully been done by a display/operation instruction program 112.

When the personal computer 1 reproduces contents stored in the content files 161-1 to 161-N recorded in the content data base 114, the decryption program 139 is to decrypt the content.

When checking out a predetermined content to the portable device 6-2 or checking in a predetermined content from the portable device 6-2, the PD driver 140 is to supply the portable device 6-2 with the content or a command to have the portable device 6-2 execute a predetermined operation.

When checking out a predetermined content to the portable device 6-1 or checking in a predetermined content from the portable device 6-1, the PD driver 140 is to supply a device driver 116-1 with the content or a command to have the device driver 116-1 execute a predetermined operation.

When checking out a predetermined content to the portable device 6-3 or checking in a predetermined content from the portable device 6-3, the PD driver 140 is to supply a device driver 116-2 with the content or a command to have the device driver 116-2 execute a predetermined operation.

The purchase driver 141 is a so-called plug-in program. It is installed along with the content management program 111, and supplied from the EMD registration server 3 via the network 2 or as recorded in a predetermined CD. Installed in the personal computer 1, the purchase driver 141 is to send and receive data to and from the content management program 111 via an interface of a predetermined type the content management program 111 has.

The purchase driver 141 sends to the EMD server 4-2 via the network 2 a request for sending a predetermined content, and receives the content from the EMD server 4-2. Also, the purchase driver 141 makes an accounting when receiving a content from the EMD server 4-2.

The purchase driver 142 is a program which is to be installed along with the content management program 111. It is to send to the EMD server 4-3 via the network 2 a request for sending a predetermined content, and receives the content from the EMD server 4-3. Also, the purchase driver 142 makes an accounting when receiving a content from the EMD server 4-3.

The display/operation instruction program 112 is to have the display unit 20 display a predetermined window image based on a filtering data file 181, display data file 182, image files 183-1 to 183-K or history data file 184, and instruct the content management program 111 by means of the keyboard 18 or mouse 19 to check in or out a content.

The filtering data file 181 has stored therein data for weighting each of contents stored in the content files 161-1 to 161-N recorded in the content data base 114, and it is recorded in the HDD 21.

The display data file 182 has stored therein data corresponding to contents stored in the content files 161-1 to 161-N recorded in the content data base 114, and it is recorded in the HDD 21.

The image files 183-1 to 183-K have stored therein images corresponding to the content files 161-1 to 161-N recorded in the content data base 114 or images corresponding to packages which will further be described later, and they are recorded in the HDD 21.

In the following, the image files 183-1 to 183-K will be referred to simply as "image file 183" where it is not necessary to identify them individually.

The history data file 184 has stored therein history data including numbers of times contents stored in the content files 161-1 to 161-N recorded in the content data base 114 have been checked out, numbers of times the contents stored in the content files 161-1 to 161-N have been checked in, dates of the check-in and checkout, etc., and it is recorded in the HDD 21.

For the registration, the display/operation instruction program 112 is to send a previously stored ID of the content management program 111 to the EMD registration server 3 via the network 2 while receiving an authenticate key and EMD selection program 131 from the EMD registration server 3, and supplies the content management program 111 with the authenticate key and EMD selection program 131.

The recording program 113 is to read out data such as a data recording time, etc. from a CD which is the optical disc 42 set in the drive 22 based on an operation made to the keyboard 18 or mouse 19, while displaying a predetermined window image.

The recording program 113 requests, via the network 2, for sending to the WWW server 5-1 or 5-2 of data corresponding to a CD (e.g., album name, artist name and the like) or data corresponding to contents recorded in the CD (e.g., content names and the like) based on the content recording time recorded in the CD while receiving, from the WWW server 5-1 or 5-2 data corresponding to a CD or data corresponding to contents recorded in the CD.

The recording program 113 is to supply received data corresponding to a CD or data corresponding to contents recorded in the CD to the display/operation instruction program 112.

When supplied with a recording instruction, the recording program 113 reads out contents from a CD being the optical disc 42 set in the drive 22 and outputs it as well as the usage rule data corresponding to the content such as No. of maximum possible checkouts to the content management program 111.

The content data base 114 stores in any of the content files 161-1 to 161-N contents supplied from the content management program 111, compressed by a predetermined method and encrypted by a predetermined method (namely, they are recorded in the HDD 21). The content data base 114 stores in any of the usage rule files 162-1 to 162-N corresponding to the content files 161-1 to 161-N, respectively, having contents stored therein usage rule data corresponding to the contents stored in the content files 161-1 to 161-N, respectively (namely, they are recorded in the HDD 21).

The content data base 114 may have stored therein the content files 161-1 to 161-N or usage rule files 162-1 to 162-N as records.

For example, usage rule data corresponding to a content stored in the content file 161-1 is stored in the usage rule file 162-1. Also, usage rule data corresponding to a content stored in the content file 161-N is stored in the usage file 162-N.

A starting program 117 is, so to speak, a resident program which is continuously operating while the operating system of the personal computer 1-1 is operating, and starts the display/operation instruction program 112 when it is not started if the starting program 117 receives from the device driver 116-2 a signal meaning the portable device 6-1 has been connected to the USB port 23-1.

Also, the starting program 117 starts the display/operation instruction program 112 when it is not started if the starting program 117 receives from the device driver 116-2 a signal meaning the portable device 6-3 has been connected to the USB port 23-3.

When the display/operation instruction program 112 is started by the starting program 117 as the portable device 6-1 is connected to the USB port 23-1, or as the portable device 6-3 is connected to the USB port 23-3, the display/operation instruction program 112 reads out from the portable device 6-1 or 6-3 data related to the content, such as music title, playing time and the like, recorded in the portable device 6-1 or 6-3 to display them on a predetermined window described later.

Further, when the display/operation instruction program 112 is started by the starting program 117 as the portable device 6-1 is connected to the USB port 23-1, or as the portable device 6-3 is connected to the USB port 23-3, the display/operation instruction program 112 checks in the content, that is limited to the content checked out from the personal computer 1-1, from the portable device 6-1 or 6-3 connected, selects the content based on a predetermined setting, and checks out the selected content to the portable device 6-1 or 6-3, if the predetermined setting is set to the display/operation instruction program 112.

In the following, the content files 161-1 to 161-N will be referred to simply as "content file 161" where it is not necessary to identify them individually. Also, in the following, the usage rule files 162-1 to 162-N will be referred to simply as "usage rule file 162" where it is not necessary to identify them individually.

As the function of the other personal computer 1-2 is similar to that of the personal computer 1-1 described above, the explanation is omitted.

Referring now to FIG. 5, there is shown an example of usage rule data stored in the usage rule files 162-1 to 162-N. For the item "Content ID", there is set data to identify a content stored in each of the content files 161-1 to 161-N. For the item "checkout Possible?", there is set either "YES" or "NO". When "YES" is set for this item, the content management program 111 can check out a content identified with the "Content ID" to any of the portable devices 6-1 to 6-3. When "NO" is set for the item "Checkout Possible?", the content management program 111 will not check out the content identified with the "Content ID" to any of the portable devices 6-1 to 6-3.

For the item "No. of Maximum Possible Checkouts", there is set a maximum number of times the content management program 111 can check out either the corresponding content file 161-1 or 161-N. The number of maximum possible checkouts will not be changed.

For the item "No. of Possible Checkouts", there is set a number of times the content management program 111 can check out either the corresponding content file 161-1 or 161-N at the time. When the content management program 111 checks out a content once, the number for the item "No. of Possible Checkouts" is decremented correspondingly. When the content management program 111 checks in a content once, the number for the item "No. of Possible Checkouts" is incremented correspondingly.

When neither the corresponding content file 161-1 nor 161-N is checked out, a value equal to the number of maximum possible checkouts is set as the corresponding number of possible checkouts.

When the number for the item "No. of Possible Checkouts" changes from "1" to "0" as the result of the checkouts done by the content management program 111, there will be set "NO" for the item "Checkout Possible?". When the number for the item "No. of Possible Checkouts" changes from "0" to "1" as the result of the checkin's done by the content management program 111, there will be set "YES" for the item "Checkout Possible?".

In the item "Move Possible?", there is set either "YES" or "NO". When "YES" is set for this item, the content management program 111 can move a content identified with the "Content ID". When "NO" is set for the item "Move Possible", the content management program 111 will not move the content identified with the "Content ID".

In the item "Copy Possible?", there is set either "YES" or "NO". When "YES" is set for this item, the content management program 111 can copy a content identified with the "Content ID". When "NO" is set for this item, the content management program 111 will not copy the content identified with the "Content ID".

In the item "Number of Possible Copies", there is set a number of times the content management program 111 can effect content copy.

In the item "Usage Period", there is stated a period for which a content identified with the "Content ID" can be used (checkout or playback).

In the item "Content-Usable District", there is stated a district (e.g., Japan or Worldwide) where a content identified with the "Content ID" can be used (checkout or playback).

In the item "Signature", there is stored data (will be referred to as "signature data" hereinafter) the signature management program 137 generates based on data set in the items "Content ID" to "Content-Usable District". The signature data is used for detection of any falsification of usage rule data. The algorithm used by the signature management program 137 for generation of signature data is a unidirectional function. Since it is not disclosed to the public, it is difficult for any other than the supplier of the content management program 111 to generate a correct signature data based on data set in the items "Content ID" to "Content-Usable District".

The purchase application program 115 is supplied from the EMD registration server 3 via the network 2 or as recorded in a predetermined CD. The purchase application program 115 is to request the EMD server 4-1 for sending a predetermined content, receives the content from the EMD server 4-1 and supplies it to the content management program 111. Also, the purchase management program 115 makes an accounting when receiving the content from the EMD server 4-1.

Next, correspondence between data stored in the display data file 82 and the content files 161-1 to 161-N stored in the content data base will be described:

A content stored in any of the content files 161-1 to 161-N belongs to a predetermined package. In detail, the package is an original package, My select package or a filtering package.

More than one content belong to the original package. The original package corresponds to the content classification in the EMD servers 4-1 to 4-3 (e.g., so-called album) or to a single CD. The contents belong to any original package and cannot belong to a plurality of original packages. The original package to which the contents belong cannot be modified. The user can edit (addition of information or modification of added information) a part of information corresponding to the original package.

Figure 6:
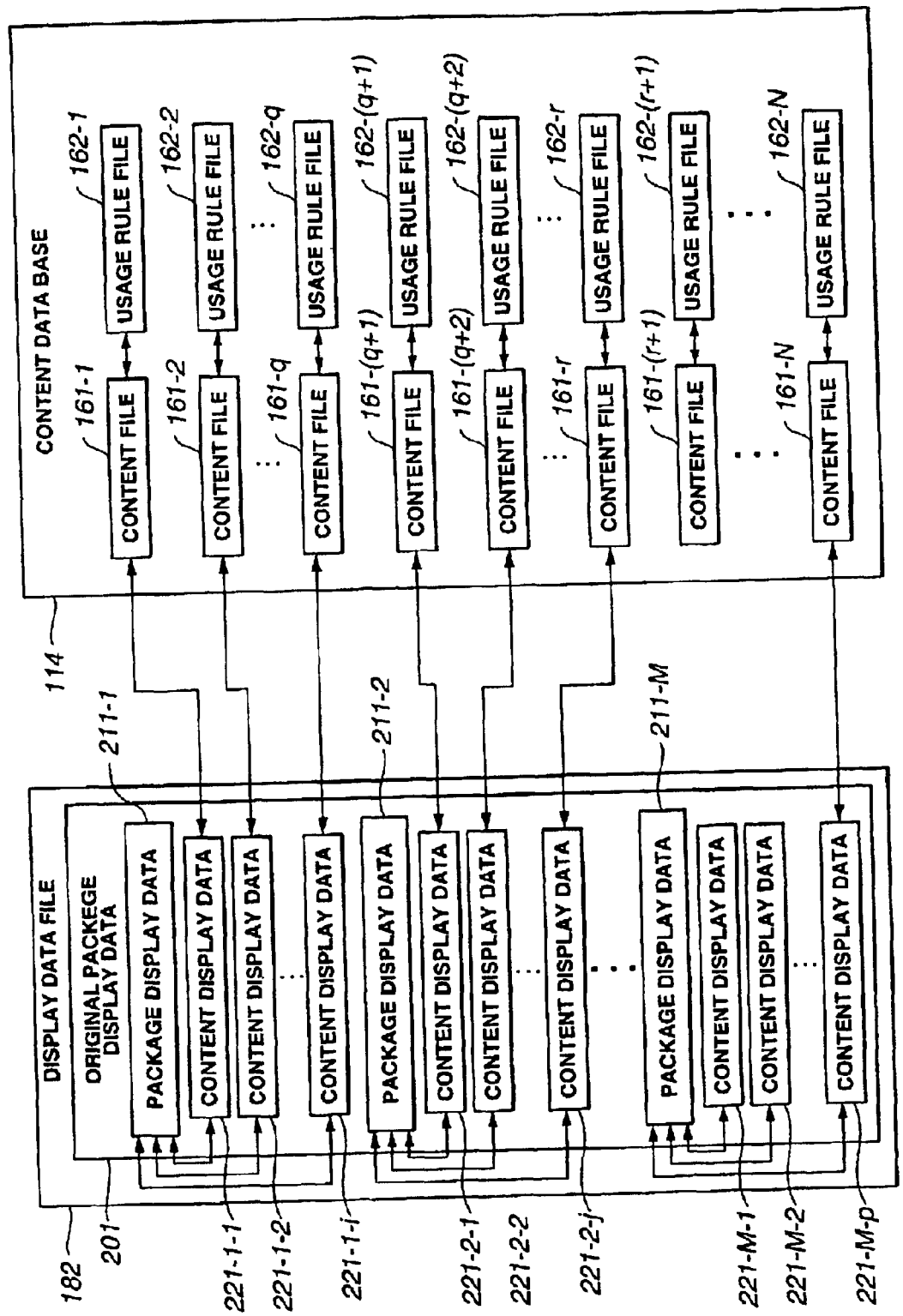
FIG. 6 shows an example of the relation between original package display data belonging to a display data file, and content files.

Referring now to FIG. 6, there is shown an example of the relation between the original package display data 201 included in a display data file 182 and content files 161-1 to 161-N. The relation defines the relation between an original package and contents. The original package display data 201 includes package display data 221-1 to 221-M.

The package display data 211-1 is related with the content display data 221-1-1 to 221-1-$i$.

The content display data 221-1-1 corresponds to a content stored in the content file 161-1. Usage rule data for a content stored in the content file 161-1 is stored in the usage rule 162-1.

The content display data 221-1-2 corresponds to a content stored in the content file 161-2. Usage rule data for a content stored in the content file 161-2 is stored in the usage rule 162-2.

The content display data 221-1-$i$ corresponds to a content stored in the content file 161-$q$. Usage rule data for a content stored in the content file 161-$q$ is stored in the usage rule 162-$q$.

The package display data 211-2 are related with the content display data 221-2-1 to 221-2-$j$.

The content display data 221-2-1 corresponds to a content stored in the content file 161-(q+1). Usage rule data for a content stored in the content file 161-(q+1) is stored in the usage rule 162-(q+1).

The content display data 221-2-2 corresponds to a content stored in the content file 161-(q+2). Usage rule data for a content stored in the content file 161-(q+2) is stored in the usage rule 162-(q+2).

The content display data 221-2-$j$ corresponds to a content stored in the content file 161-$r$. Usage rule data for a content stored in the content file 161-$r$ is stored in the usage rule 162-$r$.

Similarly, the package display data 211-M are related with the content display data 221-M-1 to 221-M-p.

The content display data 221-M-p corresponds to a content stored in the content file 161-N. Usage rule data for a content stored in the content file 161-N is stored in the usage rule 162-N.

In the following, the package display data 211-1 to 211-M will be referred to simply as "package display data 211" where it is not necessary to identify them individually. Also, the content display data 221-1-1 to 221-M-p will be referred to simply as "content display data 221" where it is not necessary to identify them individually. Also, the content display data 161-1 to 161-N will be referred to simply as "content display data 161" where it is not necessary to identify them individually. The usage rule files 162-1 to 162-N will be referred to simple as "usage rule file 162" where it is not necessary to identify them individually.

Referring now to FIGS. 7A to 7C, there is shown an example of the composition of the display data file 182. FIG. 7A shows an example of the original package display data 201. The original package display data 201 corresponds to a main table which stores display data corresponding to the package of the display data file 182, and includes package ID data for identification of a package, package type data for identification of either My Select package or filtering package, data of a package source in which a name of any one of the EMD servers 4-1 to 4-3 or a CD is set, package name data, artist name data, genre name data, content ID data indicating name of image file in which an image corresponding to a package is stored, and content ID data corresponding to more than one content belonging to a package.

Information corresponding to an original package added by the user is added to the main table or a sub table not shown.

FIG. 7B shows an example of the content display data 221. The content display data 221 corresponds to a main table of the display data file 182 which stores display data corresponding to the content, and includes content ID data, original package ID data for identification of an original package to which a corresponding package belong, content name data, data on number of checkouts, data on maximum number of checkouts, and data for indicating name of image file in which an image corresponding to a content is stored.

Further, the display data file 182 may be made to correspond to a content ID and have data type and data recorded in the sub table, as shown in FIG. 7C. In the sub table are recorded data and the data type which is different from that of the main table, corresponding to each content ID per a record.

For example, in the sub table of the display data file 182 shown in FIG. 7C are recorded a cyber code (trademark), an ISRC (International Standard Recording Code), a songwriter name and a composer name corresponding to the content whose content ID is 123xDES3. Also, in the sub table of the content display data 221 shown in FIG. 7C are recorded a cyber code (trademark), an ISRC, a reproduction period and number of reproduction corresponding to the content whose content ID is 123xDES4.

Meanwhile, in the sub table of the display data file 182 may be recorded data and the data type which is different from that of the main table of the package, corresponding to each package ID.

Accordingly, by using the sub table, even if a new type of data corresponding to the content is added, the display data file 182 can record the data of the new type smoothly and promptly without changing the system of the main table.

The My Select package has belonging thereto more than one content freely selected by the user. The user can freely make an edition to have a content belong to a My Select package. A content may belong to more than one My Select package, and may not belong to any My Select package.

Figure 8:
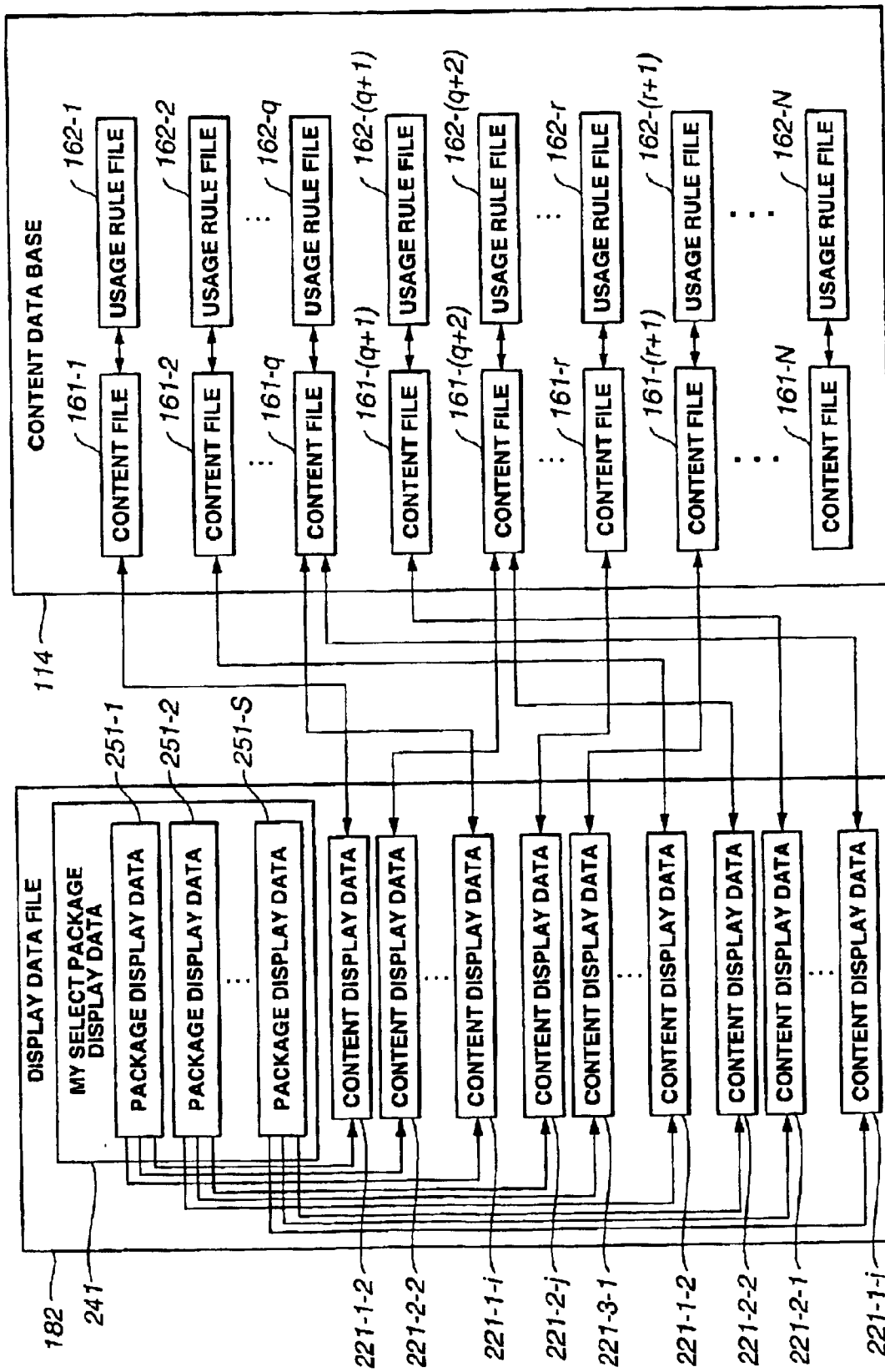
FIG. 8 shows an example of the relation between My Select package display data and content files.

Referring now to FIG. 8, there is shown an example of the relation between the My Select package display data 241 belonging to the display data file 182 and content files 161-1 to 161-N. The relation defines the relation between a My Select package and contents. The My Select package display data 241 includes package display data 251-1 to 251-S.

The package display data 251-1 is related with the content display data 221-1-1, 221-2-2 or **221-1-*i*** correspondingly to a setting made by the user.

The package display data 251-2 is related with the content display data **221-2-*j*, 221-3-1 or 221-1-2** correspondingly to a setting made by the user.

Similarly, the package display data 251-S is related with the content display data 221-2-2 or **221-1-*i*** correspondingly to a setting made by the user.

In the following, the package display data 251-1 to 251-S will be referred to simply as "package display data 251" where it is not necessary to identify them individually.

Since the package display data 251 has a similar composition to that of the package display data 221 having been previously described with reference to FIG. 7A, so it will not be described any further.

Thus, the user can have a desired content belong to a My Select package. One content belongs to a plurality of My Select packages as the case may be.

The filtering package has belonging thereto a content selected based on filtering data stored in the filtering data file 181. The filtering data is supplied from the EMD servers 4-1 to 4-3 or WWW server 5-1 or 5-2 via the network 2, or as recorded in a predetermined CD. The user may edit filtering data stored in the filtering file 181.

The filtering data is a reference for selection of a predetermined content or calculation of a weight corresponding to a content. For example, using the filtering data corresponding to the J-POP (Japanese pops) of the week, the personal computer 1 can identify ten contents from the best to tenth-place ones of the week.

The filtering data file 181 includes for example filtering data for selection of contents in the descending order of the periods for which they have been checked out for the past one month, filtering data for selection of contents having been checked out frequently for the past half year or filtering data for selection of contents including a letter "love" in their name.

Thus, a content in the filtering package is selected by relating the content display data 221 corresponding to the content (including data set by the user in the content display data 221) or history data 184 with a filtering data.

Figure 9:
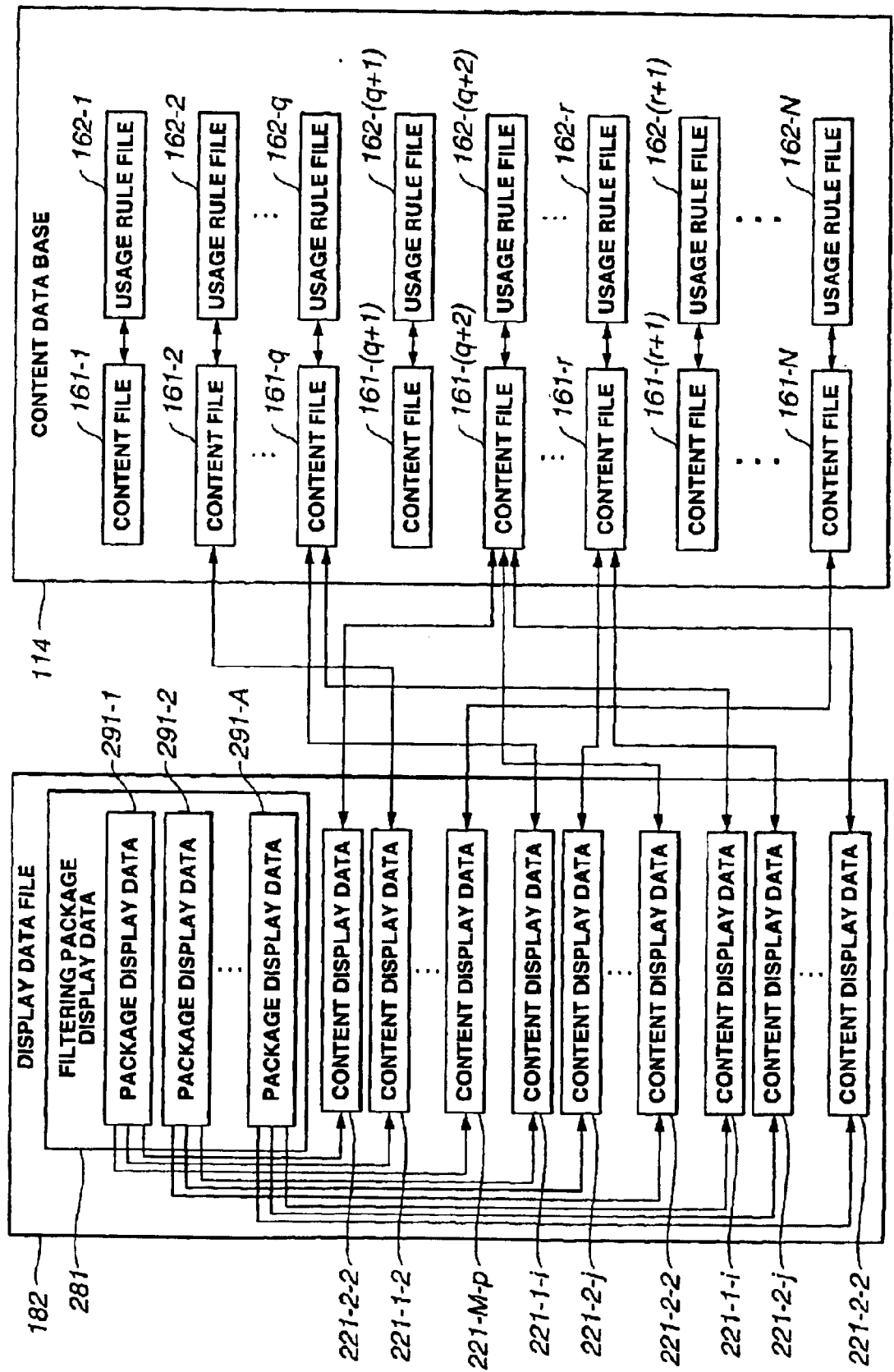
FIG. 9 shows a relation between filtering package display data and content files.

Referring now to FIG. 9, there is shown an example of the relation between the filtering package display data 281 belonging to the display data file 182 and content files 161-1 to 161-N. The relation defines the relation between a My Select package and contents. The filtering package display data 281 includes package display data 291-1 to 291-A.

The package display data 291-1 is related with the content display data 221-2-1, 221-1-2 or 221-M-p.

The package display data 291-2 is related with the content display data **221-1-*i*, 221-2-*j* and 221-2-2**.

Similarly, the package display data 291-A is related with the content display data **221-1-*i*, 221-2-*j* and 221-2-2**.

In the following, the package display data 291-1 to 291-A will be referred to simply as "package display data 291" where it is not necessary to identify them individually.

Since the package display data 291 has a similar composition to that of the package display data 221 having been previously described with reference to FIG. 7A, so it will not be described any further.

Thus, a predetermined content selected by the user operating the personal computer 1 belongs to the filtering package, and one content belongs to a plurality of filtering packages as the case may be.

Figure 10:
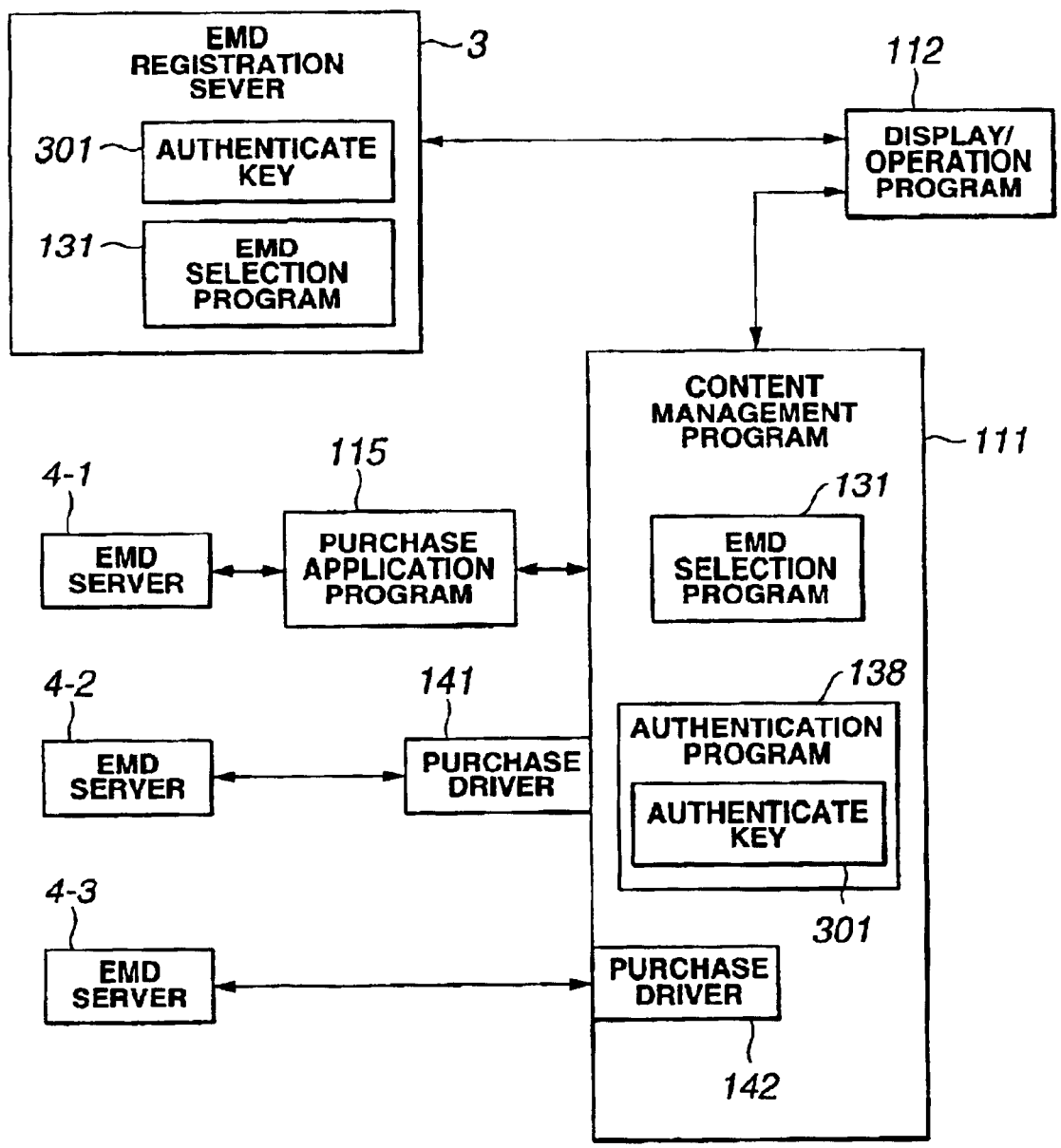
FIG. 10 explains the operations made for EMD registration.

Next, EMD registration will be described with reference to FIG. 10. When the display/operation instruction program 112 is initially started with the content management program 111 and display/operation instruction program 112 installed in the personal computer 1, it references to a uniform resource locator (URL) and the like previously stored therein, and connects to the EMD registration server 3 via the network 2.

Figure 11:
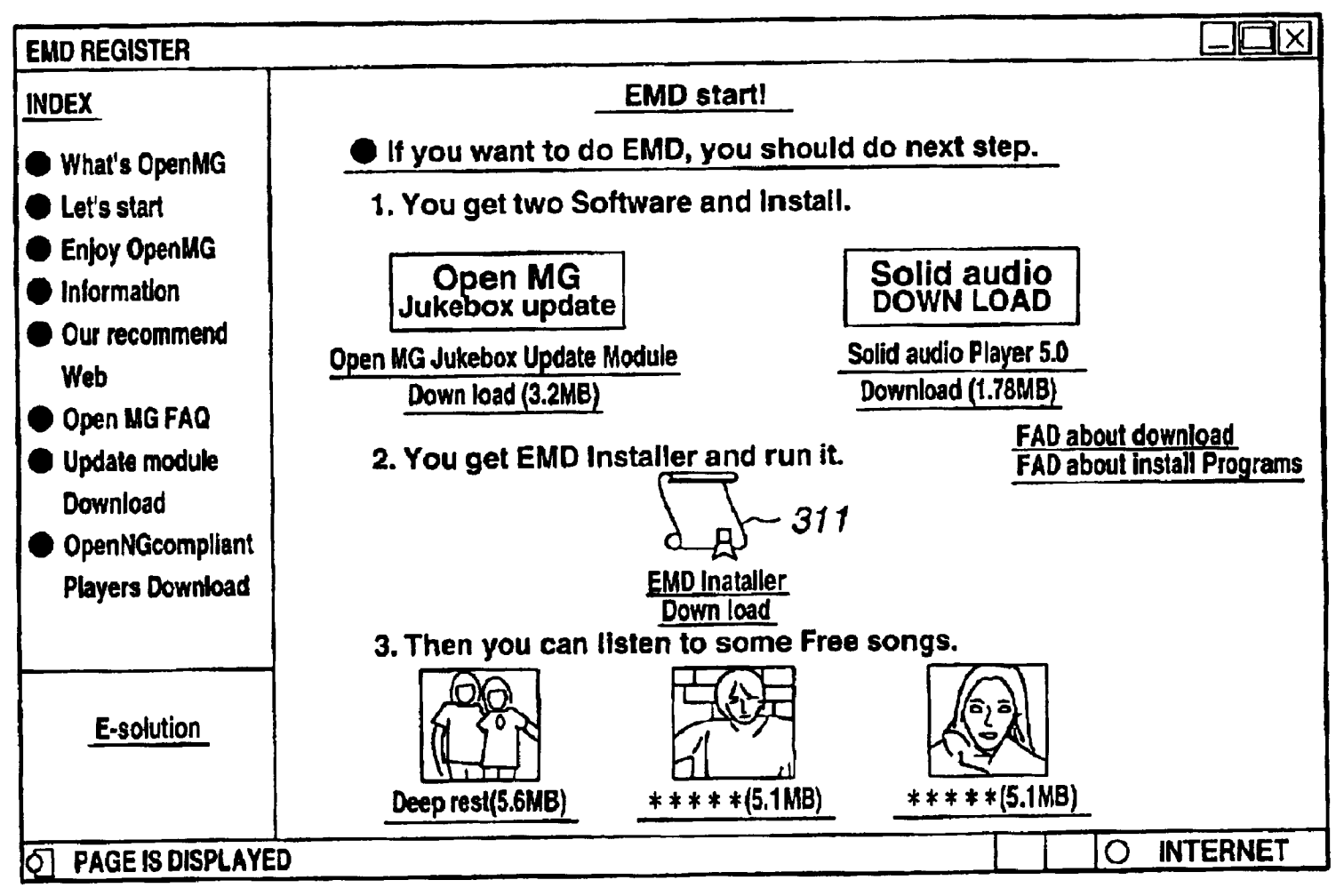

The EMD registration server 3 sends data for display of a screen intended for the registration to the display/operation instruction program 112. The display/operation instruction program 112 will display a screen having an EMD registration button 311 disposed thereon on the display unit 20 as shown in FIG. 11 for example.

When the EMD registration button 311 is clicked, the display/operation instruction program 112 requests the EMD registration server 3 for sending an authenticate key 301 and EMD selection program 131 previously recorded in the EMD registration server 3 along with a previously stored ID for the content management program 111 and necessary data for the registration (e.g., name of the user of the personal computer 1 and credit No.).

When it is determined that the received ID for the content management program 111 is valid, the EMD registration server 3 sends the authenticate key 301 and EMD selection program 131 the display/operation instruction program 112 via the network 2.

On the contrary, when it is determined that the received ID for the content management program 111 is invalid, the EMD registration server 3 will send a predetermined error message to the display/operation instruction program 112 via the network 2. When the ID for the content management program 111 is invalid, the display/operation instruction program 112 cannot acquire the authenticate key 301 and EMD selection program 131.

Upon reception of the authenticate key 301 and EMD selection program 131 from the EMD registration server 3, the display/operation instruction program 112 will supply the authenticate key 301 and EMD selection program 131 to the content management program 111.

When supplied with the authenticate key 301 and EMD selection program 131 from the display/operation instruction program 112, the content management program 111 will install and start the EMD selection program 131, and supply the authenticate key 301 to the authentication program 138. The authentication program 138 stores therein the acquired authenticate key 301.

Figure 12:
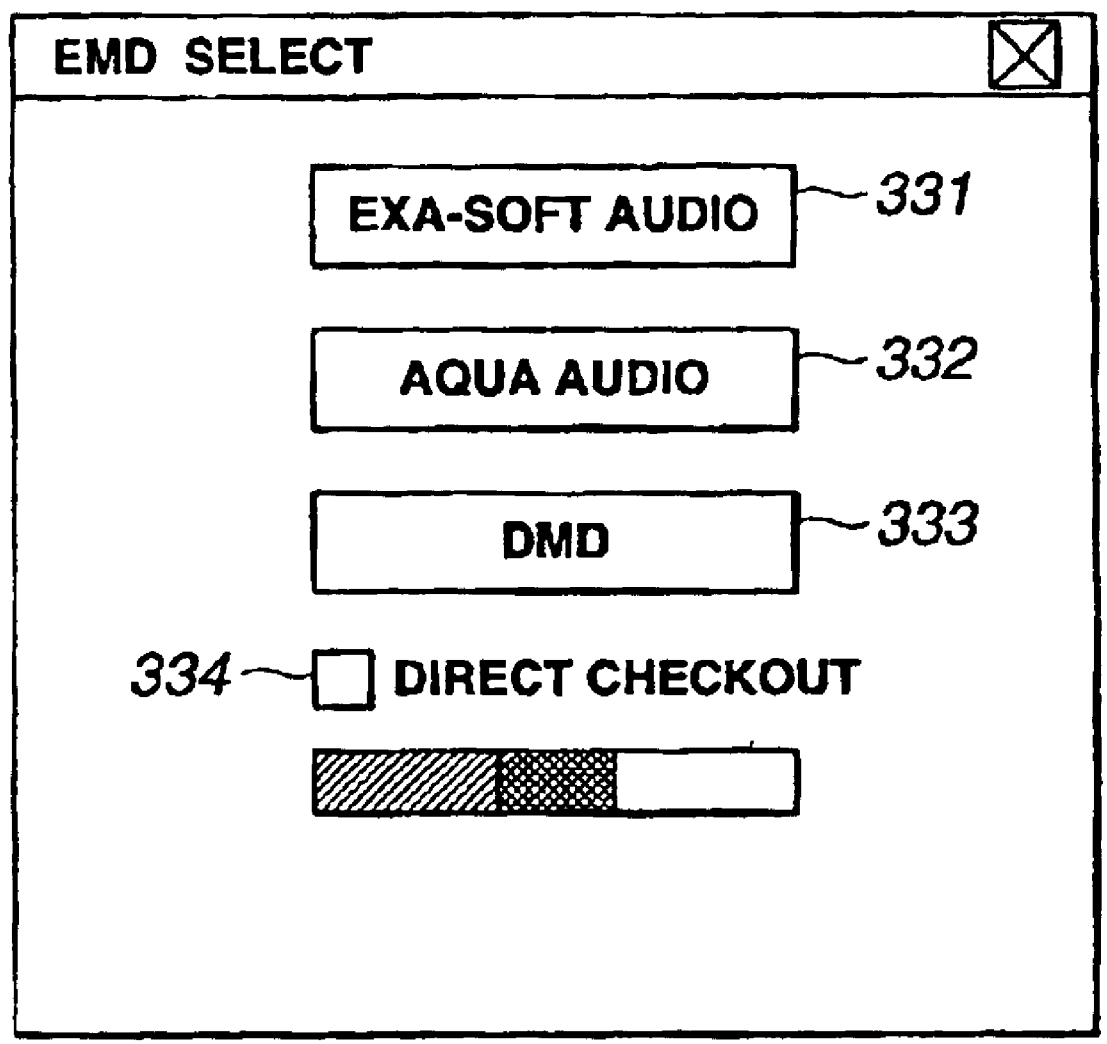
FIG. 12 shows an example of the display made by the EMD selection program.

After started, the EMD selection program 131 will display, on the display unit 20, a window having disposed therein buttons for starting the connection with any of the EMD servers 4-1 to 4-3 as shown in FIG. 12 for example.

When an EXA-SOFT AUDIO button 331 for example is clicked, the content management program 111 starts a purchase application 151 and connects the purchase application 151 to the EMD server 4-1. At this time, the authentication program 138 uses the authenticate key 301 to execute a mutual authentication with the purchase application 151 and has the purchase application 151 make a mutual authentication with the EMD server 4-1.

Figure 13:
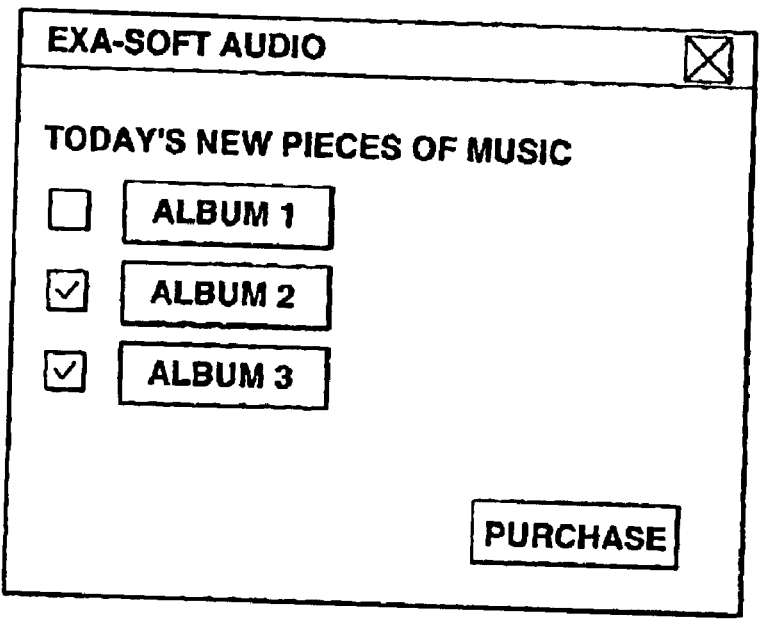
FIG. 13 shows an example of the display made by the purchase application program.

When the purchase application 151 has successfully made the mutual authentication with the EMD server 4-1, it will display, on the display unit 20, a screen for purchase of a content as shown in FIG. 13 for example.

When an AQUA AUDIO button 332 for example, shown in FIG. 12, is clicked, the content management program 111 will install the purchase driver 141 being a plug-in program, and connect the purchase driver 141 to the EMD server 4-2. At this time, the authentication program 138 uses the authenticate key 301 to execute a mutual authentication with the purchase driver 141 and has the purchase driver 141 make a mutual authentication with the EMD server 4-2.

Figure 14:
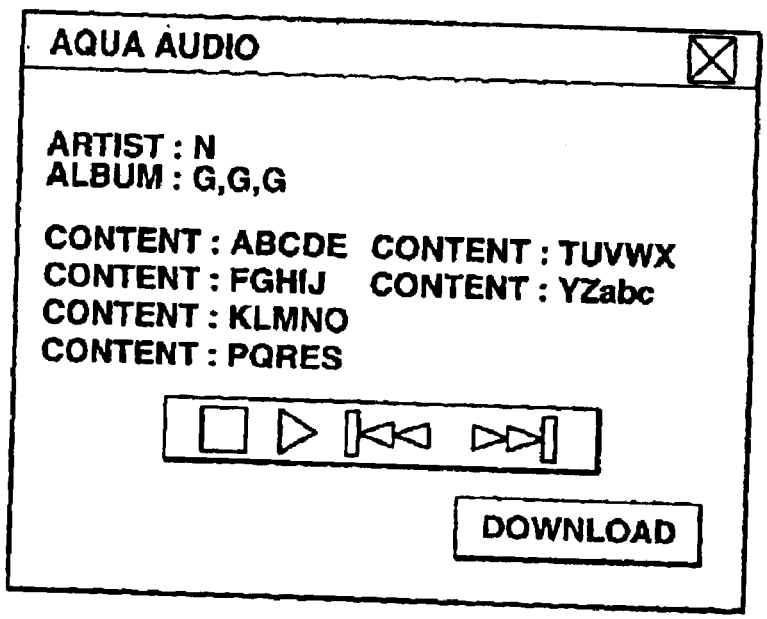
FIG. 14 shows an example of the display made by the purchase driver.

When the purchase driver 141 has succeeded in the mutual authentication with the EMD server 4-2, it will display, on the display unit 20, a screen for purchase of a content as shown in FIG. 14 for example.

Similarly, when a DMD button 333 for example, shown in FIG. 12, is clicked, the content management program 111 will connect the purchase driver 142 to the EMD server 4-3. At this time, the authentication program 138 uses the authenticate key 301 to execute a mutual authentication with the EMD server 4-3 via the purchase driver 142.

Note that when a check button 334 (DIRECT CHECKOUT) shown in FIG. 12 is checked, a content received from any of the EMD servers 4-1 to 4-3 (namely, the content is purchased) is stored into the content data base 114 and checked out to any predetermined one of the portable devices 6-1 to 6-3.

Next, reading of a content from a CD set in the drive 22 and recording of the content will be described.

Figure 15:
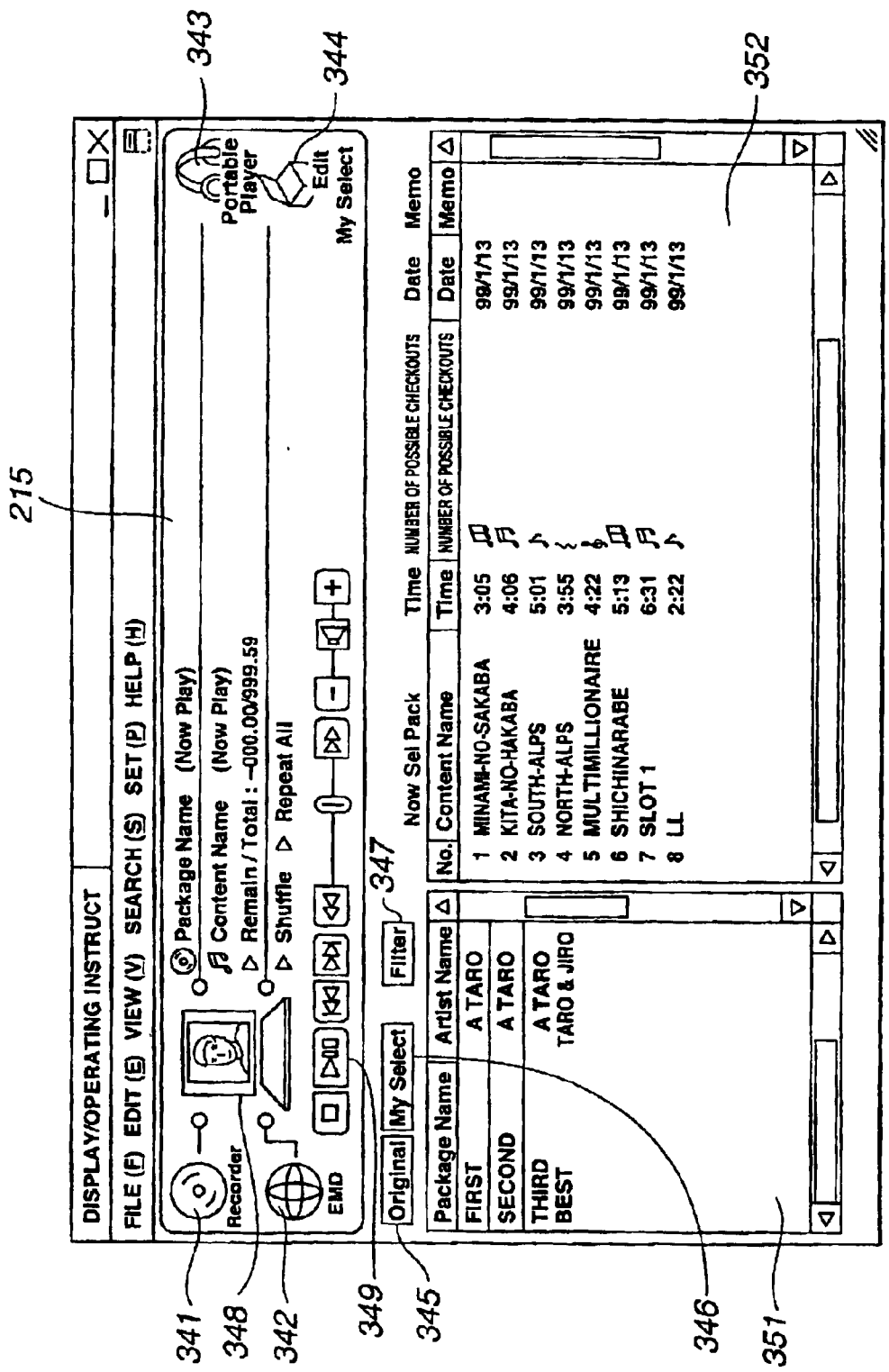
FIG. 15 shows an example of the display/operation instruction window.

Referring now to FIG. 15, there is shown an example of the display/operation instruction window the display/operation instruction program 112 displays on the display unit 20 when it is started after completion of the EMD registration.

The display/operation instruction window has disposed therein a button 341 for starting the recording program 113, button 342 for starting the EMD selection program 131, button 343 for displaying a field in which check-in or checkout is set, and a button 344 for displaying a field for edition of a My Select package, that is, the My Select package display data 241.

When a button 345 also disposed is selected, data corresponding to an original package is displayed in a field 351. When a button 346 also disposed is selected, data corresponding to a My Select package is displayed in the field 351. When a button 347 also disposed is selected, data corresponding to a filtering package is displayed in the field 351.

Data displayed in the field 351 relates to a package, and it is for example a package name or artist name.

As shown in FIG. 15, in the field 351, there are shown, for example, a package name "FIRST" and artist name "A. TARO" stored in the package display data 221-1, a package name "SECOND" and artist name "A. TARO" stored in the package display data 221-2, etc.

In a field 352, there is shown data corresponding to contents belonging to packages selected in the field 351. Data displayed in this field 352 include content name, play time or number of possible checkouts, etc., for example.

In FIG. 15 for example, since a package corresponding to the package display data 221-2 is selected, there are displayed in the field 351 a content name "MINAMI-NO-SAKABA" and number of possible checkouts "..." (indicating three checkouts) stored in the content display data 221-1 corresponding to contents belonging to a package corresponding to the package display data 221-2, a content name "KITA-NO-HAKABA" and number of possible checkouts ".." (indicating two checkouts" stored in the content display data 221-2, etc.

One eighth note as the number of possible checkouts displayed in the filed 352 indicates that the corresponding content can check out once.

A rest note as the number of possible checkouts displayed in the filed 352 indicates that the corresponding content cannot check out, that is, the number of possible checkouts is zero. Also, a treble clef as the number of possible checkouts displayed in the filed 352 indicates that there is no limit in the number of possible checkouts of the corresponding content, that is, the corresponding content can check out with no limit.

Note that the number of possible checkouts may not only be indicated with a number of predetermined figures (e.g., star, moon or the like) as shown in FIG. 15 but also with a numeral or the likes.

Also the display/operation instruction window has disposed therein a field 348 in which an image or the like corresponding to a selected package or content is displayed, and a button 349 for use to play back a selected content (output a sound corresponding to the content from the speaker 24). To play back the selected content, the button 349 is to be clicked.

By selecting a predetermined content name displayed in the field 352 and making an erasing operation while data corresponding to the original package are being displayed in the field 351 with the button 345 activated, the display/operation instruction program 112 will have the content management program 111 erase a predetermined content stored in the content data base 114 and corresponding to the selected content name.

Figure 16:
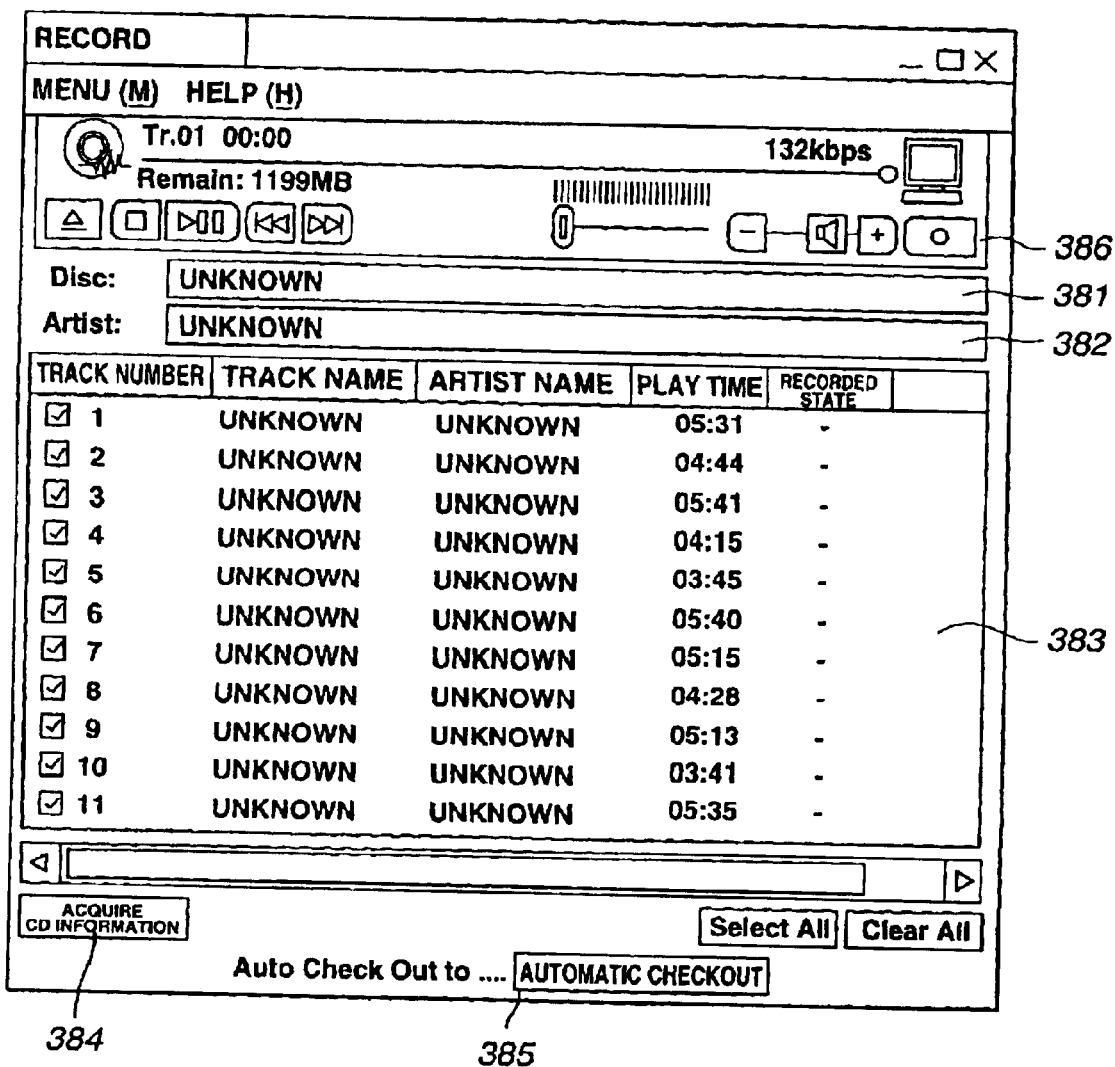
FIG. 16 explains a window the recording program has the display unit.

Referring now to FIG. 16, there is shown, for explanation, a window the recording program 113 has the display unit 20 display when it is started by clicking the button 341.

The recording program 113 reads a play time of a content from a CD set in the drive 22, and displays it in a field 383. Since the name of the content is unknown, the recording program 113 will display "UNKNOWN" in a part of the field 383 in which a content name is to be displayed.

Since both he title of the CD set in the drive 22 and artist name are unknown, the recording program 113 will display "UNKNOWN" in each of a field 381 in which a CD title is to be displayed and a field 382 in which an artist name is to be displayed.

The window displayed on the display unit 20 by the recording program 113 has further disposed therein a button 384 which is to be clicked for acquisition of information from a CD, and a button 385 for setting whether or not a content read from the CD should automatically be checked out to any of the portable devices 6-1 to 6-3 when the read content is recorded into the content data base 114.

When the button 385 for example is clicked, the recording program 113 will have the display unit 20 display a pull-down menu showing the list of portable devices 6-1 to 6-3. When the user selects any of the portable devices 6-1 to 6-3 from the pulldown menu, the personal computer 1 will automatically check out a content recorded from the CD for any selected one of the portable devices 6-1 to 6-3. When the user selects "NO CHECKOUT" from the pulldown menu, the personal computer 1 will not check out any content recorded from the CD.

The window the recording program 113 has the display unit 20 display has also disposed therein a button 386 for instructing the start of recording of a content recorded in the CD.

Figure 17:
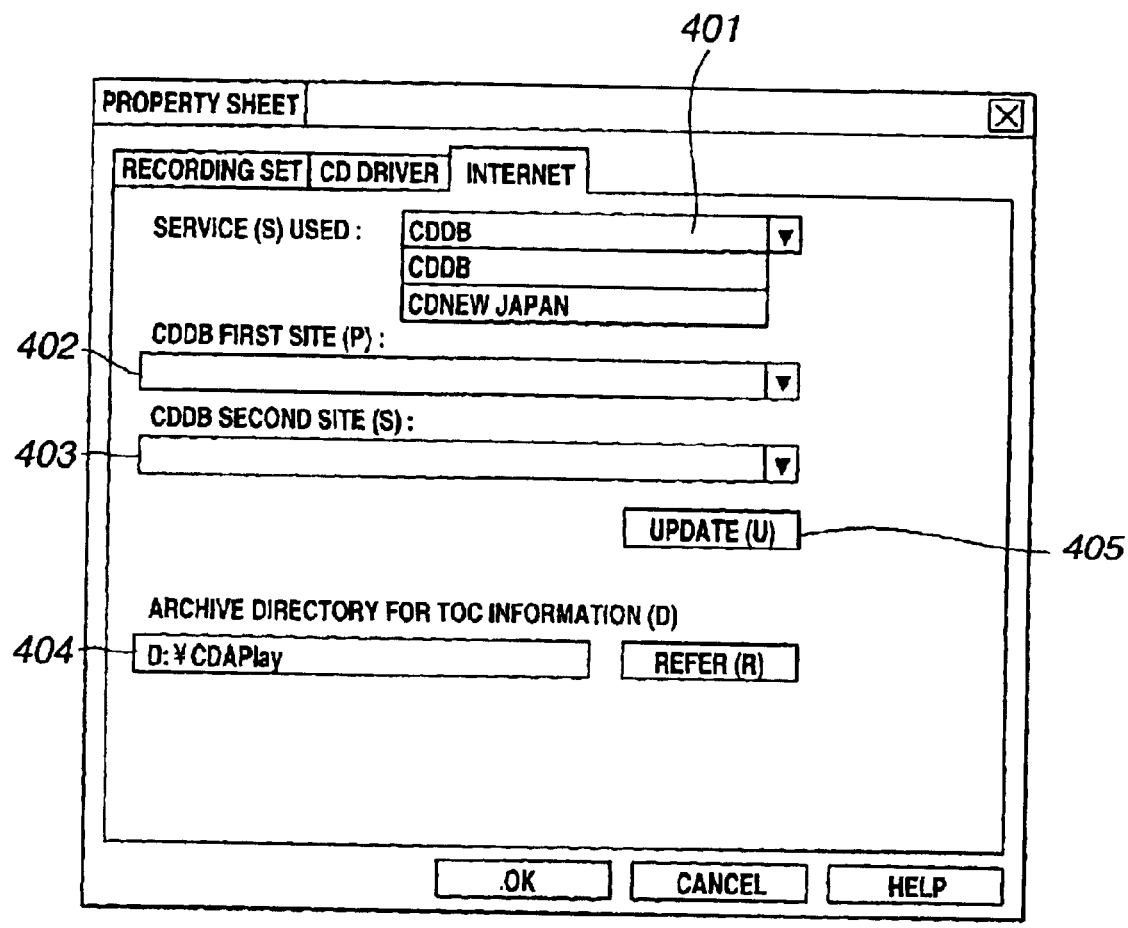
FIG. 17 shows a property dialog box where it is set which of the WWW servers is to be selected.

Referring now to FIG. 17, there is shown a property dialog box the recording program 113 has the display unit 20 display when CD information is to be acquired from either of the WWW servers 5-1 and 5-2 and where it is set from which of the WWW servers 5-1 and 5-2 the CD information should be acquired.

The property dialog box has disposed therein a field 401 where it is set from which of the WWW servers 5-1 and 5-2 the CD information should be acquired. When "CDDB" for example is set in the field 401, the recording program 113 will request the WWW server 5-1 for sending the CD information. When "CDNEW JAPAN" (for example, the name of a company or site providing a similar service to that provided by the CDNEW (trademark)) is set in the field 401, the recording program 113 will request the WWW server 5-2 corresponding to CDDB for sending the CD information.

When "CDDB" is set in the field 401, fields 402 and 403 will be ready for such a setting. URL at the first site of CDDB is to be set in the field 402 while that at the second site of CDDB is to be set in the field 403.

When the CD information is received from either of the WWW servers 5-1 and 5-2, there will be set in a field 404 a directory in which the received information is to be recorded (any directory of the HDD 21).

Figure 18:
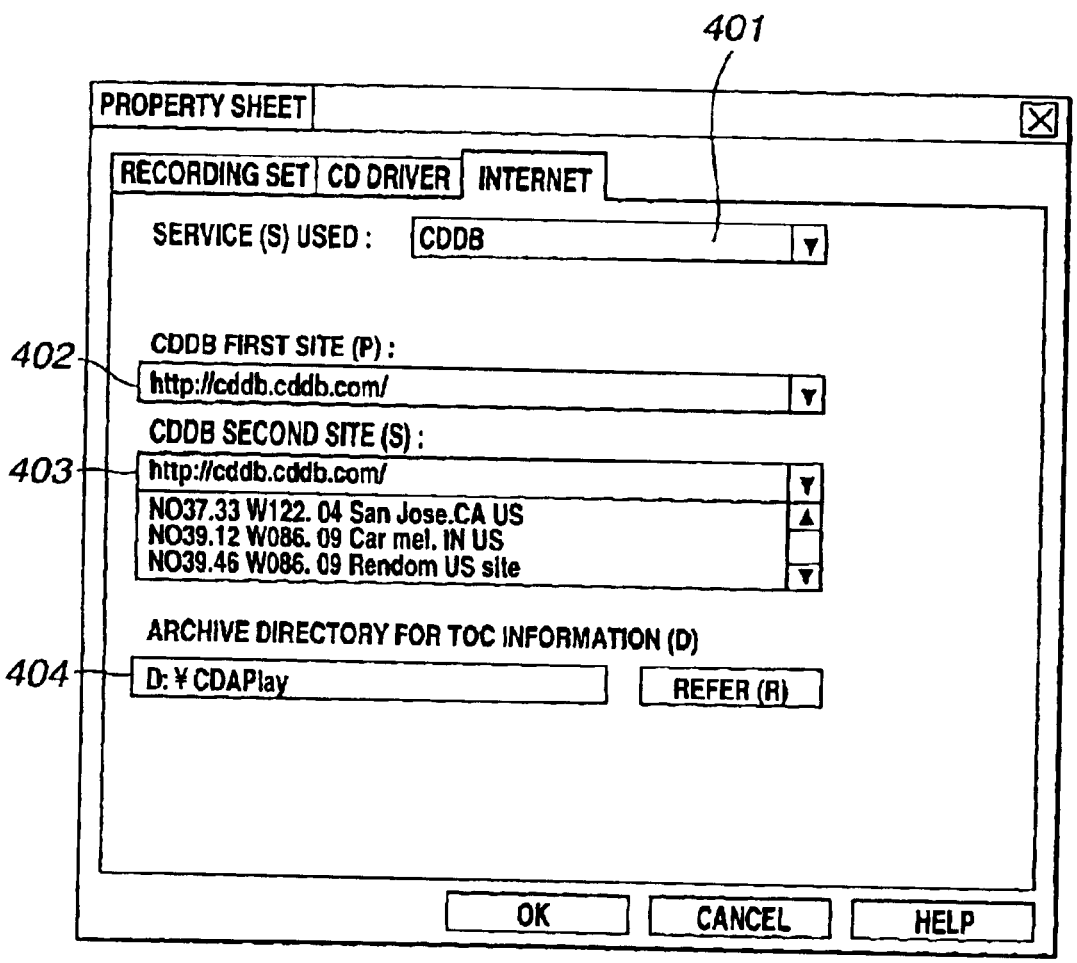
FIG. 18 shows a property dialog box where it is set which of the WWW servers is to be selected.

When a button 405 also disposed in the property dialog box is clicked, the recording program 113 will access, via the network 2, a predetermined one of the WWW servers based on URL previously stored in the recording program 113, acquire information on URL at the first site of CDDB and URL at the second site of CDDB, and set the information on URL at the first site of CDDB as candidate information to be set in the field 402 while setting the information on URL at the second site of CDDB as candidate information to be set in the field 403, as shown in FIG. 18.

Figure 19:
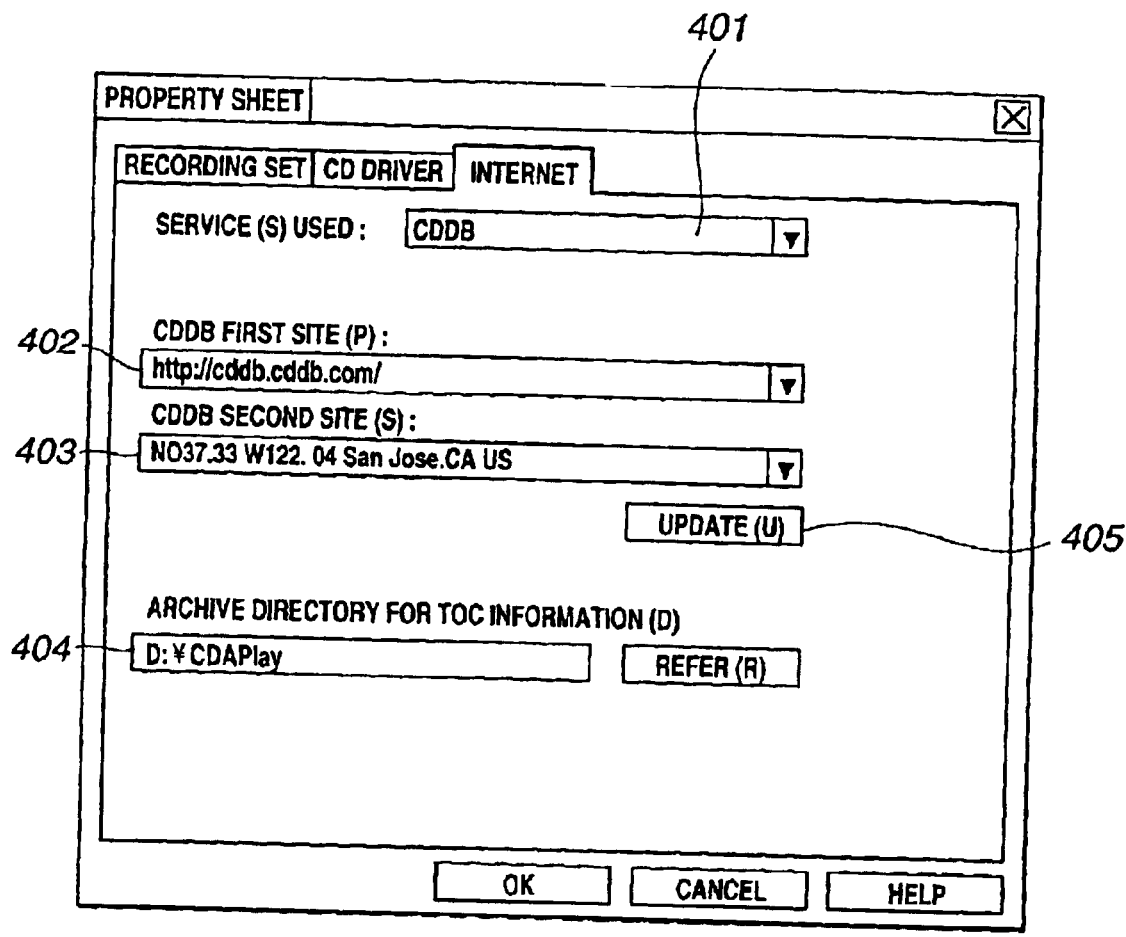
FIG. 19 explains a window the recording program has the display unit.

When the button 384 shown in FIG. 16 is clicked after the user sets "CDDB" in the field 401, URL at the first site of CDDB in the field 402 and URL at the second site of CDDB in the field 403 as shown in FIG. 19, the recording program 113 will connect to the WWW server 5-1 based on URL set in the field 402 and URL set in the field 403, request the WWW server 5-1 for CD information by following a procedure corresponding to "CDDB" set in the field 401, and receive the CD information from the WWW server 5-1.

Figure 20:
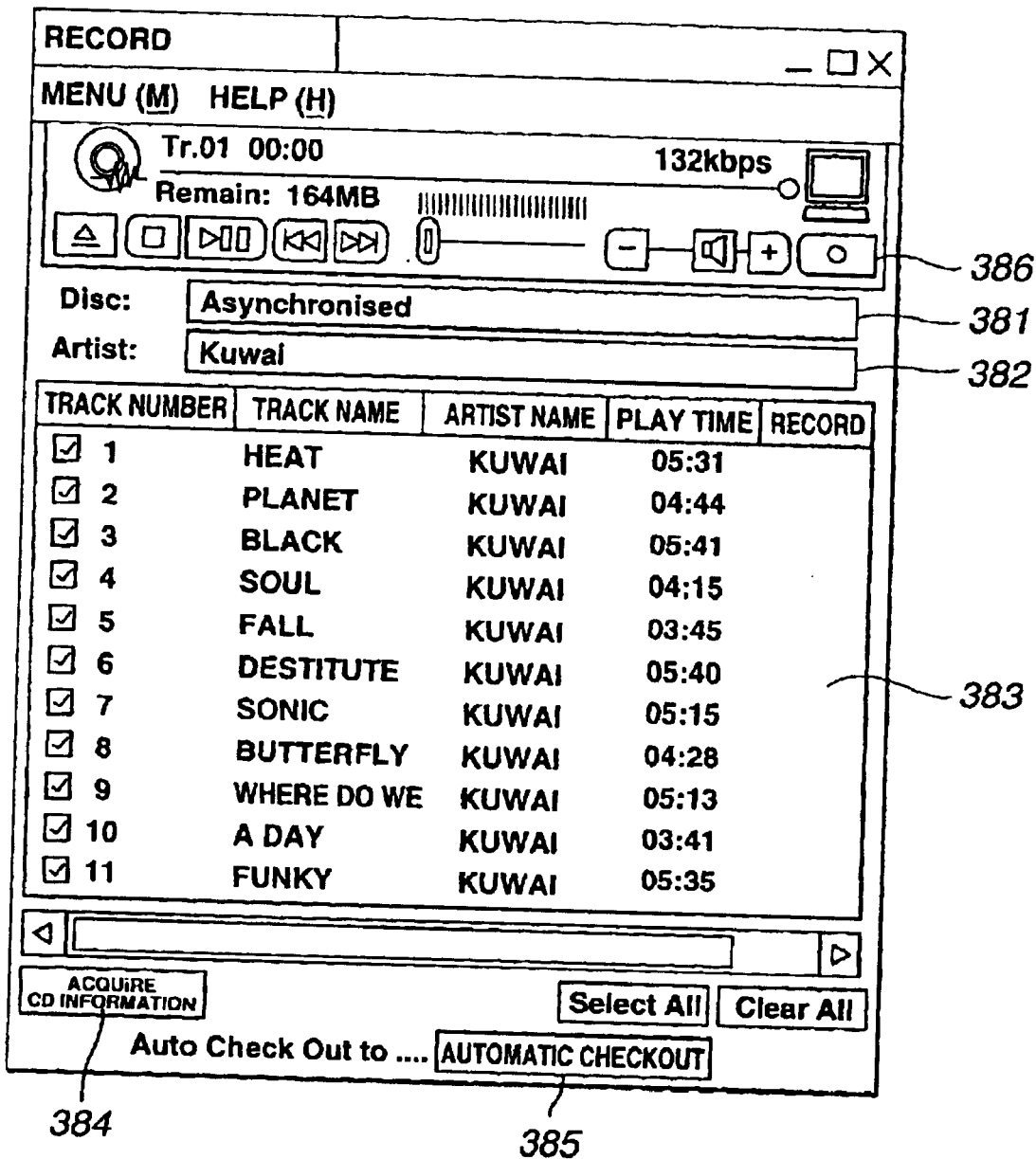
FIG. 20 explains a window the recording program has the display unit.

Referring now to FIG. 20, there is shown a window the recording program 113 has the display unit 20 display when it has received the CD information from the WWW server 5-1 with the button 384 clicked. Based on the CD information received from the WWW server 5-1, the recording program 113 will display a CD title such as "Asynchronized" for example in the field 381, and also an artist name such as "KUWAI" for example in the field 382.

Based on the CD information received from the WWW server 5-1, the recording program 113 will display content names such as "HEAT", "PLANET", "BLACK", "SOUL", etc. for example in a part of the field 383 where a content name is to be displayed, and also an artist name such as "KUWAI" for example in a part of the field 383 where an artist name is to be displayed.

Figure 21:
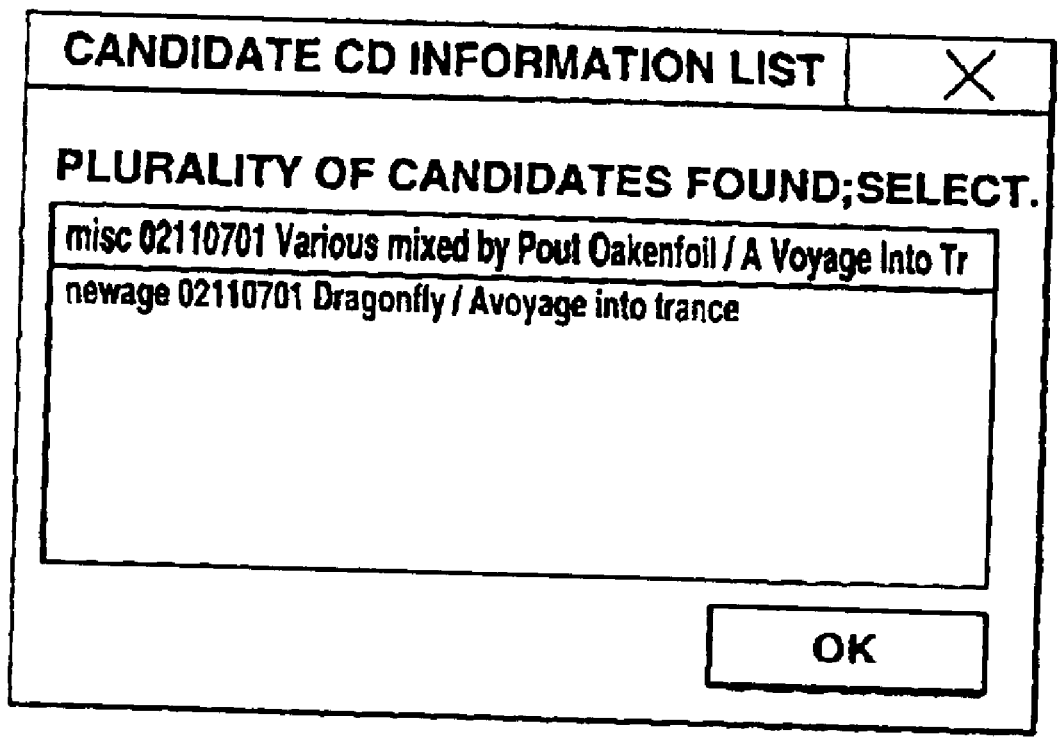
FIG. 21 explains a dialog box the recording program has the display unit.

When having received more two pieces of CD information from the WWW server 5-1, the recording program 113 will have the display unit 20 display a dialog box as shown in FIG. 21 for selection by the user of any of the CD information pieces.

Figure 22:
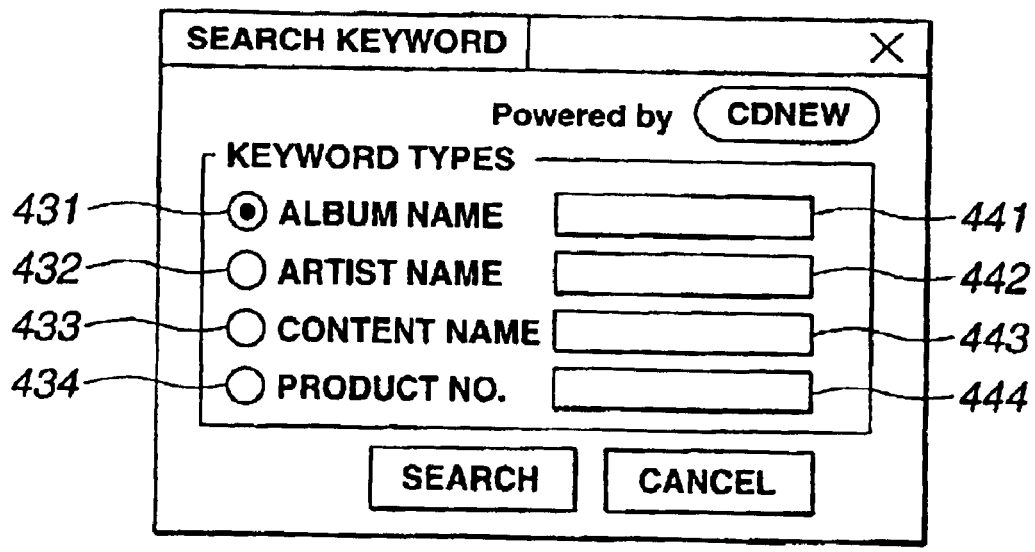
FIG. 22 explains a dialog box the recording program has the display unit.

FIG. 22 shows a dialog box the recording program 113 has the display unit 20 display when the button 384 is clicked with "CDNEW JAPAN" set in the field 401 and in which a search keyword is to be set.

As shown in FIG. 22, the dialog box has disposed therein buttons 431, 432, 433 and 434. The button 431 is to be activated by clicking for searching CD information taking an album name as a search keyword. The search keyword for the album name is set in a field 441 also disposed in the dialog box.

The button 432 is to be activated by clicking for searching CD information taking an artist name as a search keyword. The search keyword for the artist name is set in a field 442 also disposed in the dialog box.

The button 433 is to be activated by clicking for searching CD information taking a content name as a search keyword. The search keyword for the content name is set in a field 443 also disposed in the dialog box.

The button 434 is to be activated by clicking for searching CD information taking a product No. as a search keyword. The search keyword for the product No. is set in a field 444 also disposed in the dialog box.

For searching CD information, at least any one of the buttons 431 to 434 is activated.

Figure 23:
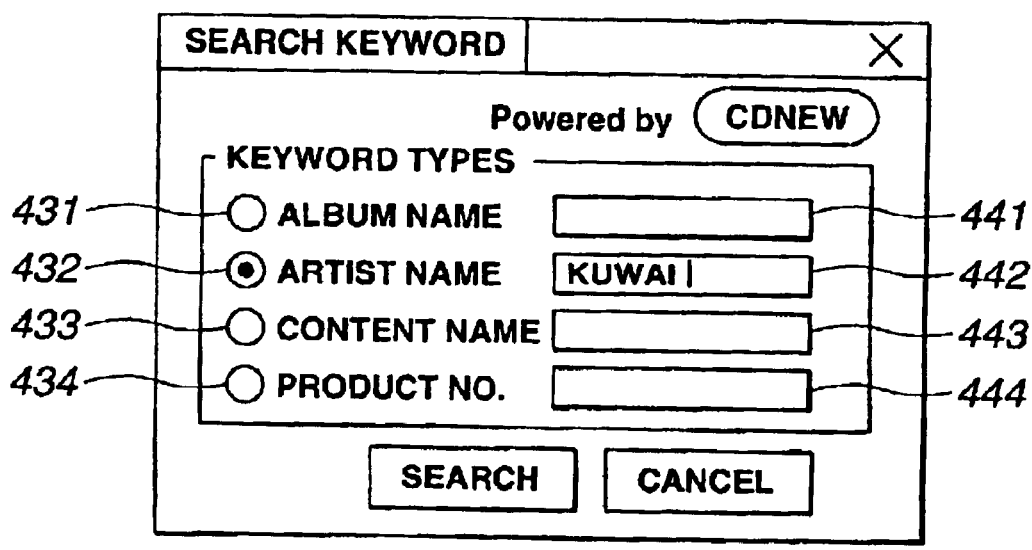
FIG. 23 explains a dialog box the recording program has the display unit.

When searching CD information taking an artist name as a search keyword as shown in FIG. 23, the button 434 is activated and a string of characters indicating the artist name such as "KUWAI" is set in the field 442.

When the search button disposed in the dialog box to set a search keyword is clicked, the recording program 113 will connect to the WWW server 5-2 based on a previously stored URL or the like, request the WWW server 5-2 for CD information following a procedure corresponding to "CDNEW JAPAN" set in the field 401 and based on the search keyword set in the dialog box, and receive the CD information from the WWW server 5-2.

Figure 24:
FIG. 24 explains a dialog box the recording program has the display unit.

The WWW server 5-2 sends the CD information along with data for displaying an image which prompts the user to purchase a CD related with the searched CD information to the personal computer 1 as shown in FIG. 24. The user of the personal computer 1 can purchase a predetermined CD via the network 2 based on the data for displaying the image which prompts the user to purchase the CD.

Figure 25:
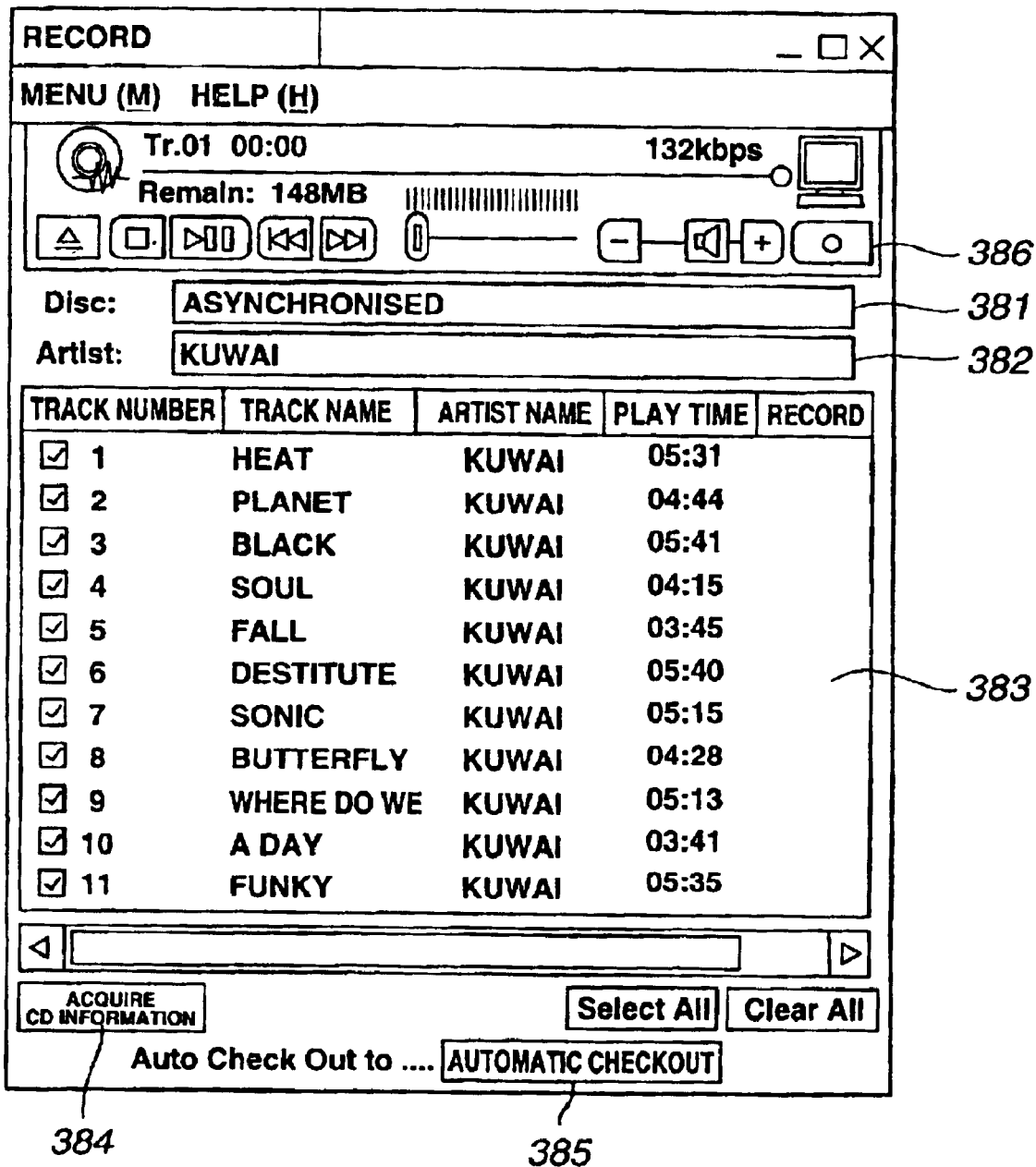
FIG. 25 explains a dialog box the recording program has the display unit.

Referring now to FIG. 25, there is shown, for explanation, a window the recording program 113 has the display unit 20 display when it has received the CD information from the WWW server 5-2 after clicking the search button 384 disposed in the dialog box to set the search keyword. Based on the CD information received from the WWW server 5-2, the recording program 113 displays a CD title such as "Asynchronized" for example in the field 381, and also an artist name such as "KUWAI" for example in the field 382.

Based on the CD information received from the WWW server 5-2, the recording program 113 will display content names such as "HEAT", "PLANET", "BLACK", "SOUL", etc. for example in a part of the field 383 where a content name is to be displayed, and also an artist name such as "KUWAI" for example in a part of the field 383 where an artist name is to be displayed.

After the recording program 113 receives a predetermined CD information, it will store the CD information into the directory in the HDD 21, designated in the field 404.

Figure 26:
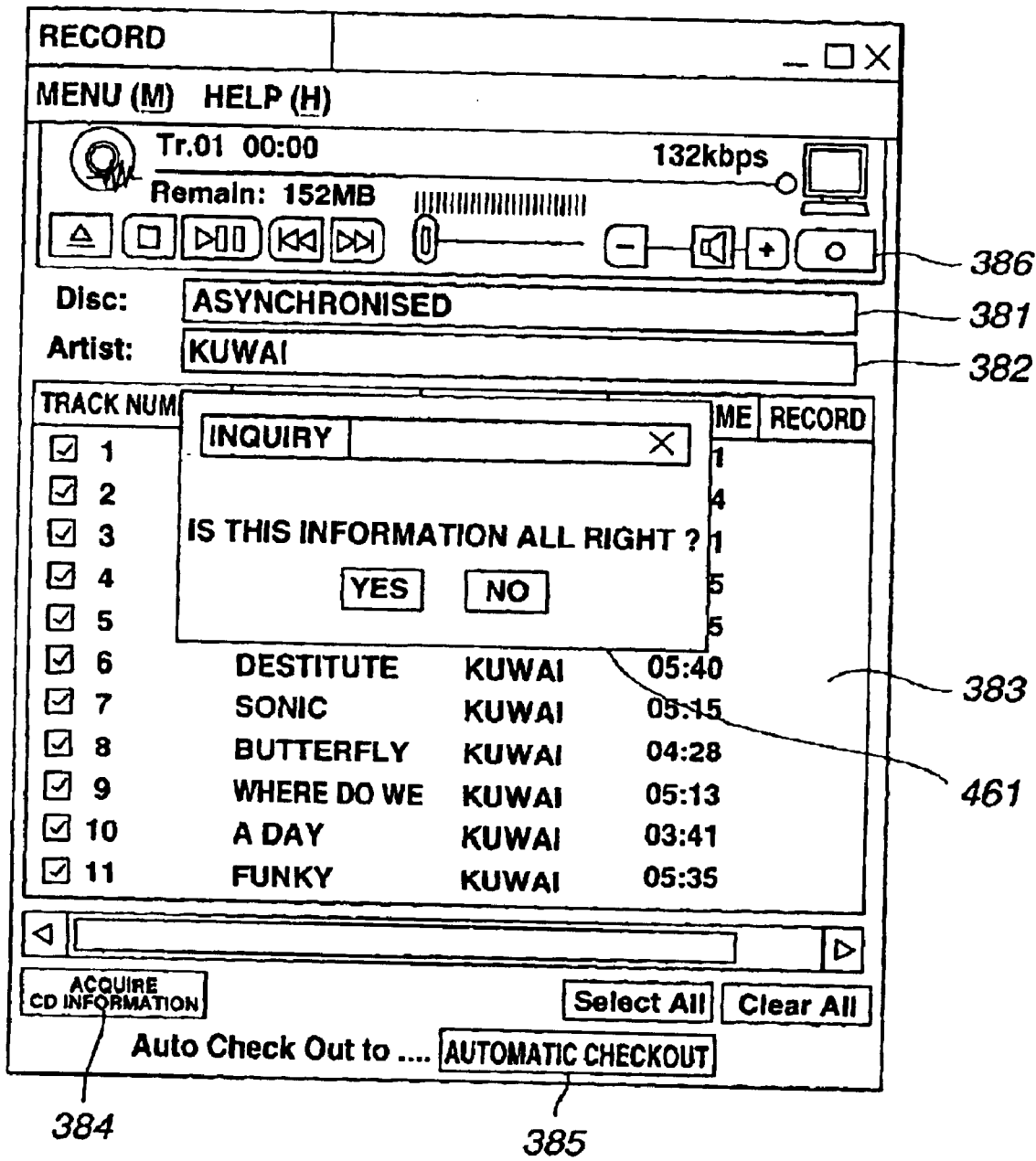
FIG. 26 explains a dialog box the recording program has the display unit.

When instructed to acquire CD information by the user clicking the button 384 or the like, the recording program 113 will first search the directory in the HDD 21, designed in the field 404. When the CD information is stored in the directory in the HDD 21, designated in the field 404, the recording program 113 will display a dialog box 461 shown in FIG. 26 to prompt the user to select whether the CD information stored in the directory designated in the field 404 is to be used.

When the button 386 for instructing to start recording of any one of the contents displayed in the window the recording program 113 has the display unit 20 display is clicked, the recording program 113 will read the content from a CD set in the drive 22 and supply the content read from the CD along with the CD information to the content management program 111. The compression method conversion program 134 in the content management program 111 will compress the content supplied from the recording program 113 by a predetermined compression method, and the encryption program 135 will encrypt the compressed content. The usage rule conversion program 136 generates usage rule data corresponding to the compressed and encrypted content.

The content management program 111 will thus supply the compressed and encrypted content along with the usage rule data to the content data base 114.

The content data base 114 generates the content file 161 and usage rule file 162 corresponding to a content received from the content management program 111, and stores the content into the content file 161 and the usage rule data into the usage rule file 162.

When the content and usage rule data corresponding to the content are stored in the content data base 114, the content management program 111 will supply the CD information and usage rule data received from the recording program 113 to the display/operation instruction program 112.

The display/operation instruction program 112 will generate the original package display data 201 and content display data 221 based on the usage rule data and CD information corresponding to the content stored in the content data base 114 by the recording.

Figure 27:
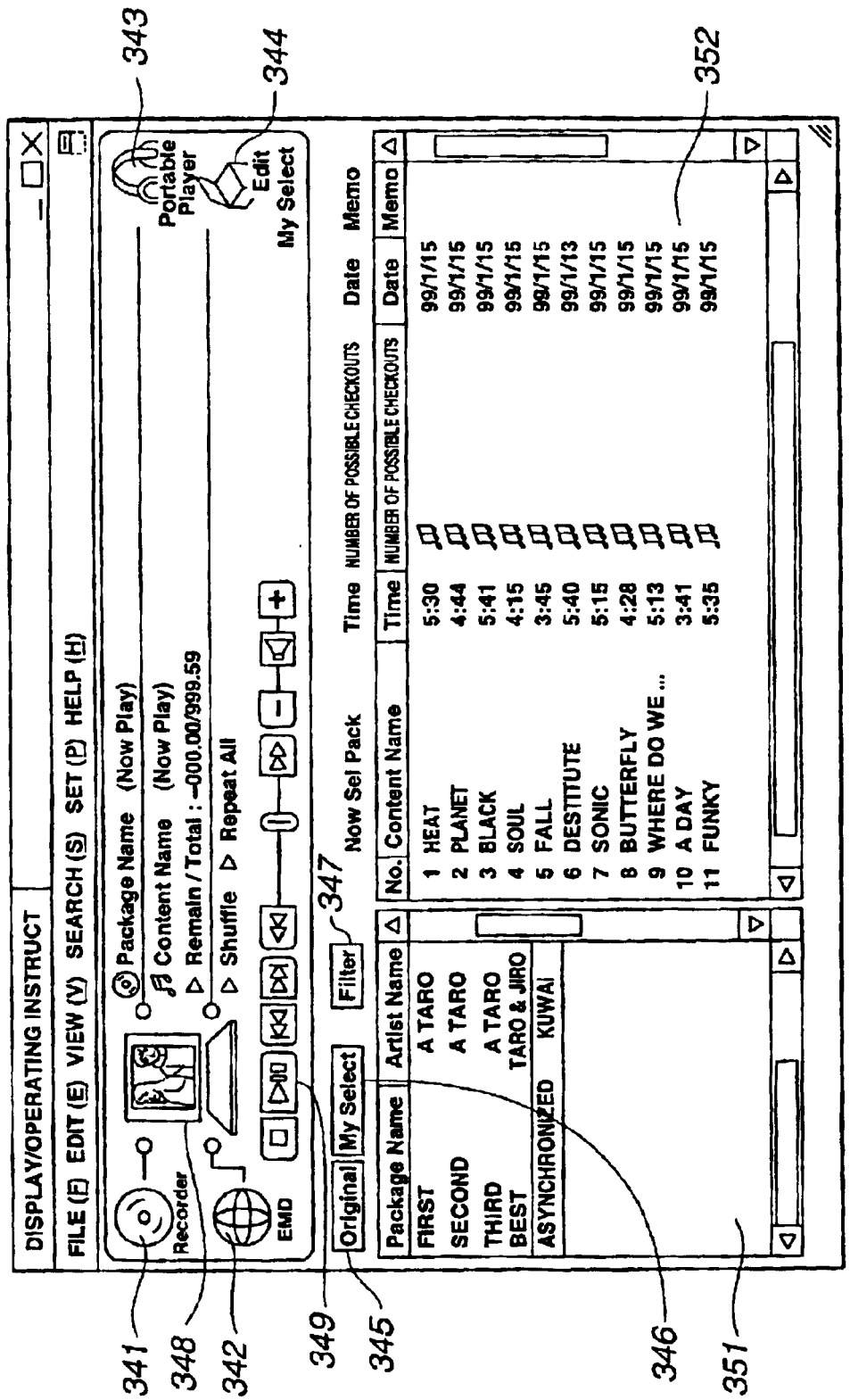
FIG. 27 shows an example of the display/operation instruction window.

As shown in FIG. 27, when the button 345 is selected, the name of the original package (CD title) corresponding to the content stored in the content data base 114 by the recording is displayed in the field 351 in the display/operation instruction window. When the package is selected, a content name corresponding to the content read from the CD is displayed in the field 352.

Figure 28:
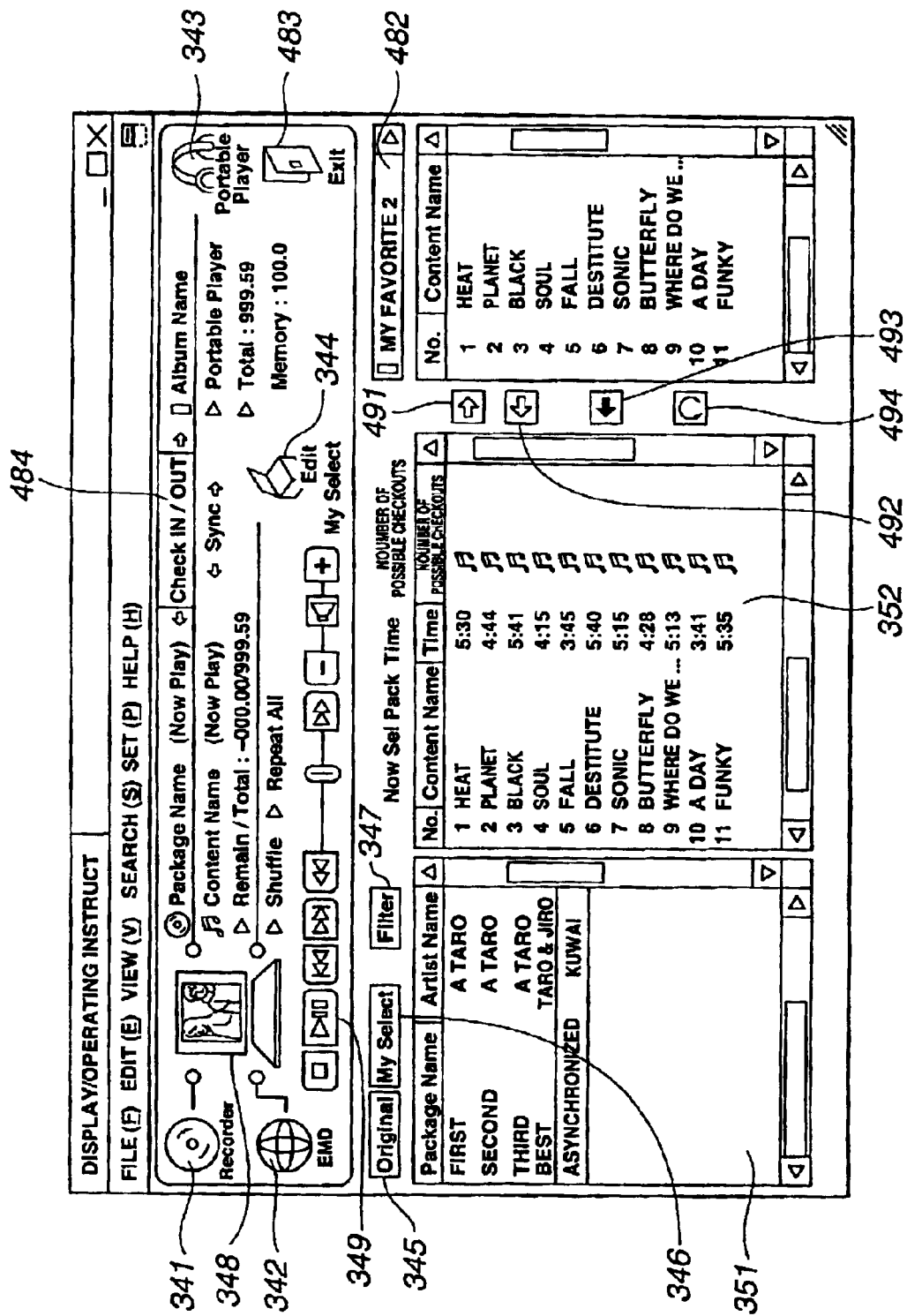
FIG. 28 shows another example of the display/operation instruction window.

When the content read from the CD is recorded in the content data base 114 and the button 385 in the window the recording program 113 has the display unit 20 display is selected (activated), the display/operation instruction program 112 displays, in the display/operation instruction window, a field 481 in which the name of a content stored in a previously designated one of the portable devices 6-1 to 6-3 is to be displayed, as shown in FIG. 28.

Corresponding to each music title of the content, a symbol indicating if the content can check in to the personal computer 1-1 is displayed on the leftmost of the field 481. For example, a "○" positioned on the leftmost of the field 481 indicates that the content corresponding to the music name of the content can check in to the personal computer 1-1, that is, the content has been checked out from the personal computer 1-1. As exemplified in FIG. 29, a "x" positioned on the leftmost of the field 481 indicates that the content corresponding to the music name of the content cannot check in to the personal computer 1-1, that is, the content has not been checked out from the personal computer 1-1, but instead, e.g., the content has been checked out from the personal computer 1-2.

The display/operation instruction program 112 has the content management program 111 check out the content read from the CD and recorded in the content data base 114 to any of the portable devices 6-1 to 6-3, previously designated.

Thus, just with the button 385, in the window the recording program 113 has the display unit 20 display, being kept activated, when the content read from the CD is recorded into the content data base 114, the personal computer 1 can check out the content read from the CD to any of the portable devices 6-1 to 6-3, previously designated.

When the display/operation instruction program 112 has displayed the field 481 in the display/operation instruction window, it also displays, in the display/operation instruction window, a field 482 in which the name of a portable package to which a content stored in any of the portable devices 6-1 to 6-3, previously designated belongs (namely, a package to which a content stored in any of the portable devices 6-1 to 6-3 belongs) is displayed, a button 483 to close the field 481, and a button 484 to execute check-in or checkout.

Further, when the display/operation instruction program 112 has displayed the field 481 in the display/operation instruction window, it displays, in the display/operation instruction window, also a button 491 to set checkout of a content corresponding to content name selected in the field 352, a button 492 to set check-in of a content corresponding to a content name selected in the field 481, a button 493 to set check-in of all contents corresponding to content names displayed in the field 481, and a button 494 to cancel the setting of check-in or checkout.

Next, setting of check-in or checkout and execution of the check-in or checkout will be described below:

When the button 343 for displaying a filed in which check-in or checkout is to be set is clicked, the display/operation instruction program 112 displays, in the display/operation instruction window, the field 481 in which the name of a content stored in any of the portable devices 6-1 to 6-3, previously designated is to be displayed.

Figure 29:
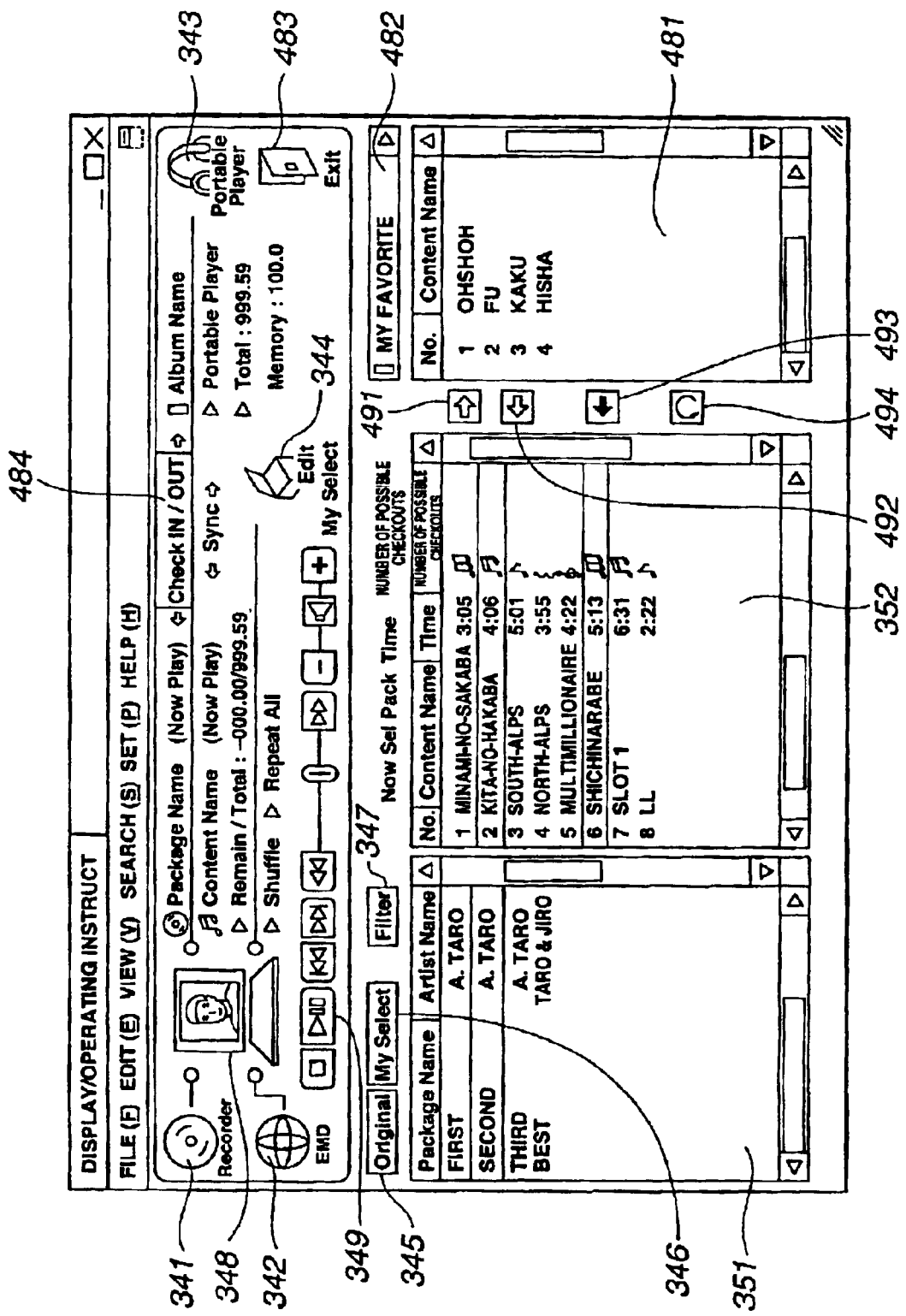
FIG. 29 shows still another example of the display/operation instruction window.
Figure 30:
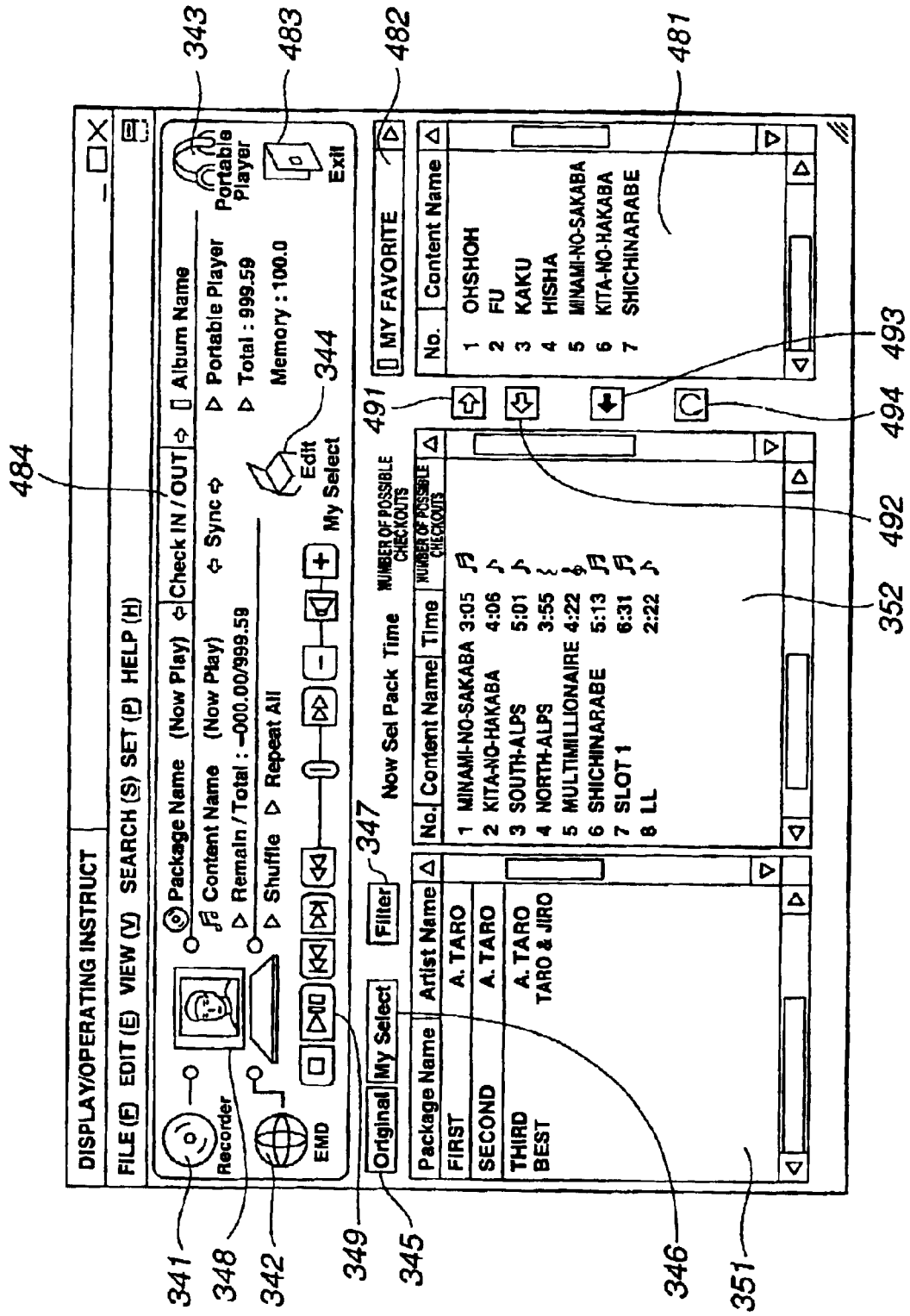
FIG. 30 shows still another example of the display/operation instruction window.

For example, when content names "MINAMI-NO-SAKABA", "KITA-NO-HAKABA" and "SHICHI-NARABE" displayed in the field 352 are selected as shown in FIG. 29 and the button 491 is clicked, the display/operation instruction program 112 sets checkout of contents corresponding to the content names "MINAMI-NO-SAKABA", "KITA-NO-HAKABA" and "SHICHINARABE", respectively, and displays the content names "MINAMI-NO-SAKABA", "KITA-NO-HAKABA" and "SHICHINARABE" in the field 481, as shown in FIG. 30.

Corresponding to the content name "OHSHOH", a "○" positioned on the leftmost of the field 481 indicates that the content corresponding to the content name "OHSHOH" can check in to the personal computer 1-1. That is, the content corresponding to the content name "OHSHOH" is one that has been checked out from the personal computer 1-1.

Corresponding to the content name "FU", a "x" positioned on the leftmost of the field 481 indicates that the content corresponding to the content name "FU" cannot check in to the personal computer 1-1. That is, the content corresponding to the content name "FU" is not one that has been checked out from the personal computer 1-1, but instead, e.g., one that has been checked out from the personal computer 1-2.

Corresponding to the content name "KAKU", a "x" positioned on the leftmost of the field 481 indicates that the content corresponding to the content name "KAKU" cannot check in to the personal computer 1-1. That is, the content corresponding to the content name "KAKU" is not one that has been checked out from the personal computer 1-1, but instead, e.g., one that has been checked out from the personal computer 1-2.

Corresponding to the content name "HISHA", a "○" positioned on the leftmost of the field 481 indicates that the content corresponding to the content name "HISHA" can check in to the personal computer 1-1. That is, the content corresponding to the content name "HISHA" is one that has been checked out from the personal computer 1-1.

As the content corresponding to the content name "MINAMI-NO-SAKABA", the content corresponding to the content name "KITA-NO-HAKABA" and the content corresponding to the content name "SHICHINARABE" are ones that have been checked out from the personal computer 1-1, a "○" is displayed on the leftmost of the field 481, corresponding to each of the content name "MINAMI-NO-SAKABA", the content name "KITA-NO-HAKABA" and the content name "SHICHINARABE".

At this time, the display/operation instruction program 112 changes a number of possible checkouts for the content name "MINAMI-NO-SAKABA" in the field 352 from three one-eighth notes indicating three checkouts to two one-eighth notes indicating two checkouts, a number of possible checkouts for the content name "KITA-NO-HAKABA" also in the field 352 from two one-eighth notes indicating two checkouts to a one-eighth note indicating one checkout, and a number of possible checkouts for the content name "SHICHINARABE" also in the field 352 from three one-eighth notes indicating three checkouts to two one-eighth notes indicating two checkouts.

Figure 31:
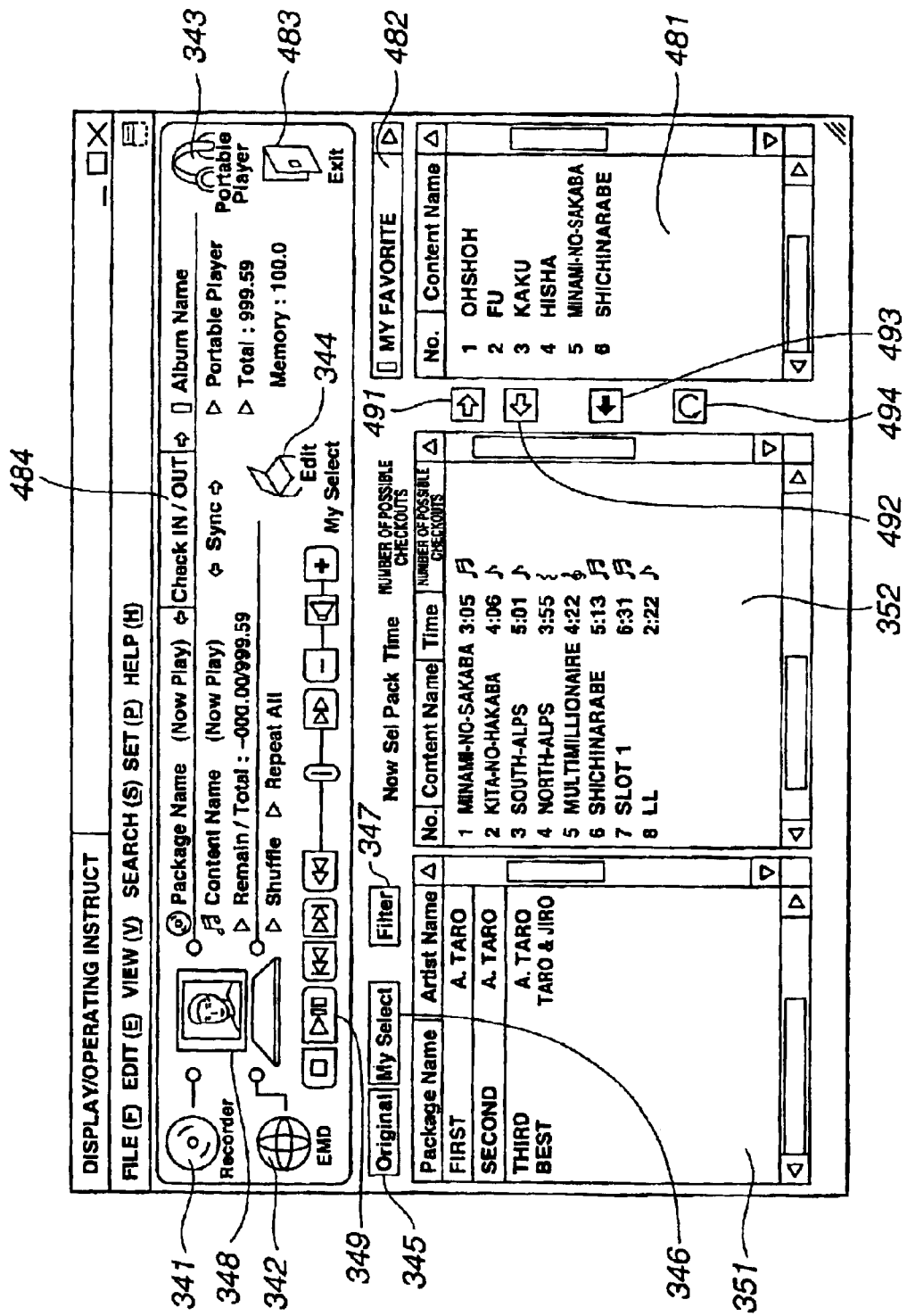
FIG. 31 shows still another example of the display/operation instruction window.

For example, when in the status shown in FIG. 30, the content name "KITA-NO-HAKABA" is selected in the field 481 and the button 492 is clicked, the display/operation instruction program 112 will set check-in of the content corresponding to the content name "KITA-NO-HAKABA" and erase this content name in the field 481 as shown in FIG. 31.

At this time, the display/operation instruction program 112 will change the number of possible checkouts for the content name "KITA-NO-HAKABA" displayed in the field 352 from a one-eighth note indicating one checkout to two one-eighth notes indicating two checkouts.

Also, by dragging and dropping a package name displayed in the field 351 to the field 481, checkout of all contents belonging to a package corresponding to the dragged and dropped package name is set.

With setting of check-in or checkout only by operating the buttons 491 to 494, the personal computer 1 will not execute any check-in or checkout.

When the button 484 is clicked after check-in or checkout is set by operating the buttons 491 to 494, the display/operation instruction program will have the content management program 111 execute the check-in or checkout. That is, with the button 484 clicked, the display/operation instruction program 112 will have the content management program 111 send either a content to any of the portable batteries 6-1 to 6-3 or a predetermined command corresponding to check-in (for example, a command for erasing a predetermined content stored in any of the portable devices 6-1 to 6-3), based on the check-in or checkout setting, and erase usage rule data stored in the usage rule file 162 corresponding to the sent content or command.

When check-in or checkout is done, the display/operation instruction program 112 updates a history data stored in the history data file correspondingly to the sent content or command. The history data includes information for identification of the checked-in or checked-out content or data at which the content has been checked in or out, and the name of any of the portable devices 6-1 to 6-3 to which the content has been checked out.

Since check-in or checkout can be set in a short time, the user can quickly know the status after execution of check-in or checkout. Thus, the number of check-in's or checkouts which takes time can be reduced to shorten the entire time necessary for check-in or checkout (including the time for setting and execution of check-in or checkout).

Next, edition of My Select package such as addition of a desired content o a predetermined My Select package will be described.

Figure 32:
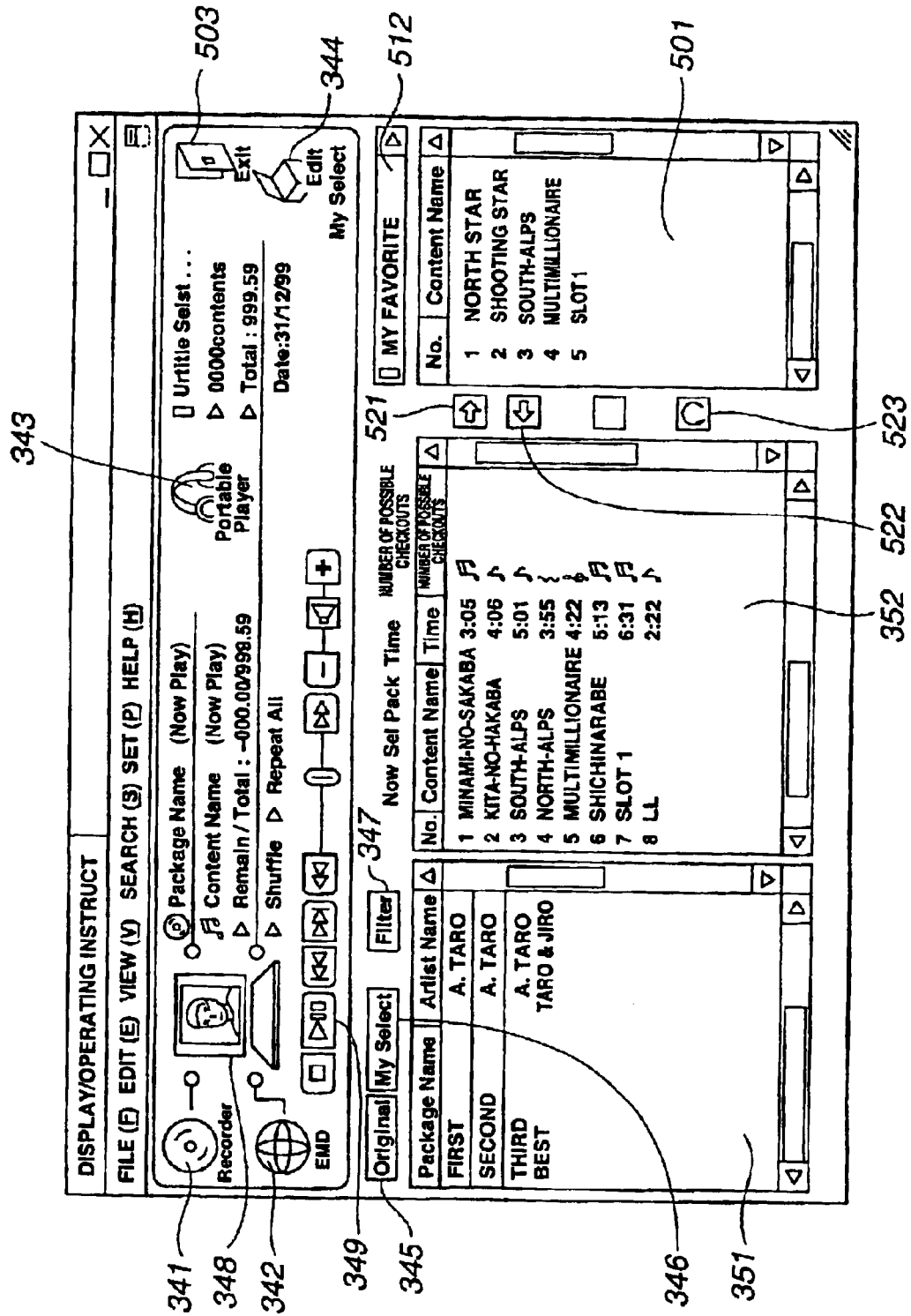
FIG. 32 shows still another example of the display/operation instruction window.

As shown in FIG. 32, when the button 344 for displaying a field in which a My Select package is edited is clicked, the display/operation instruction program 112 displays, in the display/operation instruction window, a field 501 in which a content name corresponding to a content belonging to a predetermined My Select package is to be indicated.

At this time, the display/operation instruction program 112 displays, in the display/operation instruction window, a field 502 in which the name of a selected My Select package (stored in any of the package display data 251-1 to 251-S) is to be displayed. When the name of a My Select Package to be edited is set in the field 502, the display/operation instruction program 112 displays, in the field 501, a content name corresponding to the My Select package having the package name (stored in a content display data 221 related with any of the package display data 252-1 to 252-S).

Further, when the display/operation instruction program 112 displays the field 501 in the display/operation instruction window, it will display, in the display/operation instruction window, a button 521 for an operation to have a content corresponding to a content name selected in the field 352 also belong to a My Select package whose name is displayed in the field 502 (to store a content ID of the selected content display data 221 into any of the package display data 251-1 to 251-S), a button 522 for an operation to erase the content corresponding to the content name selected in the field 501 from the My Select package whose name is displayed in the field 502 (to erase the content ID of the selected content display data 221 from any of the package display data 251-1 to 251-S), and a button 523 for an operation to cancel an preceding operation (to have the content also belong to the My Select Package or erase the content from the My Select package).

For example, by displaying the field 501 in the display/operation instruction window, the user can have, belong to the My Select package whose package name "My Best 1" is displayed in the field 502, a content named "North Star", content named "Shooting Star", content named "South-Alps", content named "Multimillionaire" and a content named "Slot 1".

That is to say, in response to a predetermined operation, the display/operation instruction program 112 stores into the package display data 251 in which the package name "My Best 1" is stored the IDs for the content named "North Star", content named "Shooting Star", content named "South-Alps", content "Multimillionaire", and the content named "Slot 1", respectively.

Also, when the package name displayed in the field 351 is dragged and dropped to the field 501, all contents belonging to a package corresponding to the dragged and dropped package can be made to belong to the My Select package whose name is displayed in the field 502.

Figure 33:
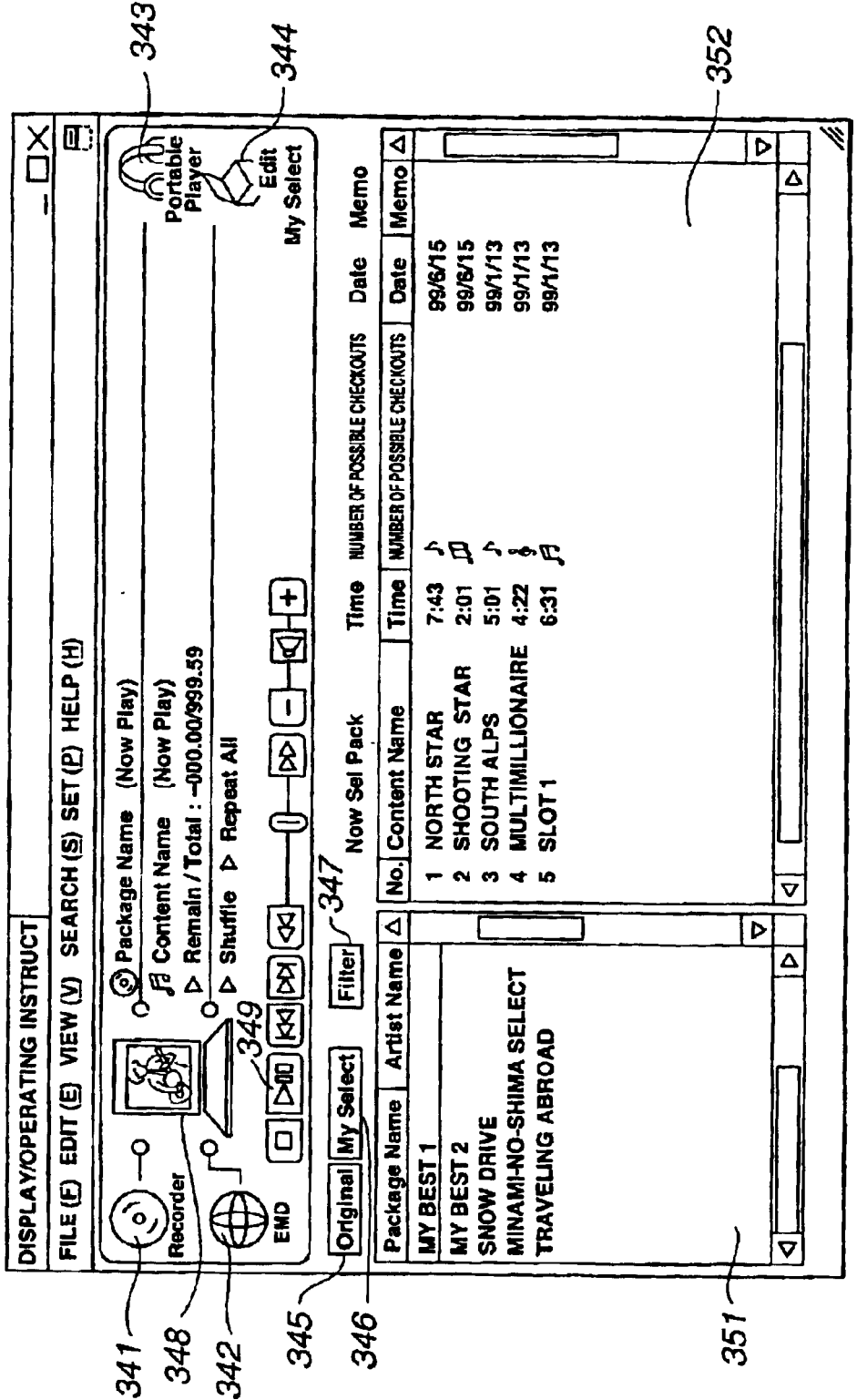
FIG. 33 shows still another example of the display/operation instruction window.

When the button 346 disposed in the display/operation instruction window to display, in the field 351, data corresponding to a My Select package is activated, the display/operation instruction program 112 will display, in the field 351, package names corresponding to the My Select package (e.g., "My Best 1", "My Best 2", "Snow Drive", "MINAMI-NO-SHIMA-Select", "Traveling Abroad", etc.), and in the field 352 names of contents belonging to a My Select package corresponding to a selected package name, as shown in FIG. 33.

When the name of a predetermined content displayed in the field 352 is selected and the erasing operation is made while data corresponding to a My Select package has been displayed in the field 351 with the button 346 activated, the display/operation instruction program 112 will erase only data of a content ID corresponding to a content belonging to the package included in the package display data 251 but not any predetermined content stored in the contend data base 114.

Figure 34:
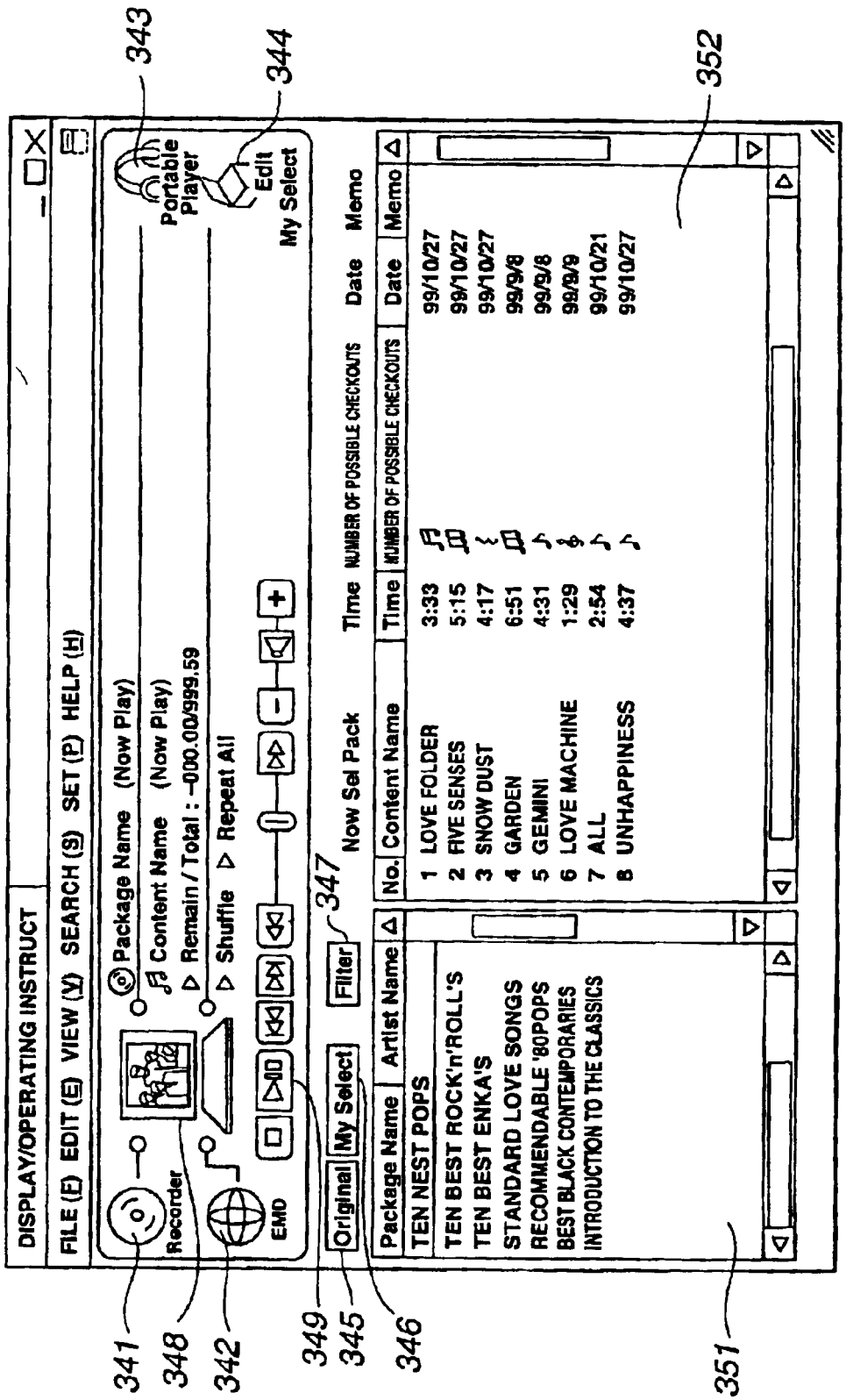
FIG. 34 shows still another example of the display/operation instruction window.

Next, display corresponding to a filtering package, and relating the filtering package with a desired content will be described:

When the button 347 disposed in the display/operation instruction window to display, in the field 351, data corresponding to a filtering package is activated, the display/operation instruction program 112 displays, in the field 351, package names corresponding to the filtering package (e.g., "Ten best pops", "Ten Best rock 'n' roll's", "Ten best ENKA's", "Standard love songs", "Recommendable '80pops", etc.), and, in the field 352, names of contents belonging to the filtering package corresponding to the selected package name, as shown in FIG. 34.

Figure 35:
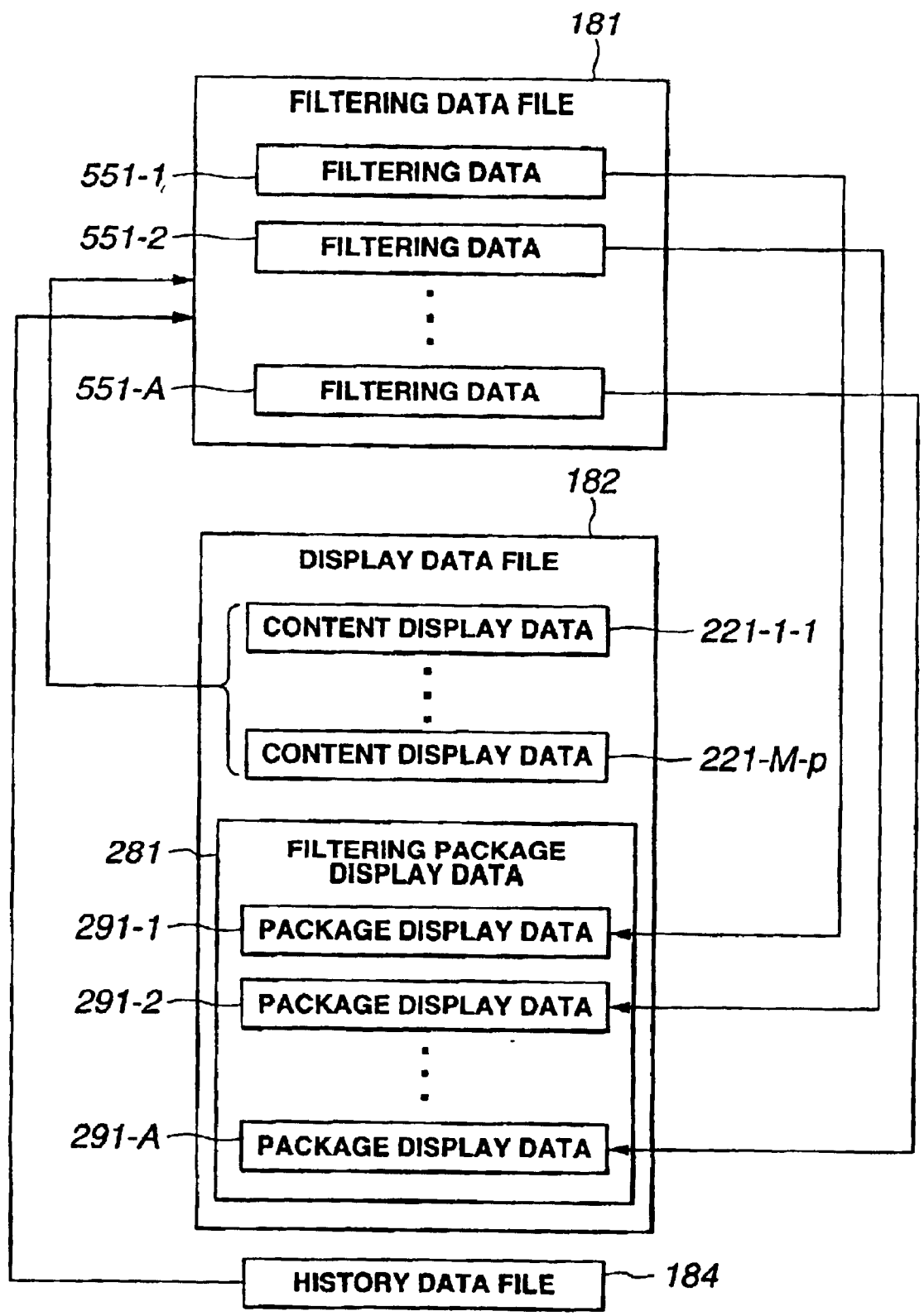
FIG. 35 explains the generation of filtering package.

Referring now to FIG. 35, there is explained the generation of a filtering package. The display/operation instruction program 112 generates package display data 291-1 based on the content display data 221-1-1 to 221-M-p stored in the display data file 182 and history data stored in the history data file 184 or any of them and filtering data 551-1 stored in the filtering data filter 181.

The package display data 291-1 has stored therein ID for a content belonging to a filtering package corresponding thereto.

For example, the package display data 291-1 stores IDs for predetermined 10 contents (e.g., ones corresponding to ten best pops) designated with the filtering data 551-1.

The display/operation instruction program 112 generates package display data 291-2 based on the content display data 221-1-1 to 221-M-p stored in the display data file 182 and history data stored in the history data file 184 or any of them and filtering data 551-1-2 stored in the filtering data filter 181.

The package display data 291-2 has stored therein ID for a content belonging to a filtering package corresponding thereto.

For example, the package display data 291-2 stores IDs for contents whose names contain a predetermined string of characters (e.g., names of contents including characters "love") designated with the filtering data 551-2.

Similarly, the display/operation instruction program 112 generates package display data 291-3 to 291-A. Each of the package display data 291-3 to 291-A has stored therein ID for a content belonging to a filtering package corresponding thereto.

For example, the package display data 291-3 stores IDs for 10 contents selected based on the history data stored in the history data file 184 and which have been checked out most frequency for the last week.

Also the package display data 291-4, for example, stores IDs for 10 contents selected at random and whose total of play times counts 60 minutes.

In this way, the display/operation instruction program 112 generates package display data 291-2 based on the content display data 221-1-1 to 221-M-p stored in the display data file 182 and history data stored in the history data file 184 or any of them and filtering data 551-1-1 to 551-1-A stored in the filter data file 181.

The filtering data 551-1 to 551-A are down-loaded from a predetermine server via the network 2, or supplied as recorded in a predetermined CD from the drive 22. Also, the user himself can generate the filtering data 551-1 to 551-A.

For example, operating the personal computer 1 to generate a new filtering package by down-loading and updating the filtering data 551-1 to 551-A from more than one server via the network 2 at a predetermined time every day without modification of contents recorded in the content data base 114, the user can use the new generated filtering package for enjoying different combinations of contents.

Figure 36:
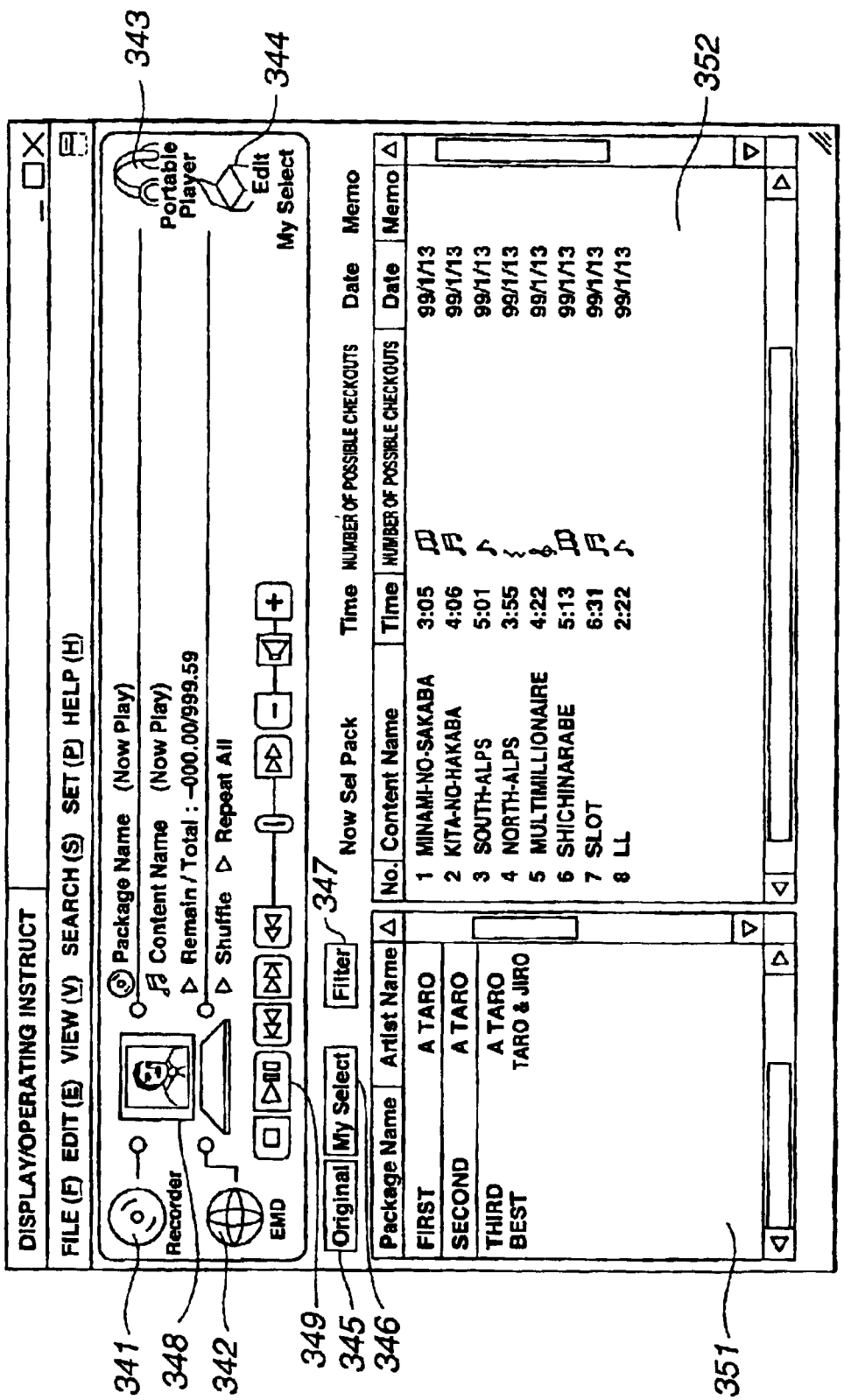
FIG. 36 shows an example of the display/operation instruction window.

Next, an image displayed in the field 348 will be described below. As shown in FIG. 36, when a package name displayed in the field 351 is selected while a content name displayed in the field 352 has not been selected (therefore, no content has not been played back), the display/operation instruction program 112 displays, in the field 348, an image related with a package corresponding to the selected package name.

That is, referring to data indicating the image file name stored in the package display data 211, 251 or 291, the display/operation instruction program 112 selects any one of the image files 183-1 to 183-K, reads image data stored in the selected one of the image files 183-1 to 183-K, and displays, in the field 348, an image corresponding to the image data.

For example, when the package name "Second" of the original package is selected while the content name displayed in the field 352 is not selected, he display/operation instruction program 112 refers to data indicating an image file name stored in the package display data 211, reads image data stored in a predetermined one of the image files 183-1 to 183-K, and displays, in the field 348, an image corresponding to the image data.

Also, when a predetermined image is dragged and dropped to the field 348 with the package name displayed in the field 351 being selected and the content name displayed in the field 352 being not selected, the display/operation instruction program 112 makes the dragged and dropped image correspond to a package corresponding to the selected package name.

That is, the display/operation instruction program 112 converts the coding method by which the dragged and dropped image has been coded to a predetermined method (e.g., JPEG (Joint Photographic Experts Group) or the like), adjusts the size of the image (e.g., to 30 pixels by 30 pixels or the like), subtracts the colors (e.g., 256 colors or the like), records the image into the image file 183, and records the name of the image file 183 in which the image has been recorded as data indicating any image file name in the package display data 211, 251 or 291 corresponding to the package name.

Figure 37:
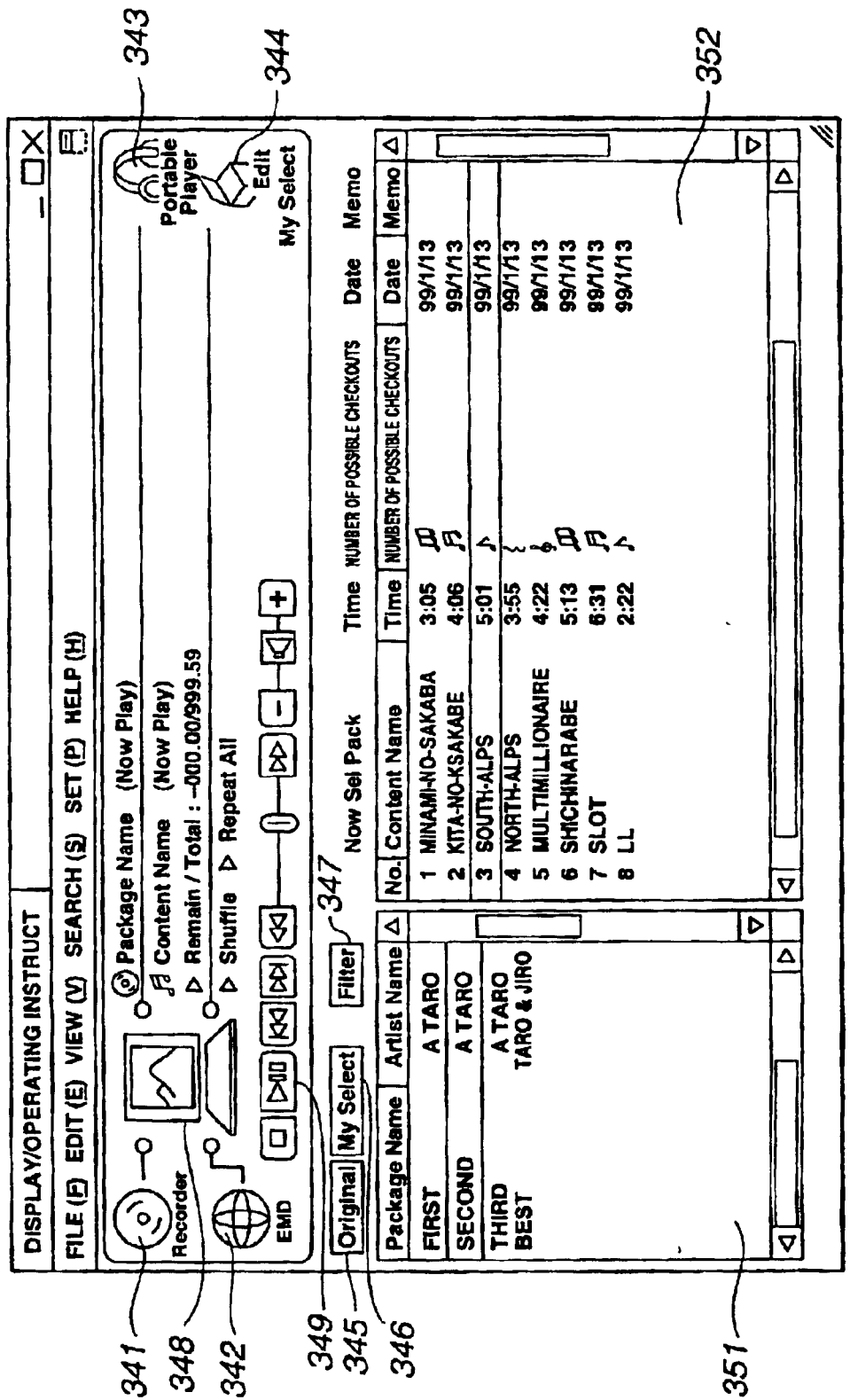
FIG. 37 shows another example of the display/operation instruction window.

As shown in FIG. 37, when the content name displayed in the field 352 is selected while no content has been played back, the display/operation instruction program 112 displays, in the field 348, an image related with a content corresponding to the selected content name. That is to say, the display/operation instruction program 112 refers to data indicating an image file name stored in the content display data 221 corresponding to the content corresponding to the selected content name, reads image data stored in a predetermined one of the image files 183-1 to 183-K, and displays, in the filed 348, an image corresponding to the image data.

For example, when the package name "Second" of the original package is selected and the content name "South-Alps" displayed in the field 352 is selected while the content "South-Alps" has not been played back, the display/operation instruction program 112 refers to a corresponding image file stored in the content display data 221 corresponding to a content corresponding to the content name "South-Alps", reads image data stored in a predetermine one of the image files 183-1 to 183-K, and displays, in the field 348, an image corresponding to the image data.

At this time, when the button 345 is activated while data indicating an image file name is not set in the content display data 221 corresponding to a content corresponding to a selected content name, the display/operation instruction program 112 refers to data indicating an image file name stored in the content display data 221 to which the content belongs, reads image data stored in a predetermine one of the image files 183-1 to 183-K, and displays, in the field 348, an image corresponding to the image data.

Similarly, when the button 346 is activated while no corresponding image file is set in the content display image 221 corresponding to a content corresponding to a selected content name, the display/operation instruction program 112 refers to data indicating an image file name stored in the package display data 251 to which the content belongs, reads image data stored in a predetermine one of the image files 183-1 to 183-K, and displays, in the field 348, an image corresponding to the image data.

Similarly, when the button 347 is activated while no corresponding image file is set in the content display data 221 corresponding to a content corresponding to a selected content name, the display/operation instruction program 112 refers to data indicating an image file name stored in the package display data 291 to which the content belongs, reads image data stored in a predetermine one of the image files 183-1 to 183-K, and displays, in the field 348, an image corresponding to the image data.

Also, when a predetermined image is dragged and dropped to the field 348 while the content name displayed in the field 352 is selected, the display/operation instruction program 112 relates the dragged and dropped image with a content corresponding to the selected content name. Namely, the display/operation instruction program 112 converts the coding method by which the dragged and dropped image has been coded to a predetermined one, adjusts the size of the image, subtracts the colors, records the image into the image file 183, and records the d name of the recorded image file 183 in which the image has been stored as data indicating any image file name in the package display data 221 corresponding to the content name.

Figure 38:
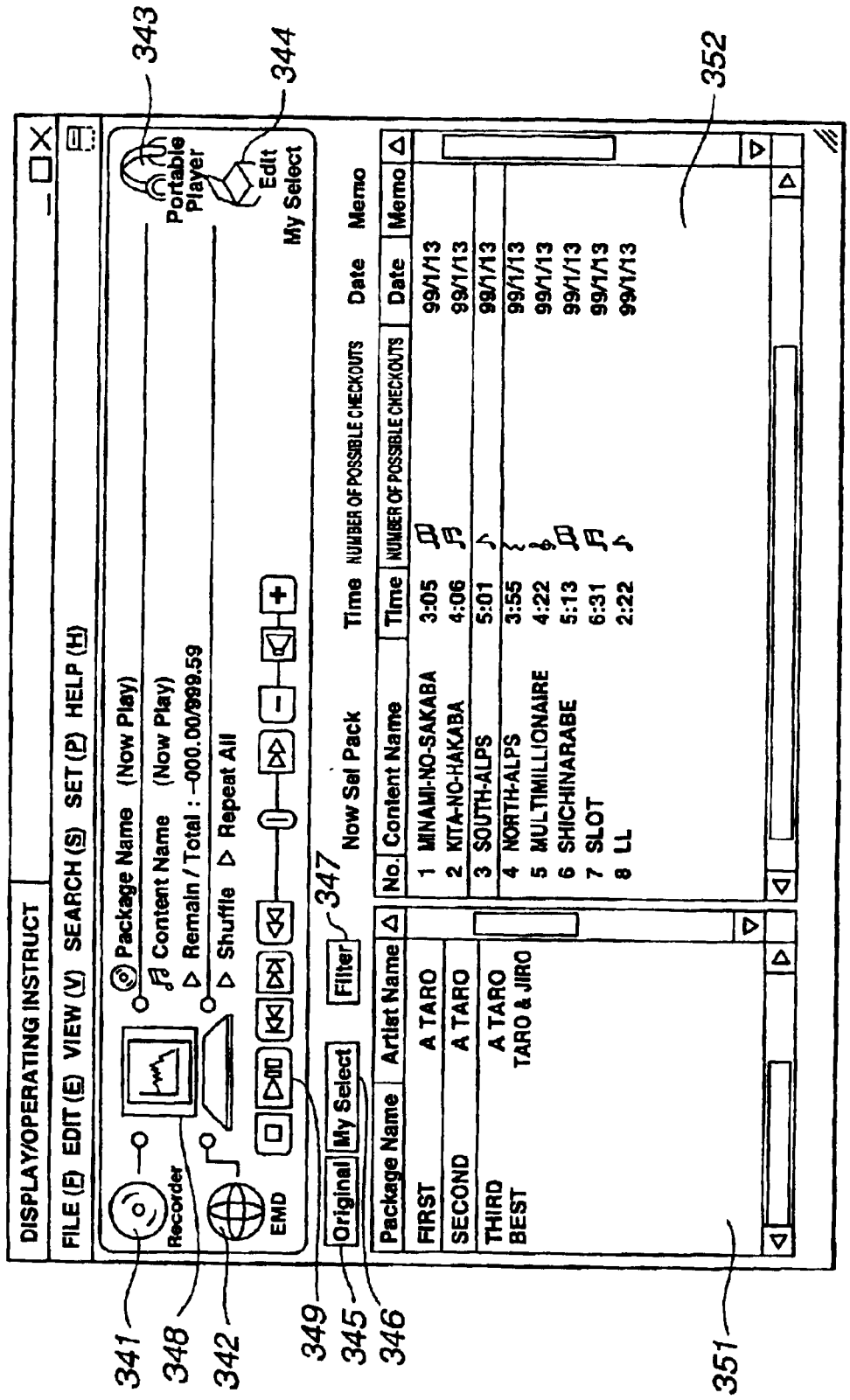
FIG. 38 shows still another example of the display/operation instruction window.

As shown in FIG. 38, when a content corresponding to a content name displayed in the field 352 has been played back (when a sound has been outputted from the speaker 24), the display/operation instruction program 112 displays, in the field 348, an image indicating a signal level in each frequency band (e.g., in each octave) of the output sound (that is a so-called image on a spectrum analyzer).

Figure 39:
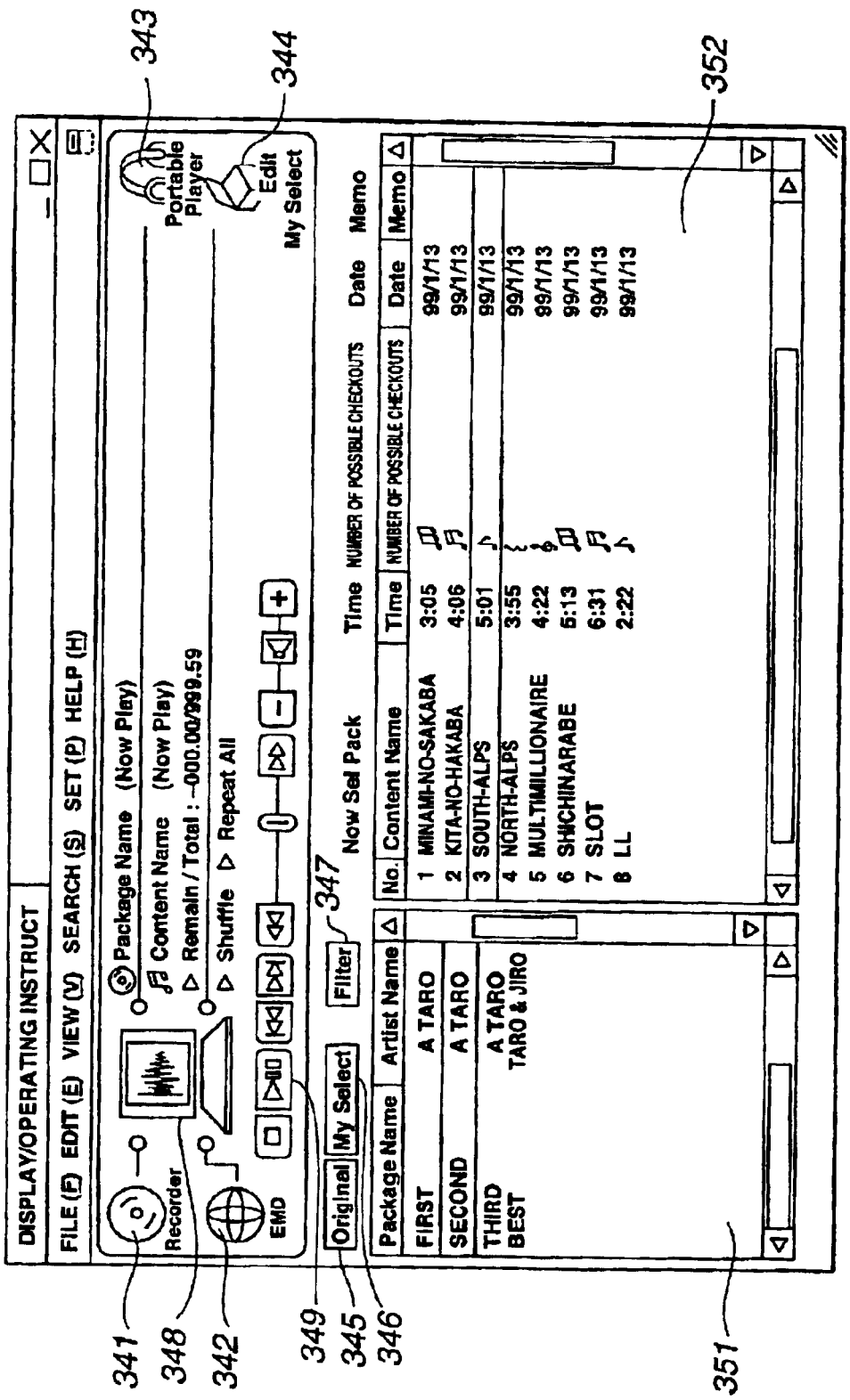
FIG. 39 shows still another example of the display/operation instruction window.

Also as shown in FIG. 39, when a content corresponding to a content name displayed in the field 352 has been played back according to a user's setting, the display/operation instruction program 112 displays, in the field 348, an image indicating a signal level corresponding to the time lapse of the output sound during a predetermined period.

Figure 40:
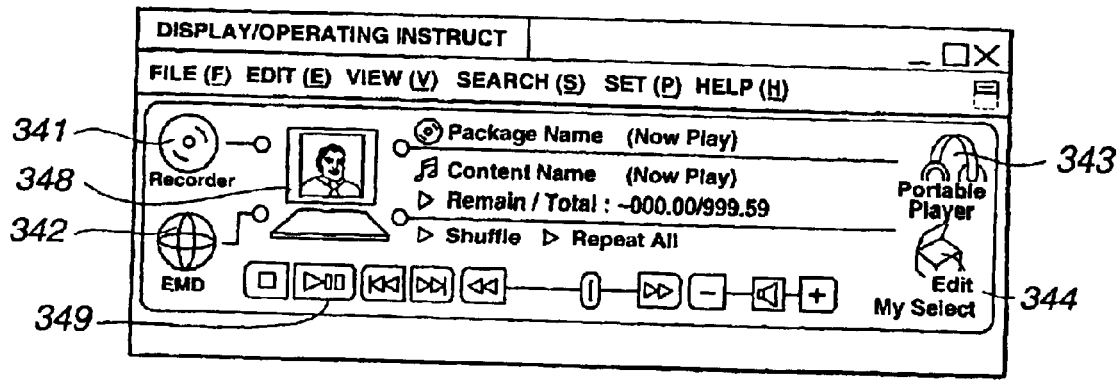
FIG. 40 shows still another example of the display/operation instruction window.
Figure 41:
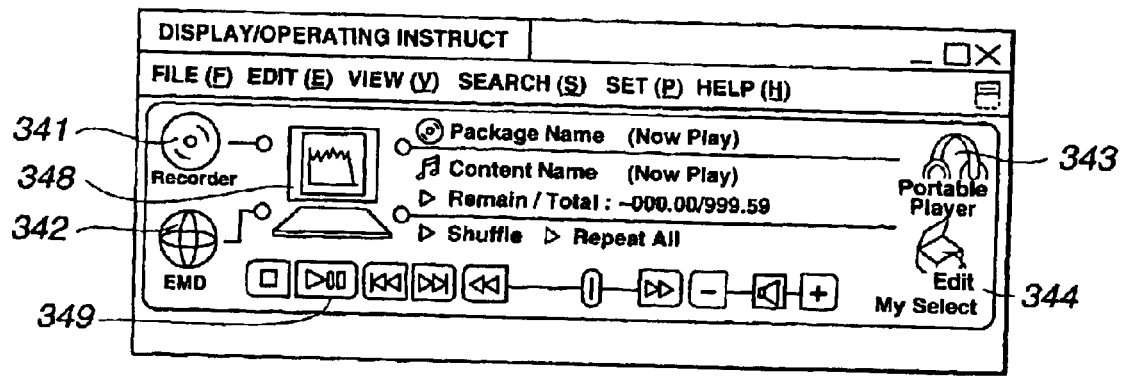
FIG. 41 shows still another example of the display/operation instruction window.

Also, when the display/operation instruction program 112 does not display the fields 351 and 352 according to a user's setting, the display/operation instruction program 112 will display, in the field 348, an image indicating a signal level in each frequency band of the output sound when a content has been played back, and an image corresponding to a selected package or content when no content has been played back, as shown in FIGS. 40 and 41.

Next, how contents are combined will be described. The content management program 111 combines contents when the contents belong to the same original package, the number of possible checkouts for them is equal to the maximum number of possible checkouts, that is, the maximum number of possible checkouts for one of the contents is equal to that for the other and no playback time limit is set for them.

Figure 42:
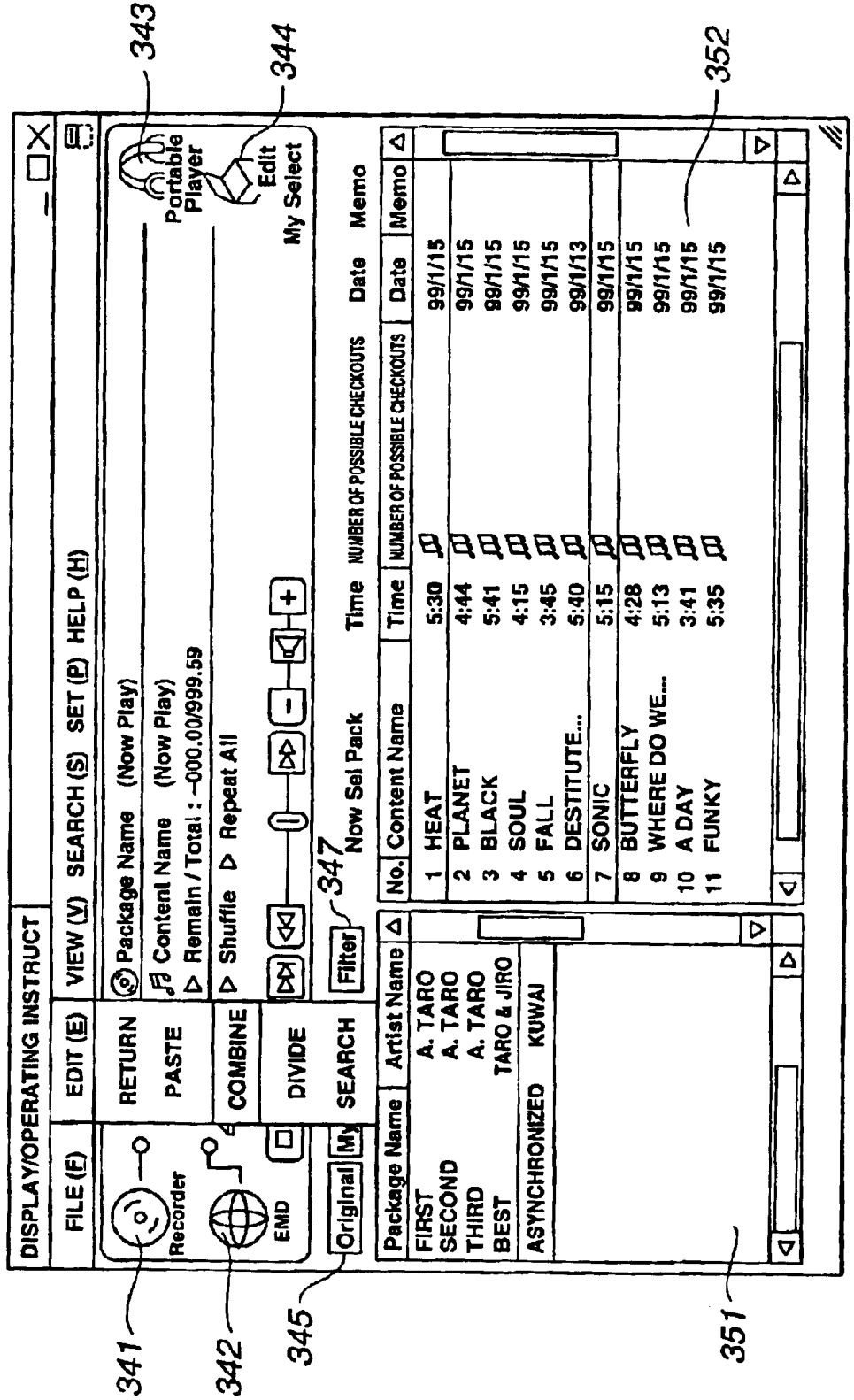
FIG. 42 shows still another example of the display/operation instruction window.

As shown in FIG. 42, in case the display of the original package has been selected, if names corresponding to two or more content names displayed in the field 352, such as "Heat" and "Sonic", are selected, namely, if contents belonging to the same original package are selected, and the combine command is selected from the edit menu, the content management program 111 combines the contents corresponding to "Heat" and "Sonic", respectively, together to generate a new content, stores it into a new content file 161, and records the content file 161 into the content data base 114.

The content management program 111 generates a usage rule file 162 for the content generated by the above content combination and stored in the new content file 161, and records the usage rule file 162 into the content data base 114.

Figure 43:
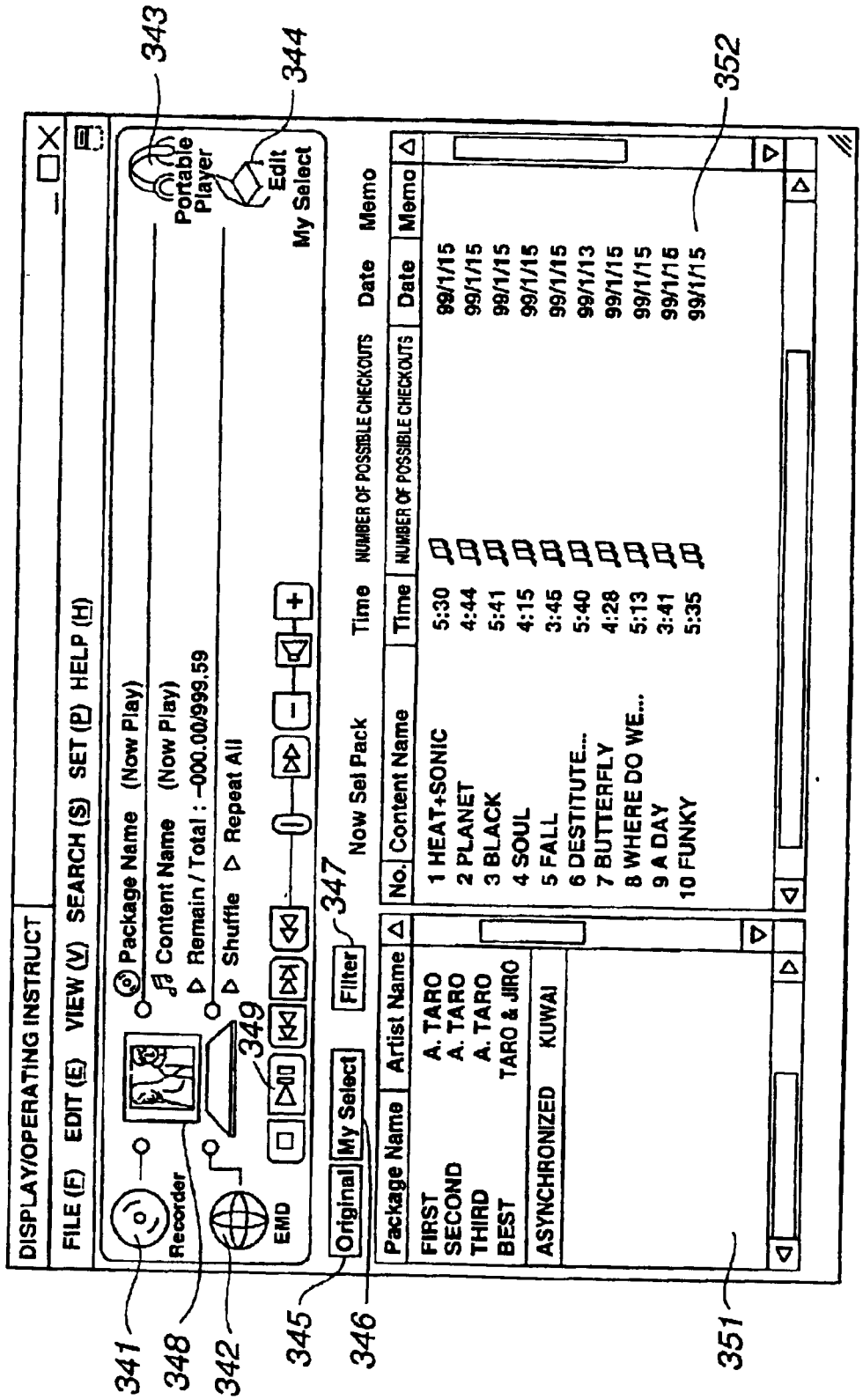
FIG. 43 shows still another example of the display/operation instruction window.

A name for the content generated by the above content combination is generated from the names of the contents having been combined as in the above. For example, the display/operation instruction program 112 will give a name "Heat+Sonic" to the content generated by combining the contents corresponding to the names "Heat" and "Sonic", respectively, as shown in FIG. 43.

Note that the content management program 111 will not combine any contents which are selected from the My Select package or filtering package. That is, the combine command cannot be selected from the menu in the window displayed by the display/operation instruction program 112.

Next, how a content is divided will be described. The content management program 111 divides a content whose number of possible checkouts is equal to a maximum number of possible checkouts, that is, which has not yet been checked out and for which no playback time limit has been set.

Figure 44:
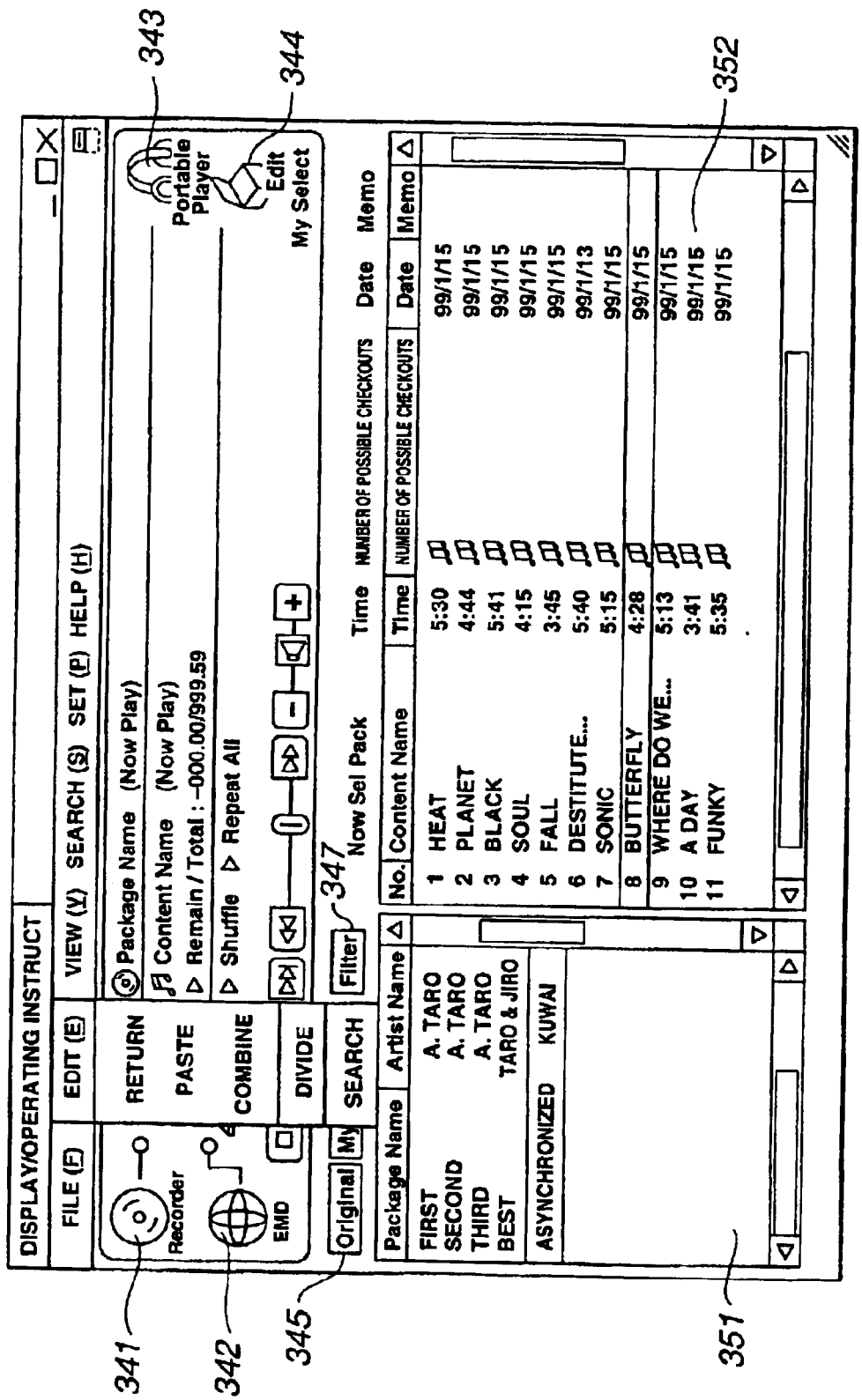
FIG. 44 shows still another example of the display/operation instruction window.

As shown in FIG. 44, in case the display of the original package has been selected, if the combine command is selected from the edit menu while a predetermined content, such as a content having a name "Butterfly" is being played back, the content management program 111 divides a content corresponding to "Butterfly" at a position thereof being played back to generate two contents, stores them into a new content file 161, and records the content file 161 into the content data base 114.

The content management program 111 generates a usage rule file 162 for the contents generated by the above content division and stored in the new content file 161, and records the usage rule file 162 into the content data base 114.

Figure 45:
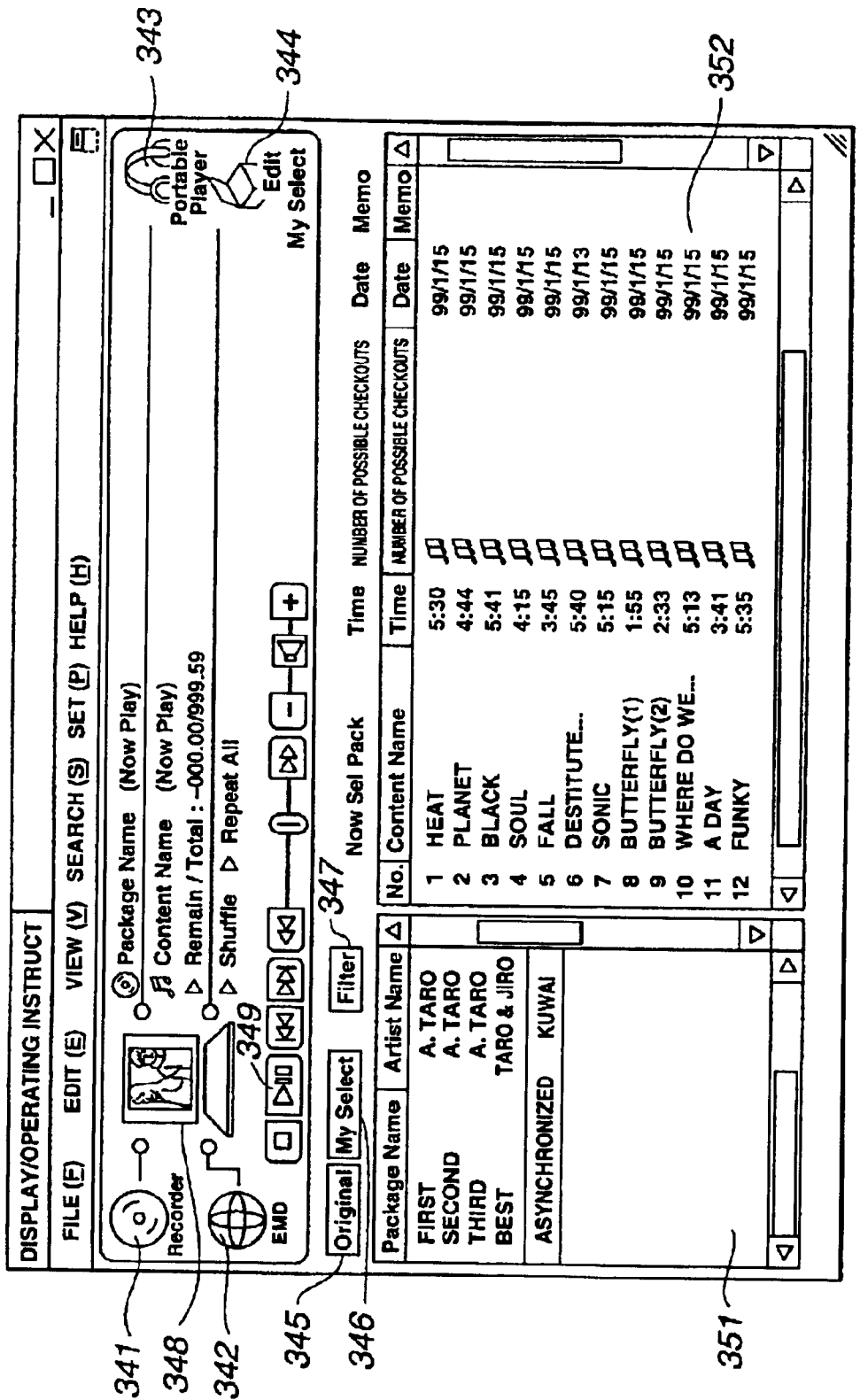
FIG. 45 shows still another example of the display/operation instruction window.

Names for the contents generated by the above content division are generated from the name of the content having been divided as in the above. For example, the display/operation instruction program 112 gives names "Butterfly (1)" and "Butterfly (2)" to the contents, respectively, generated by dividing the content corresponding to the name "Butterfly" as shown in FIG. 45.

Note that the content management program 111 will not divide any content which is selected from the My Select package or filtering package. That is, the combine command cannot be selected from the menu in the window displayed by the display/operation instruction program 112.

Figure 46:
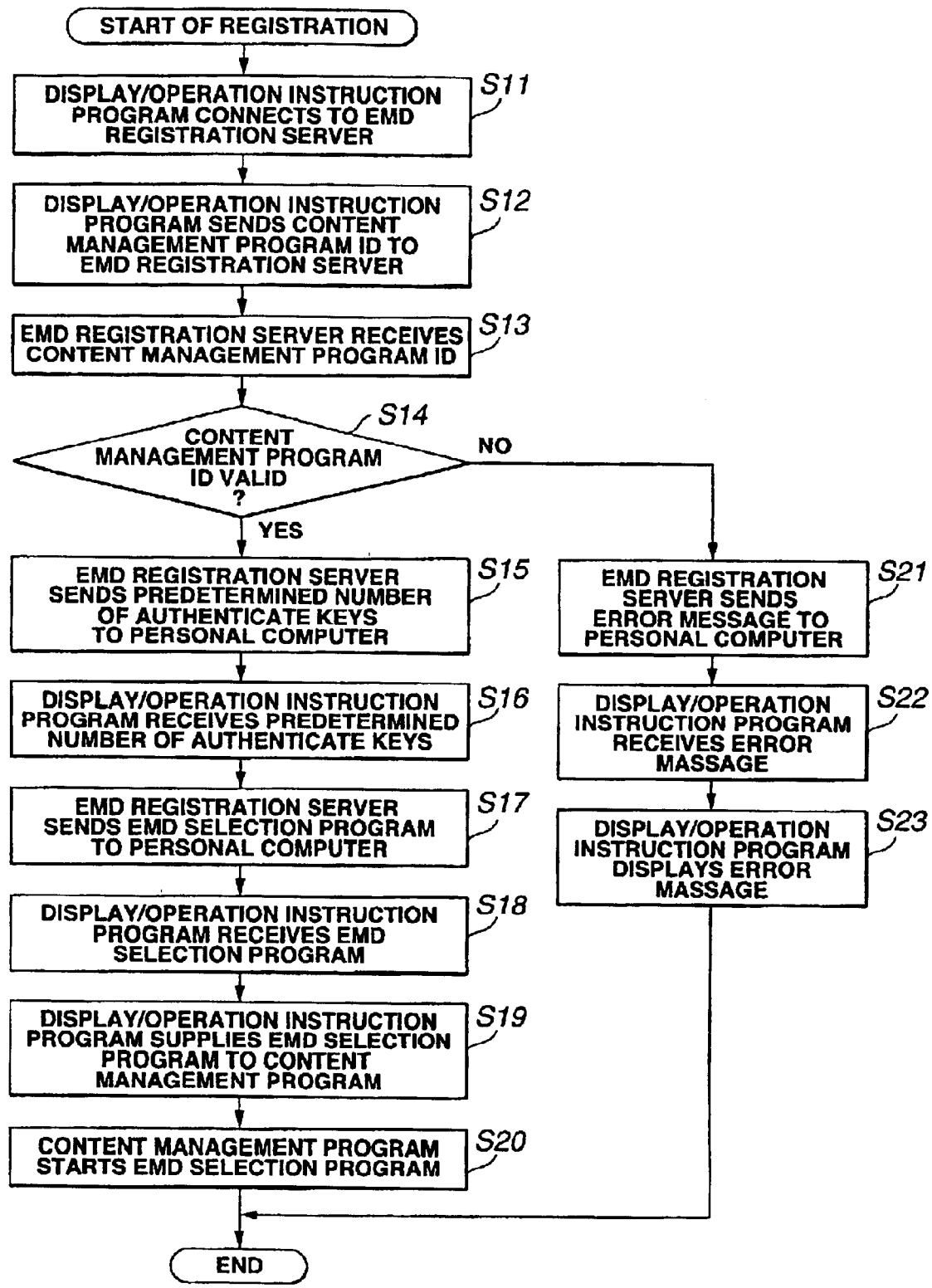
FIG. 46 is a flow chart of the operations effected for registration.

Next, operations for a registration, effected when the display/operation instruction program 112 is initially started with the content management program 111 and display/operation instruction program 112 installed in the personal computer 1, will be described with reference to the flow chart shown in FIG. 46:

At step S11, the display/operation instruction program 112 installed in the personal computer 1 refers to predetermined URL and the like network 2 and connects to the EMD registration server 3.

At step S12, the display/operation instruction program 112 sends, to the EMD registration server 3, the ID of the content management program 111, previously stored in the content management program 111, along with necessary data for the registration (such as the name of a user of the personal computer 1 and credit No.). Note that at step S12, the display/operation instruction program 112 may send, to the EMD registration server 3, the ID of the display/operation instruction program 112, previously stored in the display/operation instruction program 112, along with the necessary data for the registration.

At step S13, the EMD registration server 3 receives the content management program 111. At step S14, the EMD registration server 3 judges whether the ID of the content management program 111 is valid. When the ID of the content management program 111 is determined to be valid, the operation goes to step S15 where the EMD registration server 3 will register the user of the personal computer 1 based on the name of the user and credit No., and sends a predetermined number of authenticate keys (for use for mutual authentication with the EMD servers 4-1 to 4-3, for example) to the personal computer 1.

At step S16, the display/operation instruction program 112 receives the predetermined number of authenticate keys sent from the EMD registration server 3. At step S17, the EMD registration server 3 sends the EMD selection program 131 to the personal computer 1. At step S18, the display/operation instruction program 112 receives the EMD selection program 131 sent from the EMD registration server 3.

At step S19, the display/operation instruction program 112 supplies the received EMD selection program 131 to the content management program 111. At step S20, the content management program 111 starts the EMD selection program 131. Thus, the procedure for the registration is complete.

If at step S14, the ID of the content management program 111 is determined to be invalid, the operation goes to step S21 where the EMD registration server 3 will send a predetermined error message to the personal computer 1 without effecting any registration. At step S22, the display/operation instruction program 112 receives the error message sent from the EMD registration server 3.

At step S23, the display/operation instruction program 112 displays the received error message. Thus, the procedure for the registration is complete.

When the display/operation instruction program 112 is started, the personal computer 1 acquires the authenticate keys used for the mutual authentication with the EMD servers 4-1 to 4-3 and the EMD selection program 131, for example.

Figure 47:
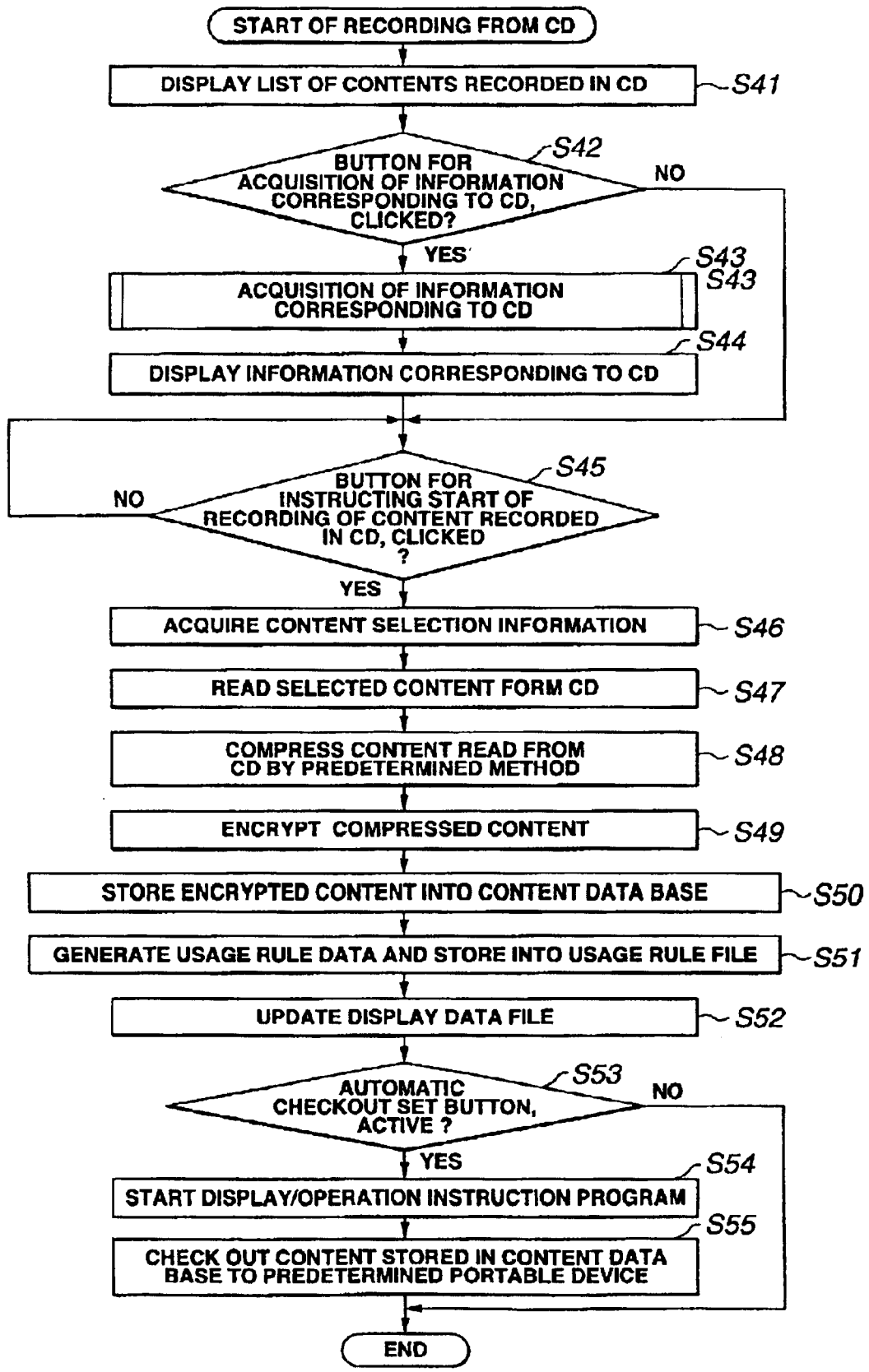
FIG. 47 is a flow chart of the operations effected for recording from a CD.

Next, recording from a CD according to the recording program 113 will be described with reference to the flow chart in FIG. 47. At step S41, the recording program 113 puts the drive 22 into action, reads data corresponding to a content recorded in the CD set in the drive 22 (number of contents or play time), and displays a contents list recorded in the CD in a predetermined window.

At step S42, the recording program 113 judges whether the button 348 for acquisition of information corresponding to the CD has been clicked. When it is determined that the button 384 has been clicked, the operation goes to step S43 where the recording program 113 will acquire the information corresponding to the CD. The acquisition of the information corresponding to the CD will further be described later with reference to the flow chart in FIG. 48.

At step S44, the recording program 113 displays, in a predetermined window, the information corresponding to the CD, having been acquired by the operation at step S43.

If at step S42, it is determined that the button 384 for acquisition of information corresponding to a CD has not been clicked, it is not necessary to acquire the information corresponding to the CD, so the operation slips over steps S43 and S44 and goes to step S45.

At step S45, the recording program 113 judges whether the button 386 for instruction to start recording of a content recorded in the CD has been clicked. If it is determined that the button 386 has not been clicked, the operation goes back to step S45 where it will be repeatedly judged whether the button 386 has been clicked, until it is determined that the button 386 has been clicked.

When it is determined, at step S45, that the button 386 has been clicked, the operation goes to step S46 where the recording program 113 will acquire, based on a check set correspondingly to a content name in the field 383, content selection information indicating which of contents recorded in the CD is to be recorded. At step S47, the recording program 113 reads a selected content from the CD based on the content selection information.

At step S48, the recording program 113 has the compression method conversion program 134 in the content management program 111 compress the content read from the CD by a predetermined conversion method such as ATRAC3, for example. At step S49, the recording program 113 has the encryption method conversion program 135 in the content management program 111 encrypt the compressed content by a predetermined encryption method such as DES, for example.

At step S50, the recording program 113 has the content data base 114 store the compressed and encrypted content. At step S51, the recording program 113 generates usage rule data corresponding to the content stored in the content data base 114, and has the content data base 114 store the generated usage rule data into the usage rule file 162 (related with the content stored in the content data base 114). At step S52, the recording program 113 updates the display data file 182 based on the generated usage rule data or information corresponding to the CD.

At step S53, the recording program 113 judges whether the button 385 for setting checkout, or no checkout, of the content read from the CD to any of the portable devices 6-1 to 6-3 (automatic checkout) is activated. When it is determined that the button 385 is active, the operation goes to step S54 where the display/operation instruction program 112 is started.

At step S55, the recording program 113 has the display/operation instruction program 112 check out the content stored in the content data base 114 to any of the portable devices 6-1 to 6-3. Thus, the procedure is complete.

If it is determined, at step S53, that the button 385 is not active, it is not necessary to check out the content, the operation is complete with a skip over steps S54 and S55.

When the recording from the CD is effected with the button 385 being active, the personal computer 1 will store the content read from the CD into the content data base 114 and automatically check it out to any of the portable devices 6-1 to 6-3.

Similarly, when the display/operation instruction program 112 receives a content from any of the EMD servers 4-1 to 4-3 while check is made with the check button 334, it will store the received content into the content data base 114 and have the content management program 111 check out the content to any of the portable devices 6-1 to 6-3.

Figure 48:
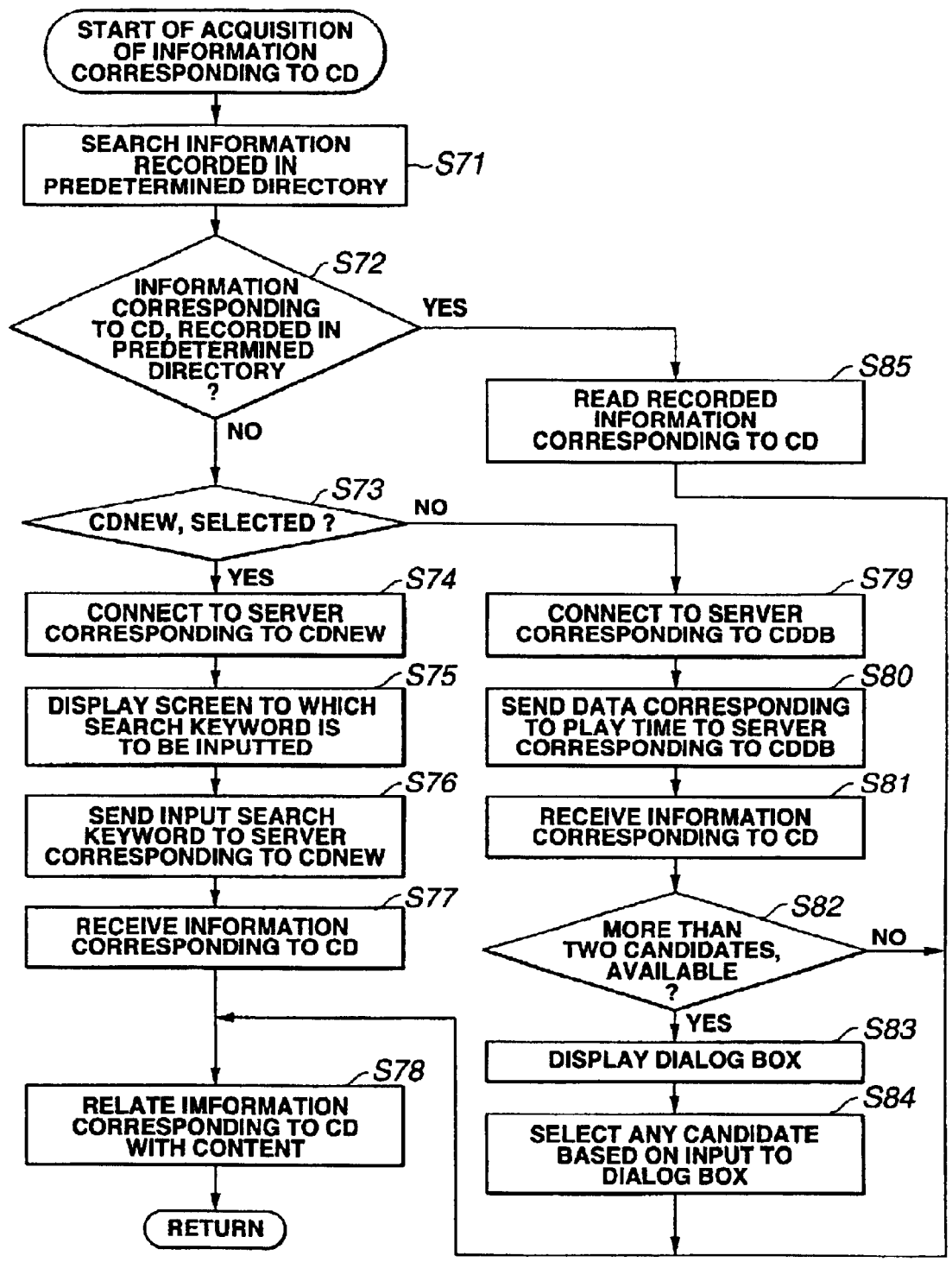
FIG. 48 is a flow chart of the operations effected for acquisition of information corresponding to CD.

Next, acquisition of information corresponding to a CD, effected under the recording program 113 and at step S43 in FIG. 47, will be described with reference to the flow chart in FIG. 48:

At step S71, the recording program 113 searches information recorded in a predetermined directory (e.g., directory in the HDD 21, designated in the field 404 in the dialog box 461).

At step S72, the recording program 113 judges, based on data corresponding to a content recorded in a CD set in the drive 22 (e.g., number of contents or play time), whether information corresponding to the CD is recorded in the predetermined directory. If it is determined that the information corresponding to the CD is not recorded in the predetermined directory, the operation goes to step S73 where it is judged, based on a character string set in the field 401, whether CDNEW has been selected.

When it is determined, at step S73, that CDNEW has been selected, the operation goes to step S74 where the recording program 113 will connect to a server corresponding to CDNEW (e.g., WWW server 5-2) via the network 2. At step S75, the recording program 113 has the display unit 20 display a screen for input of a search keyword (e.g., dialog box shown in FIG. 22). At step S76, the recording program 113 sends, to a server corresponding to CDNEW, a search keyword inputted based on the screen such as album name, artist name, content name, product No. or the like.

At step S77, the recording program 113 receives information corresponding to the CD from a server corresponding to CDNEW.

At step S78, the recording program 113 relates the information corresponding to the CD with the content, and terminates the procedure.

If it is determined, at step S73, that CDNEW has not been selected, the operation goes to step S79 since CDDB has been selected. At step S79, the recording program 113 will connect to a server corresponding to CDDB (e.g., WWW server 5-1) via the network 2 based on URL of the first site of CDDB set in the field 402 and URL of the second site of CDDB set in the field 403. At step S80, the recording program 113 sends, to a server corresponding to CDDB, data corresponding to a play time of a content recorded in the CD.

At step S81, the recording program 113 receives information corresponding to the CD from the server corresponding to CDDB.

At step S82, the recording program 113 judges whether data corresponding to the CD, received from the server corresponding to CDDB, include more than two candidates. When it is determined that there are available more than two candidates, the operation goes to step S83 where a dialog box will be displayed for allowing the user to select use or no use of information corresponding to any CD.

At step S84, the recording program 113 selects any one of the candidates based on an input to the dialog box, and the operation goes to step S78 where the recording program 113 will relate information corresponding to the CD with the content. Thus the procedure is complete.

If it is determined, at step S82, that there are not available more than two candidates, the operation goes to step S78 where the recording program 113 will relate the information corresponding to the CD, having been received from the server corresponding to CDDB, and thus the procedure is complete.

When it is determined, at step S72, that the information corresponding to the CD is recorded in the predetermined directory, the operation goes to step S85 where the recording program 113 will read the recorded information corresponding to the CD, and goes to step S78 where it will relate the read information corresponding to the CD with the content, and thus the procedure is complete.

As in the above, the recording program 113 acquires information corresponding to the CD from any of two or ore servers different in searching procedure from each other. Also, when information corresponding to the CD has been acquired and recorded, the recording program 113 will use the recorded information.

Figure 49:
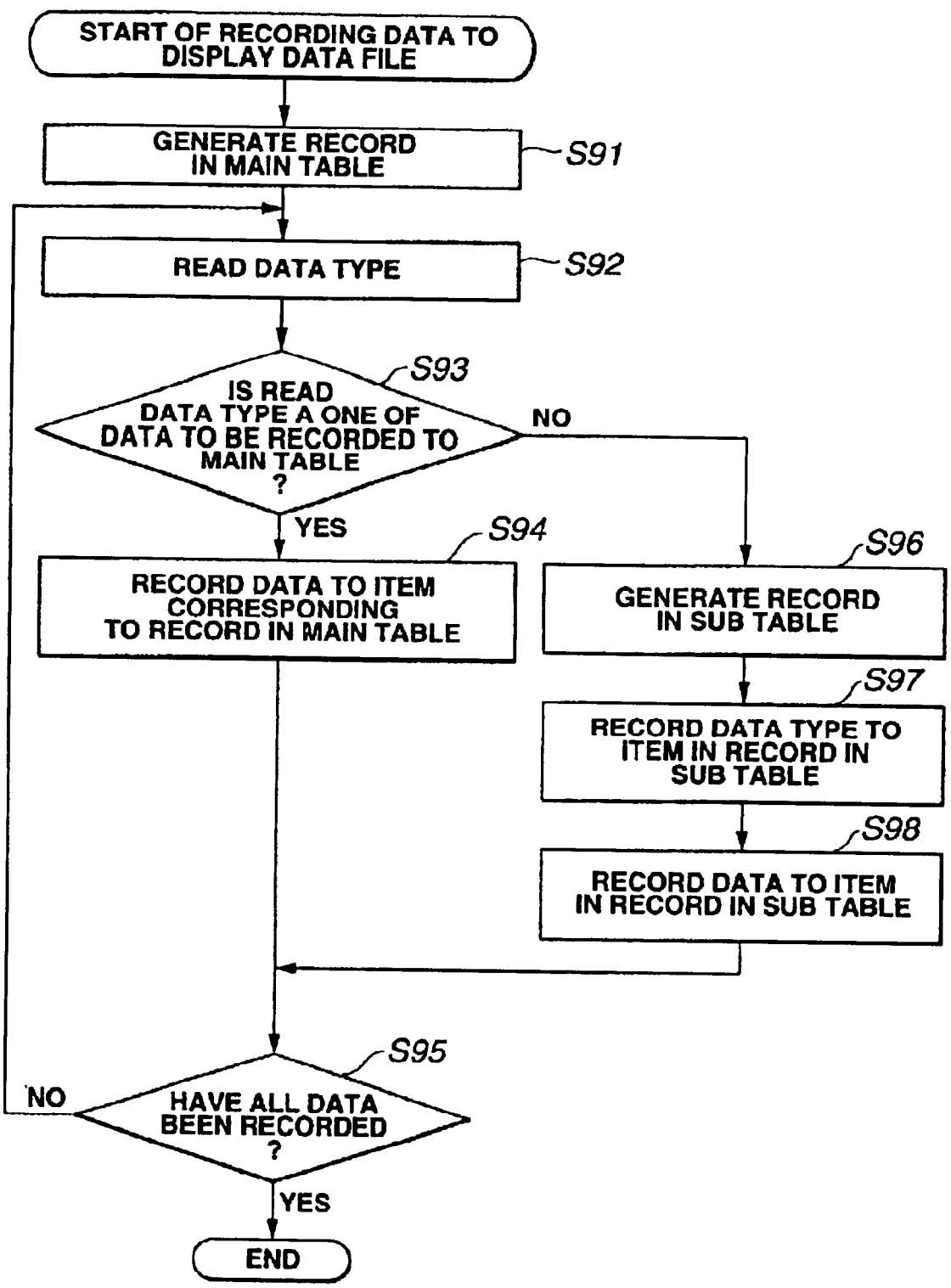
FIG. 49 is a flow chart of the operations effected for data write to a display data file.

Next, how to record data to the display data file 182 under the display/operation instruction program 112 will be described with reference to the flow chart shown in FIG. 49. As shown, at step S91, the display/operation instruction display program 112 generates a record in the main table in the display data file 182.

At step S92, the display/operation instruction program 112 reads the type of data to be recorded into the display data file 182. At step S93, the display/operation instruction program 112 judges whether or not the type of the data read at step S92 is that of data to be recorded to the main table in the display data file 182. If the display/operation instruction program 112 determines that the type of the read data is the type of the data to be recorded to the main table, it goes to step S94 where it will record the data to an item corresponding to the type of the data recorded in the main table generated at step S91. Then the display/operation instruction program 112 will go to step S95.

At step S95, the display/operation instruction program 112 judges whether all data have been recorded. If the display/operation instruction program 112 determines that all the data have not yet been recorded, it returns to step S91 and repeats the data recording.

If the display/operation instruction program 112 determines at step S95 that all the data have been recorded, it ends the operation.

If the display/operation instruction program 112 determines at step S93 that the type of the read data is not the type of the data to be recorded to the main table, it goes to step S96 where it will generate a record in a sub table in the display data file 182. At step S97, the display/operation instruction program 112 records the type of data to an item of the record generated in the sub table at step S96. At step S98, the display/operation instruction program 112 records the data to the item of the record generated in the sub table at step S96, and goes to step S95 where it will judge whether all data have been recorded.

As in the above, the display/operation instruction program 112 can record data of a predetermined type in the main table in the display data file 182, and record, in the display data file 182, the type of data and data of other type than that of data recorded in the main table.

Figure 50:
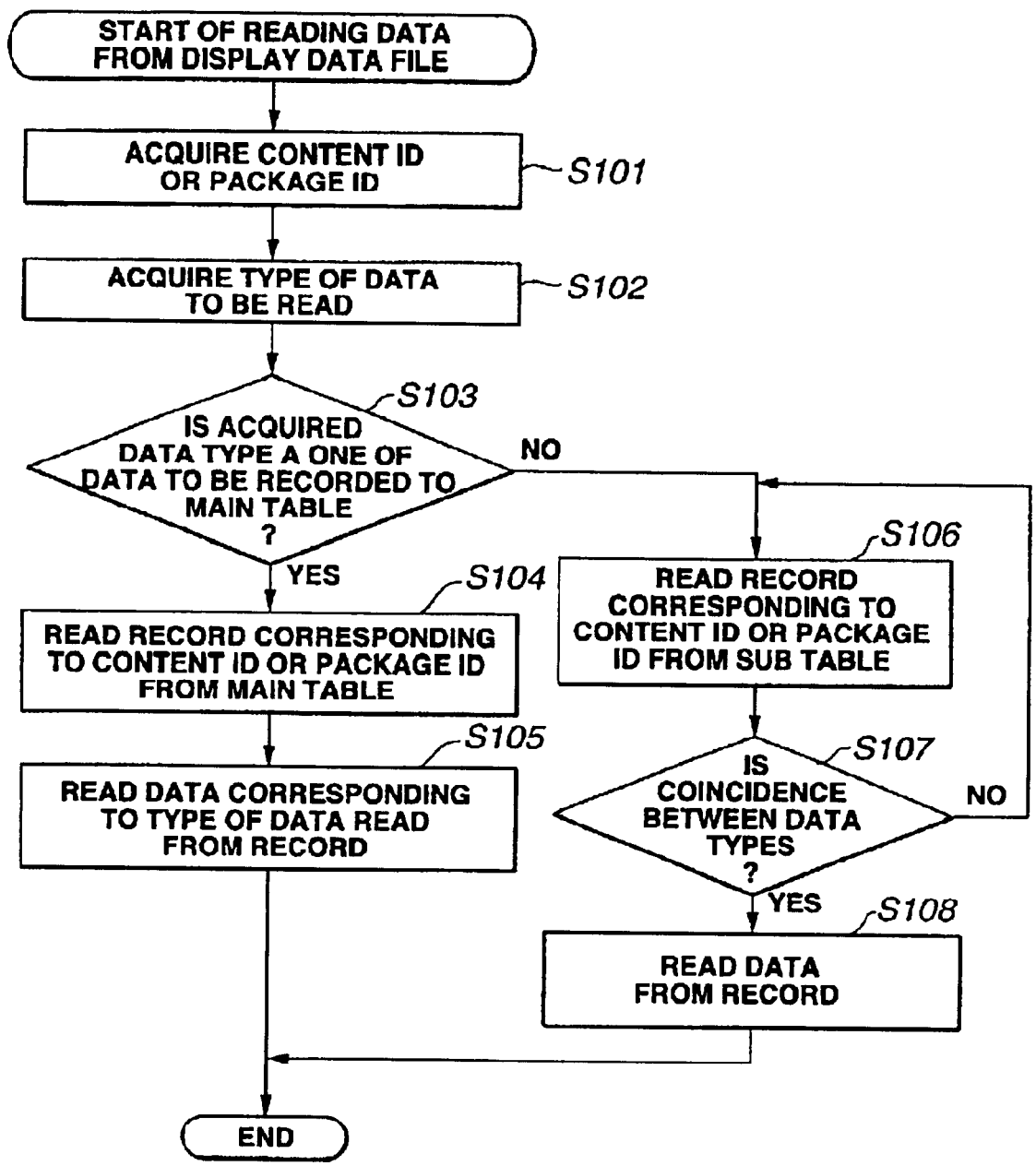
FIG. 50 is a flow chart of the operations effected for data read from the display data file.

Next, data read from the display data file 182 by the display/operation instruction program 112 will be described with reference to the flow chart shown in FIG. 50. At step S101, the display/operation instruction program 112 acquires a content ID or package ID corresponding to a content to be read. At step S102, the display/operation instruction program 112 acquires the type of the data to be read.

At step S103, the display/operation instruction program 112 judges whether the type of the data acquired at step S102 and which is to be read is that of the data to be recorded to the main table in the display data file 182. If the display/operation instruction program 112 determines that the type of the data to be read is that of the data to be recorded to the main table, it goes to step S104 where it will read a record corresponding to a content ID or package ID from the main table in the display data file 182. At step S105, the display/operation instruction program 112 reads, from the record read at step S104, data corresponding to the type of data recorded as a predetermined item and which is to be read, and ends the operation.

If it is determined, at step S103, that the type of the data to be read is not that of the data to be recorded to the main table, the data to be read is recorded in the sub table and so the display/operation instruction program 112 goes to step S106 where it will read a record corresponding to a content ID or package ID from the sub table in the display data file 182. At step S107, the display/operation instruction program 112 judges whether the type of the data stored in an item of the record read at step S106 is that of the data to be read. If it is determined that the type of the data stored in the item of the read record is not that of the data to be read, the display/operation instruction program 112 returns to step S106 and repeats the read of a record from the sub table.

If it is determined, at step S107, that the type of the data stored in the item of the read record is that of the data to be read, the display/operation instruction program 112 goes to step S108 where it will read the data from the record and ends the operation.

As in the above, the display/operation instruction program 112 can read a predetermined type of data from the display data file 182.

Figure 51:
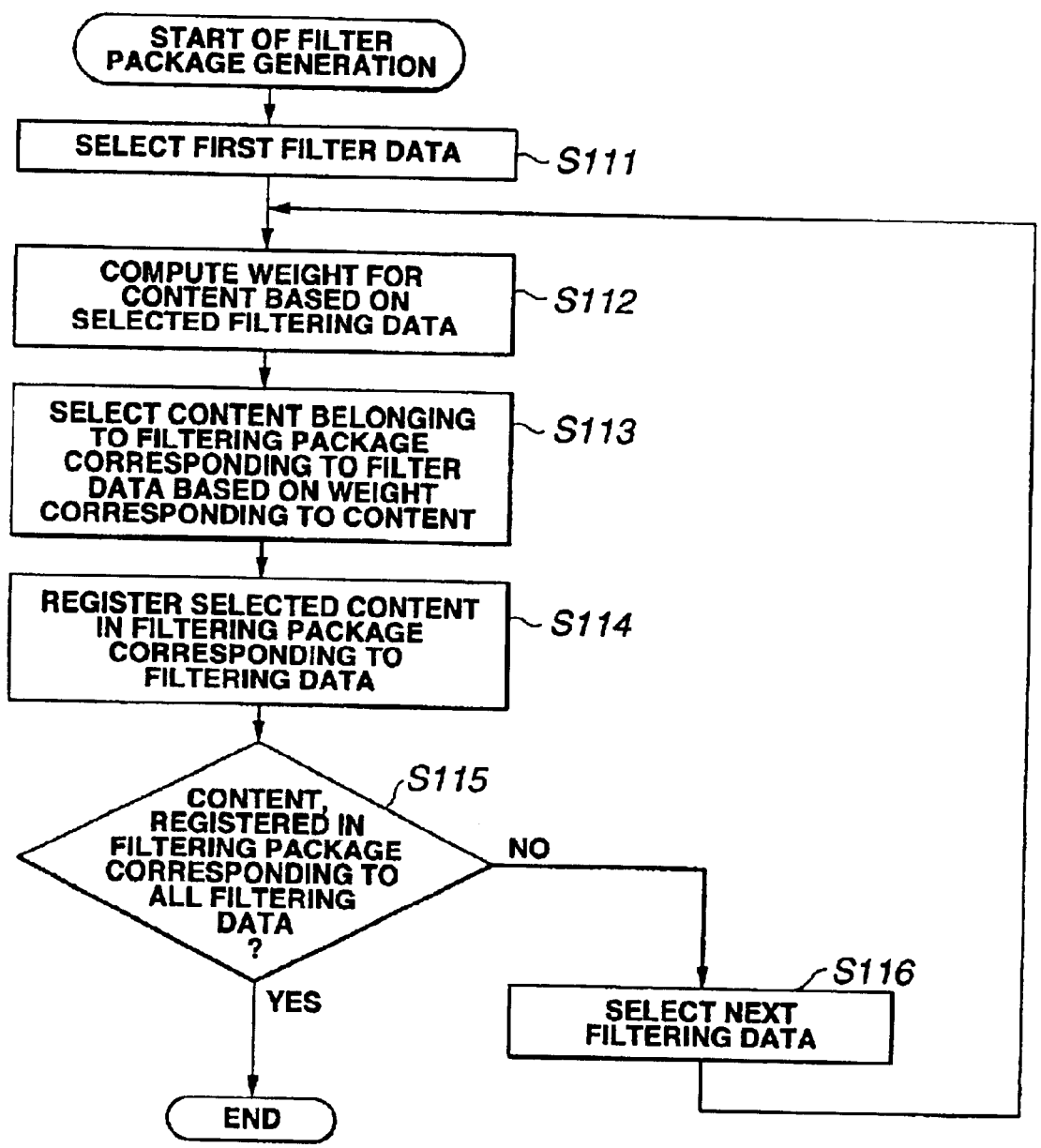
FIG. 51 is a flow chart of the operations effected for generation of filtering package.

Next, generation of a filter package, performed by the display/operation instruction program 112 when the button 437 is clicked, will be described with reference to the flow chart in FIG. 51. At step Sill, the display/operation instruction program 112 selects a first filtering data 551, for example, the filtering data 551-1, stored in the filtering data file 181.

At step S112, the display/operation instruction program 112 computes a weight for the content based on data stored in the display data file 182 and history data stored in the history data file 184 or any of them and the selected filtering data 551.

At step S113, the display/operation instruction program 112 selects a content belonging to a filtering package corresponding to the selected filtering data 551 based on the weight for the content, computed at step S112.

At step S114, the display/operation instruction program 112 registers the content having been selected at step S113 into a filtering package corresponding to the selected filtering data 551. That is to say, the display/operation instruction program 112 stores an ID for the selected content into the package display data 291 corresponding to the filtering package corresponding to the selected filtering data 551.

At step S115, the display/operation instruction program 112 judges whether the content has been registered in the filtering package corresponding to all the filter data 551 stored in the filtering data file 181. If it is determined that the content has not been registered in the filtering package corresponding to all the filtering data 551, the operation goes to step S116 where a next filtering data 551 stored in the filtering data file 181 is selected, and then goes back to step S112 where the content registration will be repeated.

If at step S115 it is determined that the content has been registered in the filtering package corresponding to all the filtering data 551, the procedure is complete.

As in the above, the display/operation instruction program 112 will select a content based on data stored in the display data tile 182 and history data stored in the history data file 184 or any of them and the selected filtering data 551, and register the selected content into the filtering package.

Figure 52:
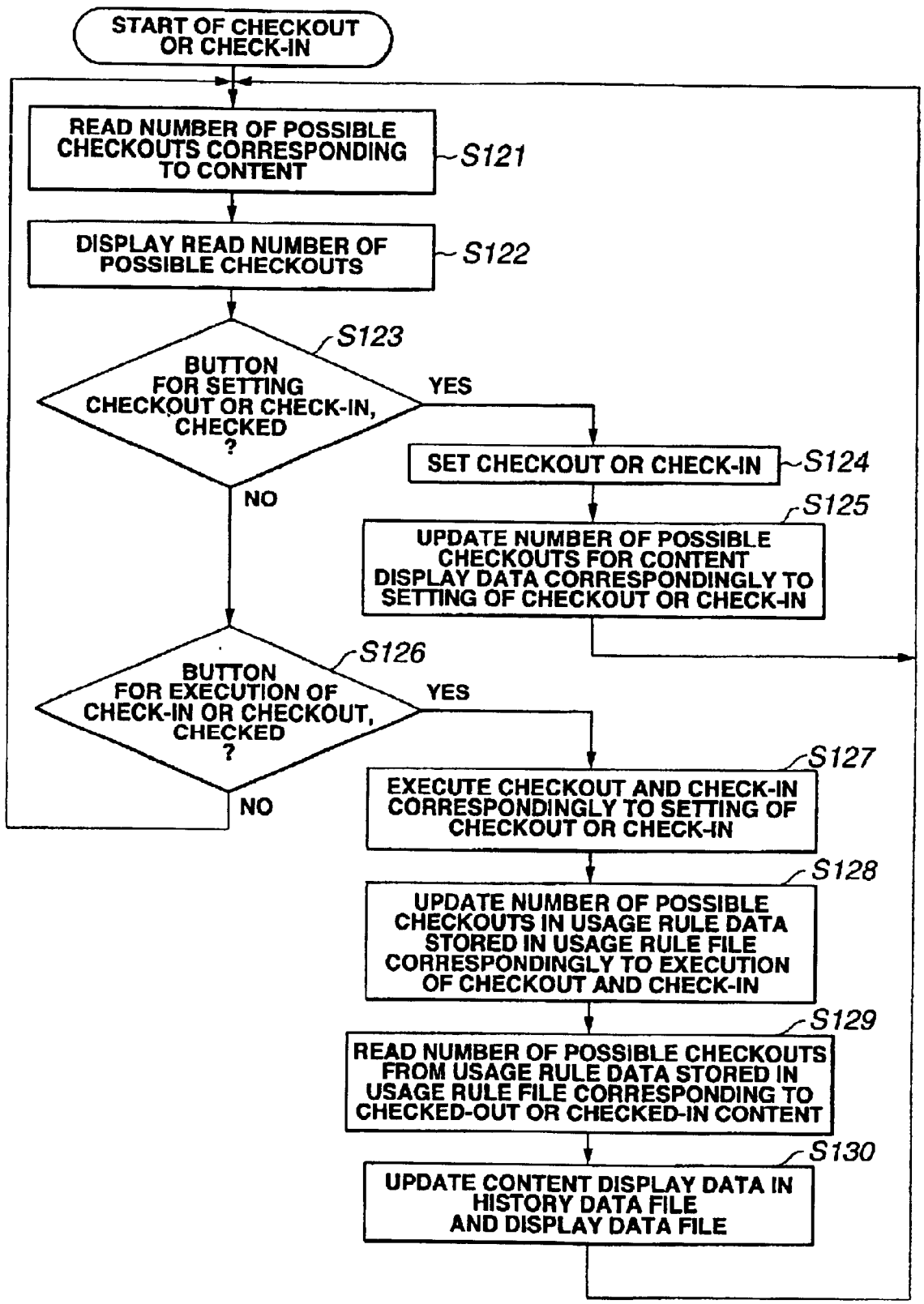

Next, content checkout or check-in effected by the display/operation instruction program 112 and content management program 111 when the field 481 is displayed in the display/operation instruction window, for example, will be described with reference to the flow chart in FIG. 52:

At step S121, the display/operation instruction program 112 reads a number of possible checkouts corresponding to the content from the display data file 182. At step S122, the display/operation instruction program 112 displays the number of possible checkouts having been read at step S121.

At step S123, the display/operation instruction program 112 judges whether the checkout setting button 491 or check-in setting button 492 has been clicked. When it is determined that the button 491 or 492 has been clicked, the operation goes to step S124 where checkout of a content corresponding to a content name selected in the field 352 or check-in of a content corresponding to a content name selected in the field 481 will be set.

At step S125, the display/operation instruction program 112 updates the number of possible checkouts in the content display data 221 in the display data file 182 correspondingly to the setting of checkout of the content corresponding to the content name selected in the field 352 or to the setting of check-in of the content corresponding to the content name selected in the field 481, having been effected at step S124, and returns to step S121 where the same procedure will be repeated.

If it is determined, at step S123, that neither the checkout setting button 491 nor check-in setting button 492 has bee clicked, the operation goes to step S126 where the display/operation instruction program 112 will judge whether the button 484 for effecting the check-in or checkout has been clicked.

When it is determined at step S126 that the button 484 has been clicked, the operation goes to step S127 where the display/operation instruction program 112 will have the check-in/checkout management program 132 in the content management program 111 effect the checkout or check-in correspondingly to the setting of content checkout or check-in. The check-in/checkout management program 132 judges, based on the usage rule data stored in the usage rule file 162, whether each content can be checked out or in. When the program 132 determines that such a content checkout or check-in is possible, it will effect it.

When it is determined that the checkout or check-in is not possible, the check-in/checkout management program 132 will not effect it.

At step S128, the display/operation instruction program 112 has the check-in/checkout management program 132 in the content management program 111 update the number of possible checkouts for the usage rule data stored in the usage rule file 162 in the content data base 114 (corresponding to a checked-out or checked-in content) correspondingly to the execution of the content checkout or check-in.

At step S129, the display/operation instruction program 112 has the check-in/checkout management program 132 reads the number of possible checkouts from the usage rule data stored in the usage rule file 162, corresponding to the checked-out or checked-in content.

At step S130, the display/operation instruction program 112 updates the number of possible checkouts stored in the history data file 184, and updates the content display data 221 in the display data file 182 based on the number of possible checkouts having been read at step S129. Then it goes back to step S121 where the same procedure will be repeated.

When it is determined, at step S126, that the button 484 has not been clicked, no checkout or check-in will be done. So the operation goes back to step S121 where the same procedure will be repeated.

As in the above, the display/operation instruction program 112 will change the display correspondingly to the setting of checkout or check-in, and have the content management program 111 execute checkout or check-in based on the setting of checkout or check-in.

Figure 53:
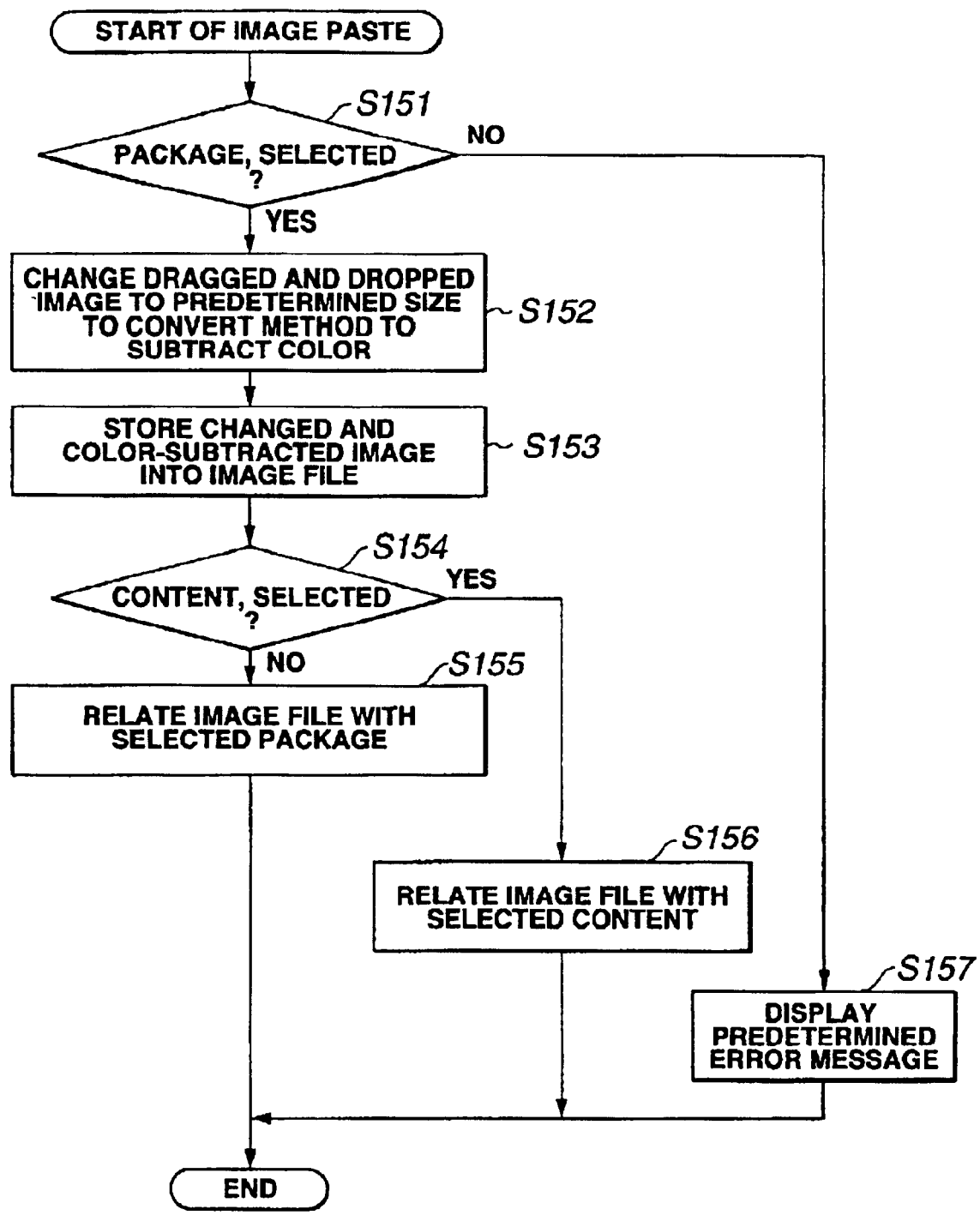
FIG. 53 is a flow chart of the operations effected for image pasting.

Next, image paste, effected by the display/operation instruction program 112 when a predetermined image has been dragged and dropped to the field 348, will be described with reference to the flow chart in FIG. 53. At step S151, the display/operation instruction program 112 judges whether a package has been selected. When it is determined that a package has been selected, the operation goes to step S152 where the dragged and dropped image will be changed to a predetermined size, and subjected to a coding method conversion and color subtraction.

At step S153, the display/operation instruction program 112 stores the image subject to the coding method conversion and color subtraction at step S152 into the image file 183.

At step S154, the display/operation instruction program 112 judges whether a content has been selected. When it is determined that no content has been selected, the operation goes to step S155 where the image file 183 and selected package will be related with each other (that is, the name of the image file 183 in which the content is recorded is recorded as data indicating an image file name in any of the package display data 211, 251 or 291 corresponding to the selected package), and thus the procedure is complete.

If it is determined, at step S154, that a content has been selected, the operation goes to step S156 where the display/operation instruction program 112 will relate the image file 183 with the selected content (that is, the name of the image file 183 in which the content is recorded is recorded as data indicating an image file name in the content display data 221 corresponding to the selected content), and thus the procedure is complete.

If it is determined, at step S151, that no package has been selected, there is no object with which the image is related, so the operation goes to step S157 where the display/operation instruction program 112 will display a predetermined error message and thus the procedure be complete.

As in the above, the display/operation instruction program 112 can paste the dragged and dropped image on a package or content (image and package or content are related with each other).

Figure 54:
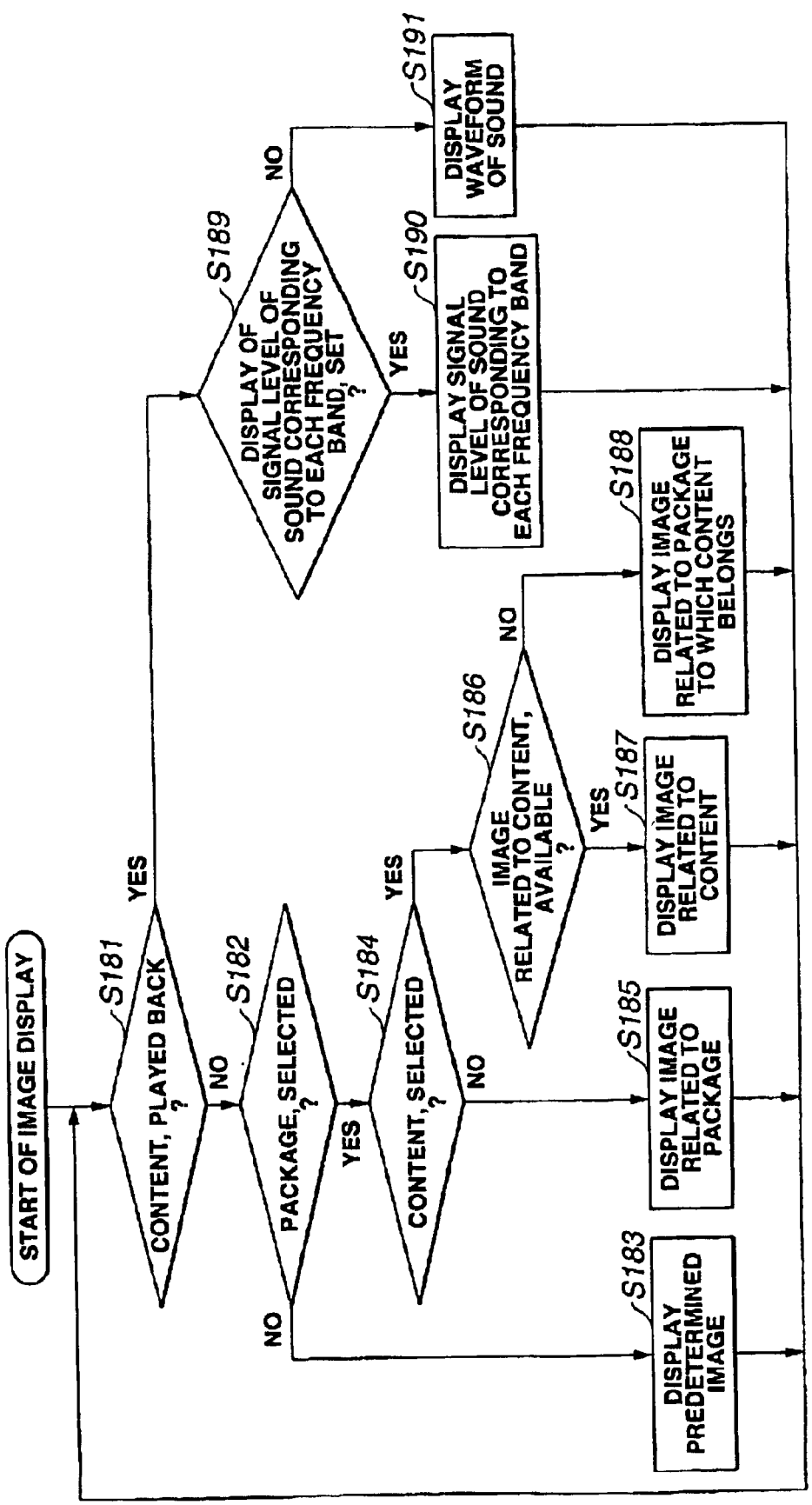
FIG. 54 is a flow chart of the operations effected for image display.

Next, image display effected by the display/operation instruction program 112 will be described with reference to the flow chart in FIG. 54. At step S181, the display/operation instruction program 112 judges whether a content has been played back. If it is determined that no content has been played back, the operation goes to step S182 where it will be judged whether a package has been selected.

If it is determined, at step S182, that no package has been selected, the operation goes to step S183 where the display/operation instruction program 112 will display, in the field 348, a predetermined image (e.g., an image showing the supplier of the display/operation instruction program 112) and the operation will go back to step S181 where the same procedure will be repeated.

When it is determined, at step S182, that a package has been selected, the operation goes to step S184 where the display/operation instruction program 112 will judge whether a content has been selected.

If it is determined, at step S184, that no content has been selected, the operation goes to step S185 where the display/operation instruction program 112 will display, in the field 348, an image related with the selected package (the display/operation instruction program 112 refers to data indicating an image file name stored in the package display data 211, reads image data stored in a predetermined one of the image files 183-1 to 183-K, and displays, in the field 348, an image corresponding to the image data), and go back to step S181 where it will repeat the same procedure.

If it is determined, at step S184, that a content has been selected, the operation goes to step S186 where the display/operation instruction program 112 will judge whether there is available an image related with the selected content.

If it is determined, at step S186, that there is an image related with the selected content, the operation goes to step S187 where the display/operation instruction program 112 will display, in the field 348, the image related with the selected content (the display/operation instruction program 112 refers to data indicating an image file name stored in the content display data 221 corresponding to the selected content, reads image data stored in a predetermined one of the image files 183-1 to 183-K, and displays, in the field 348, an image corresponding to the image data), and go back to step S181 where it will repeat the same procedure.

If it is determined, at step S186, that there is no image related with the selected content, the operation goes to step S188 where the display/operation instruction program 112 will display, in the field 348, an image related with the selected content. Then the operation goes back to step S181 where the same procedure will be repeated.

If it is determined, at step S181, that a content has been played back, the operation goes to step S189 where the display/operation instruction program 112 will judge whether display of a signal level of a sound corresponding to each frequency band has been set. If it is determined that the display has been set, the operation goes to step S190 where the signal level of a sound corresponding to each frequency band will be displayed in the field 348. The operation goes back to step S181 where the same procedure will be repeated.

If it is determined, at step S189, that display of a signal level of a sound corresponding to each frequency band has not been set, the operation goes to step S191 where the display/operation instruction program 112 will display, in the field 348, a waveform of an output sound (signal level corresponding to a time lapse of the output sound), and go back to step S181 where it will repeat the same procedure.

As in the above, correspondingly to the selection of a package or content or the playback of a content, the display/operation instruction program 112 will display, in the field 348, any of an image related with the package, image related with the content, signal level of a sound corresponding to each frequency band and a waveform of the output sound.

Figure 55:
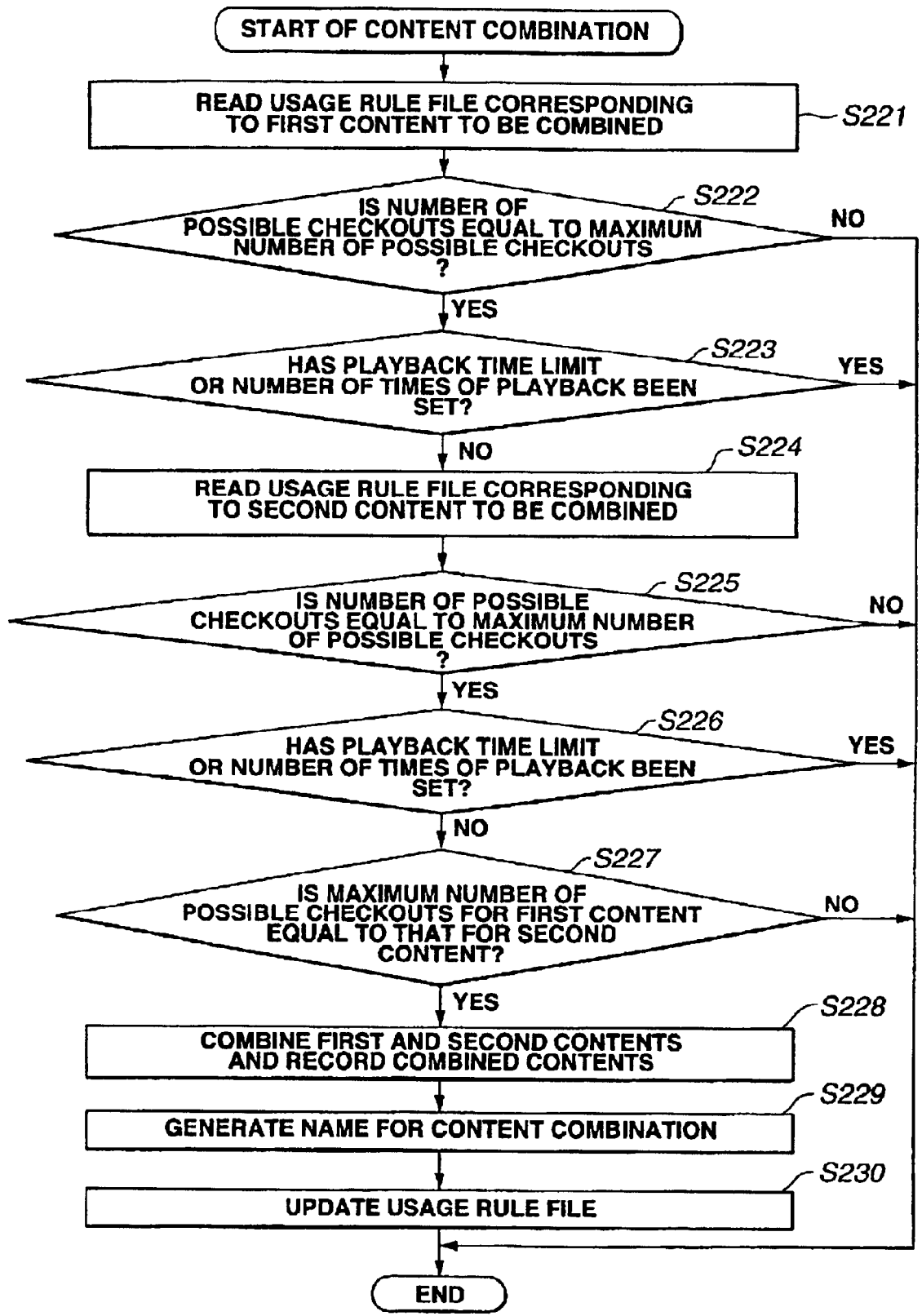
FIG. 55 is a flow chart of the operations effected for combining contents together.

Next, how to combine contents belonging to the same original package by the content management program 111 will be described with reference to the flow chart shown in FIG. 55. At step S221, the content management program 111 reads a usage rule file 162 corresponding to a first one of contents to be combined from the content data base 114. At step S222, the content management program 111 judges whether the number of possible checkouts for the first content is equal to the maximum number of possible checkouts for the first content. If the number of possible checkouts is judge to be equal to the maximum number of possible checkouts, the content management program 111 goes to step S223 where it will judge whether a playback time limit or number of times of playback is set for the first content.

If it is determined, at step S223, that no playback time limit or number of times of playback is set for the first content, the content management program 111 goes to step S224 where it will read a usage rule file 162 for the second one of the contents to be combined from the content data base 114. At step S225, the content management program 111 judges whether the number of possible checkouts for the second content is equal to the maximum number of possible checkouts for the second content. If it is determined that the number of possible checkouts is equal to the maximum number of possible checkouts, the content management program 111 goes to step S226 where it will judge whether a playback time limit or number of times of playback is set for the second content.

If it is determined, at step S226, that no playback time limit or number of times of playback is set for the second content, the content management program 111 goes to step S227 where it will judge whether the maximum number of possible checkouts for the first content is equal to that for the second content. If it is determined that the maximum number of possible checkouts for the first content is equal to that for the second content, the content management program 111 goes to step S228.

At step S228, the content management program 111 reads the first and second contents from content files 161 of the content data base 114, corresponding to the first and second contents, respectively, combines the contents together, and record the combination of the contents. That is, the content management program 111 generates anew content file 161 in the content data base 114, and stores the content combination into the content file 161.

At step S229, the display/operation instruction program 112 generates a name for the content combination, and stores the content name generated in the content data base 114 into the display data file 182. At step S230, the content management program 111 allows the content data base 114 to update the usage rule file 162 so that the maximum number of possible checkouts and number of possible checkouts for the combined contents is equal to those for the first content, and ends the operation.

If it is determined, at step S222, that the number of possible checkouts for the first content is not equal to the maximum number of possible checkouts for the first content, the operation is ended since the first content cannot be combined. If it is determined, at step S223, that a playback time limit or number of times of playback is set for the first content, the operation is ended since the first content cannot be combined.

If it is determined, at step S225, that the number of possible checkouts for the second content is not equal to the maximum number of checkouts for the second content, the operation is ended since the second content cannot be combined. If it is determined, at step S226, that a playback time limit or number of times of playback is set, the operation is ended since the second content cannot be combined.

If it is determined at step S227 that the maximum number of possible checkouts for the first content is not equal to that for the second content, the operation is ended since the first and second contents cannot be combined.

As in the above, the personal computer 1 can combine contents which belong to the same original package, which are equal in maximum number of possible checkouts to each other, which have not been checked out, for which no playback time limit or number of times of playback are set, and which are recorded in the content data base 114. Since contents having not been checked out and for which no playback time limit or number of times of playback are set are combined together, a number of possible checkouts and playback time limit or number of times of playback for the contents will not be changed. Therefore, it is possible to prevent illegal increase of a number of possible checkouts or illegal change of a playback time limit or number of times of playback without any loss of the user's profit.

Note that it also suffices to judge whether a package to which contents belong is from a CD, not to judge whether the maximum number of possible checkouts for one the contents is equal to that for the other content and whether a playback time limit or number of times of playback is set for each of the contents. If it is determined that the package to which the contents belong is from a CD, the contents may be combined together. Also note that for a content recorded from a CD, the maximum number of possible checkouts is constant, three for example and no playback time limit or number of times playback is set.

Figure 56:
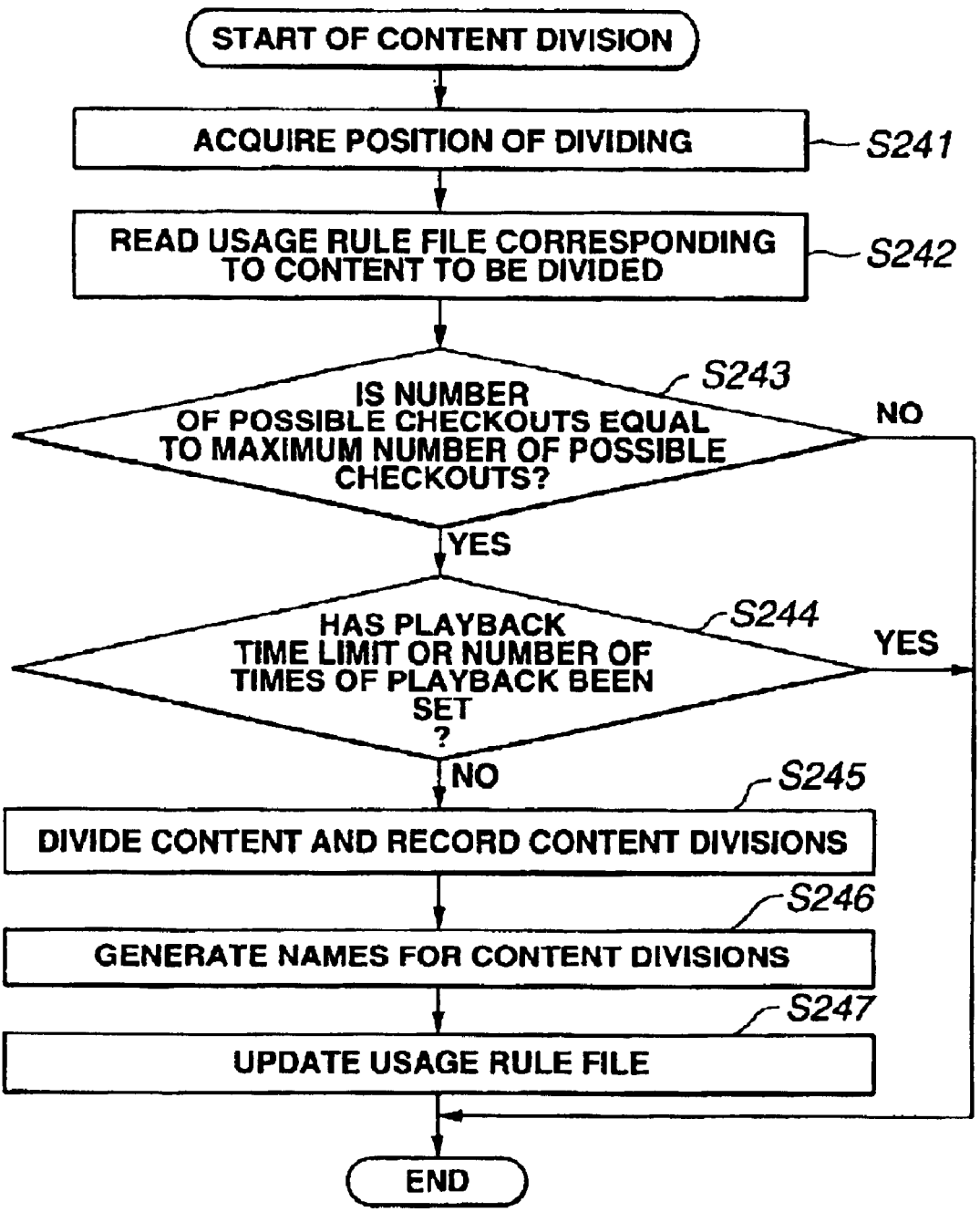
FIG. 56 is a flow chart of the operations effected for dividing a content.

Next, how to divide a content by the content management program 111 will be described with reference to the flow chart shown in FIG. 56. At step S241, the content management program 111 gets a position at which a content is to be divided, for example, a position of a played data in the content at a time elapse from start of a play or at the current time. At step S242, the content management program 111 reads a usage rule file 162 for a content to be divided from the content data base 114.

At step S243, the content management program 111 judges whether the number of possible checkouts for the content is equal to the maximum number of possible checkouts fro the content. If it is determined that the number of possible times is equal to the maximum number of possible checkouts, the content management program 111 goes to step S244 where it will judge whether a playback time limit or number of times of playback is set for the content.

If it is determined, at step S244, that no playback time limit or number of times of playback is set for the content, the content management program 111 goes to step S245 where it will read the content from a corresponding content file 161 of the content data base 114, divides the content at a position acquired at step S241 and records the divided contents. That is, the content management program 111 generates a new content file 161 in the content data base 114, and stores the divided contents into the new content data file 161.

At step S246, the display/operation instruction program 112 generates names for the divided contents. The display/ operation instruction program 112 stores the content names generated in the content data base 114 into the display data file 182. At step S247, the content management program 111 allows the content database 114 to update the usage rule file 162 so that the maximum number of possible checkouts and number of possible checkouts for the divided contents are equal to those for the original content, and ends the operation.

If it is determined, at step S243, that the number of possible checkouts is not equal to the maximum number of possible checkouts, the operation is ended since the content cannot be divided. If it is determined, at step S244, that a playback time limit or number of times of playback is set for the content, the operation is ended since the content cannot be divided.

As in the above, the personal computer 1 can divided a content which has not been checked out, for which no playback time limit or number of times of playback is set, and which is recorded in the content data base 114. Since a content having not been checked out and for which no playback time limit or number of times of playback is set, a number of possible checkouts and a playback time limit or number of times of playback for the content will not be changed. Therefore, it is possible to prevent illegal increase of a number of possible checkouts or illegal change of a playback time limit or number of times of playback without any loss of the user's profit.

Note that it also suffices to judge whether a package to which a package to which a content to be divided belongs is a one from a CD and for which no playback time limit or number of times of playback is set, not to judge whether a playback time limit or number of times of playback is set for the content, and then divide the content if it is determined that the package to which the content belongs is from a CD.

Figure 57:
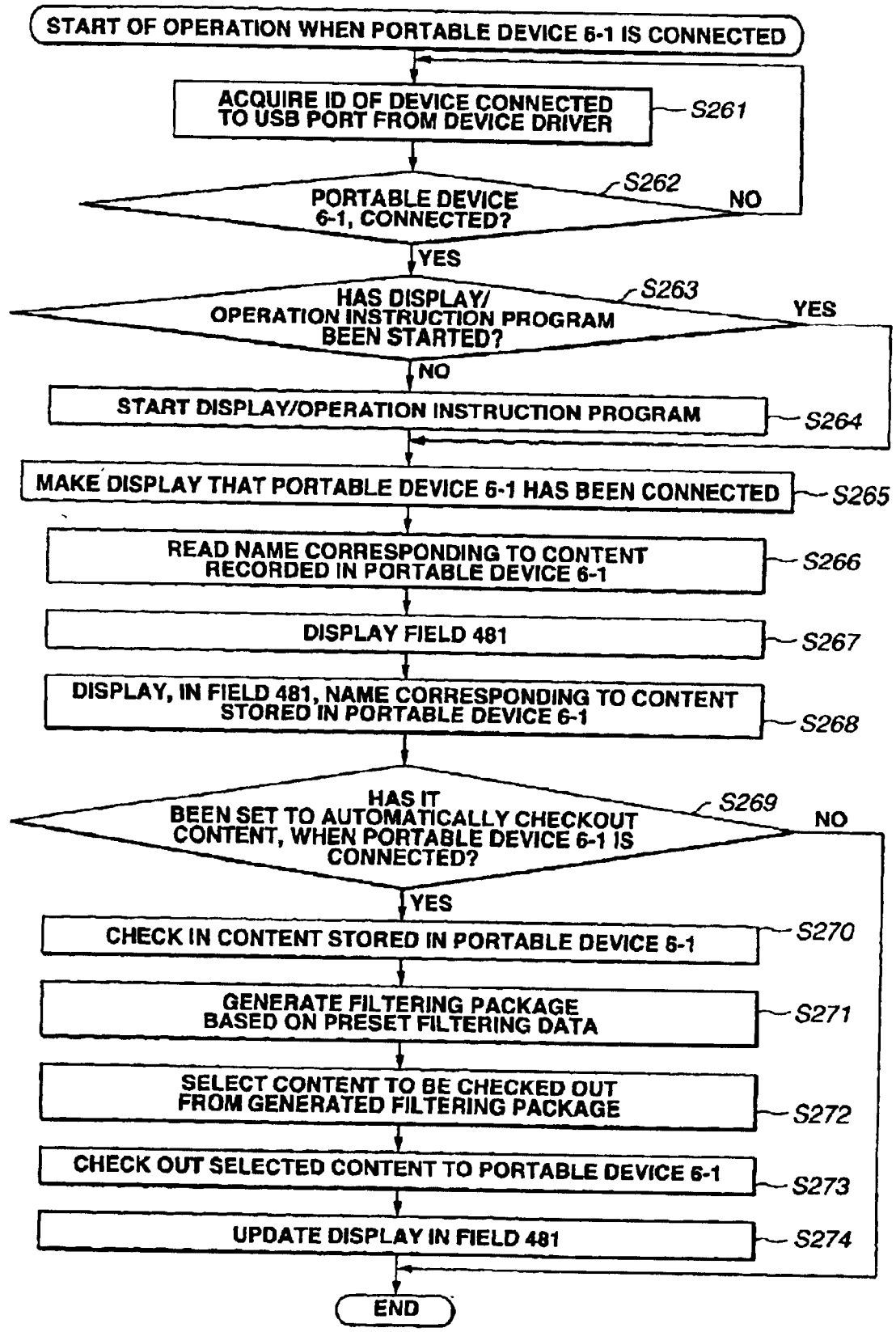
FIG. 57 is a flow chart of the operations effected when a portable device is connected to the information processor.

Next, how the personal computer 1 operates when the portable device 6-1 is connected to the USB port 23-1 will be described with reference to the flow chart shown in FIG. 57. At step S261, when a starter program 117 is informed from the operating system of the personal computer 1-1 of the connection of a device to the USB port 23-1, it acquires a device ID for the device connected to the USB port 23-1 from the driver 116-1.

At step S262, the starter program 117 judges whether the portable device 6-1 is connected. If it is determined that the portable device is not connected, the starter program 117 returns to step S261 and repeatedly judges whether the portable device 6-1 is connected until the portable device 6-1 is connected.

If it is determined, at step S262, that the portable device 6-1 is connected, the starter program 117 goes to step S263 where it will judge whether the display/operation instruction program 112 has been started. If it is determined, at step S263, that the display/operation instruction program 112 has not been started, the starter program 117 goes to step S264 where it will start the display/operation instruction program 112 and go to step S265.

If it is determined, at step S263, that the display/operation instruction program 112 has been started, it is not necessary to start the display/operation instruction program 112 and so the starter program 117 will skip over step S264 to step S265.

At step S265, the display/operation instruction program 112 displays a predetermined dialog box to indicate that the portable device 6-1 is connected.

At step S266, the display/operation instruction program 112 has the content management program 111 read a name corresponding to a content stored in the portable device 6-1. At step S267, the display/operation instruction program 112 displays a field 481 in a window displayed thereby. At step S268, the display/operation instruction program 112 displays a name corresponding to a content stored in the portable device 6-1.

At step S269, the display/operation instruction program 112 judges whether it has been set to automatically check out a content to the portable device 6-1 when the latter is connected to the display/operation instruction program 112. If it is determined that it has been set to automatically check out a content to the portable device 6-1 when the latter is connected, the display/operation instruction program 112 goes to step S270 where it will check in a content stored in the portable device 6-1. Contents which can thus be checked in are limited to those having been checked out from the personal computer 1-1.

At step S271, the display/operation instruction program 112 generates a filtering package based on preset filtering data 551 stored in the filtering data file 181. At step S272, the display/operation instruction program 112 selects contents to be checked out from the generated filtering package, for example, the first ten packages.

At step S273, the display/operation instruction program 112 checks out the selected contents to the portable device 6-1. At step S274, the display/operation instruction program 112 updates the display of the field 481 correspondingly to the checkout of the contents, and ends the operation.

If it is determined, at step S269, that it has not been set to automatically check out contents to the portable device 6-1 when the latter is connected, the display/operation instruction program 112 skips over steps 270 to 274 and ends the operation since no checkout operation is required.

As in the above, when the portable device 6-1 is connected, the personal computer 1-1 can run the display/operation instruction program 112 to display names corresponding to contents stored in the portable device 6-1. Therefore, no operation is required to start the display/operation instruction program 112 and the user can quickly check out a desired content to the portable device 6-1.

If when the portable device 6-1 is connected, it has been set to automatically check out a content when the portable device 6-1 is connected to the display/operation instruction program 112, the personal computer 1-1 checks in contents stored in the portable device 6-1 while checking out a predetermined content.

Also, when the portable device 6-3 is connected to the personal computer 1-1, a similar operation to the above is effected and it will not be described any more.

It has been described in the foregoing that the display/operation instruction program 112 judges at step S269 whether it has been set to automatically check out a content when the portable device 6-1 is connected to the display/operation instruction program 112. Note however that it may be set to automatically check out a content to the portable device 6-1 when the latter is connected and the display/operation instruction program 112 may judge based on this setting whether it has been set to automatically check out a content when the portable device 6-1 is connected to the display/operation instruction program 112.

In this case, the portable device 6-1 stores at a predetermined address in an internal memory thereof a flag indicative of whether a content is automatically checked out. When the portable device 6-1 is connected, the display/operation instruction program 112 reads the flag indicative of whether a content is automatically checked out and stored at the predetermined address in the internal memory of the portable device 6-1, and judge based on the flag whether it has been set to automatically check out a content.

Further, in case the internal memory of the portable device 6-1 is removable, a flag indicative of whether a content is automatically checked out may be stored at a predetermined address in the removable memory.

Also it has been described in the above that at step S271, the display/operation instruction program 112 generates a filtering package based on the preset filtering data 551 stored in the filtering data file 181. However, the portable device 6-1 may store the filtering data 551 and the display/operation instruction program 112 may generate a filtering packaging based on the filtering data 551 stored in the portable device 6-1.

In this case, for example the portable device 6-1 stores the filtering data 551 at a predetermined address in the internal memory thereof. When the portable device 6-1 is connected, the display/operation instruction program 112 reads the filtering data 551 stored at the predetermined address in the internal memory of the portable device 6-1 and generates a filtering package based on the filtering data 551.

Further, in case the internal memory of the portable device 6-1 is removable, the filtering data 551 may be stored at a predetermined address of the removable memory.

Also, the display/operation instruction program 112 may select a content at random, not based on the filtering data 551, and check out the selected content to the content management program 111.

Note that according to a setting made by the user, the display/operation instruction program 112 may display, in the field 348, an image indicating the level of a sound currently being outputted when a content has been played back.

Also, it should be noted that although it has previously been described that the content compression method adopted by the personal computer 1 is ATRAC3 by way of example, the method is not limited to ATRAC3 but may be any of MP3 (Moving Picture Experts Group 2 Audio Layer 3), TwinQV (trademark), AAC (MPEG2 Advance Audio Coding), etc.

Note that although it has previously been described that the content encryption method adopted by the personal computer I is DES for example, the method is not limited to DES but may be any of IDEA (International Data Encryption Algorithm), RAS which is a public key encryption method, elliptical encryption, etc.

Also, the content management program 111 may be executed on a hardware provided independently inside the personal computer 1 and which cannot read directly the content management program 111, for example. Also, the hardware to execute the content management program 111 may be designed to have a tamping resistance.

The aforementioned series of operations may be executable by a hardware, but it may be executable by a software. In case the series of operations is to be executed by a software, programs composing the software is installed, from a program storage medium, into a computer incorporated in a dedicated hardware or a general-purpose personal computer, for example, whose various functions can be performed with a variety of programs installed therein.

Figure 2:
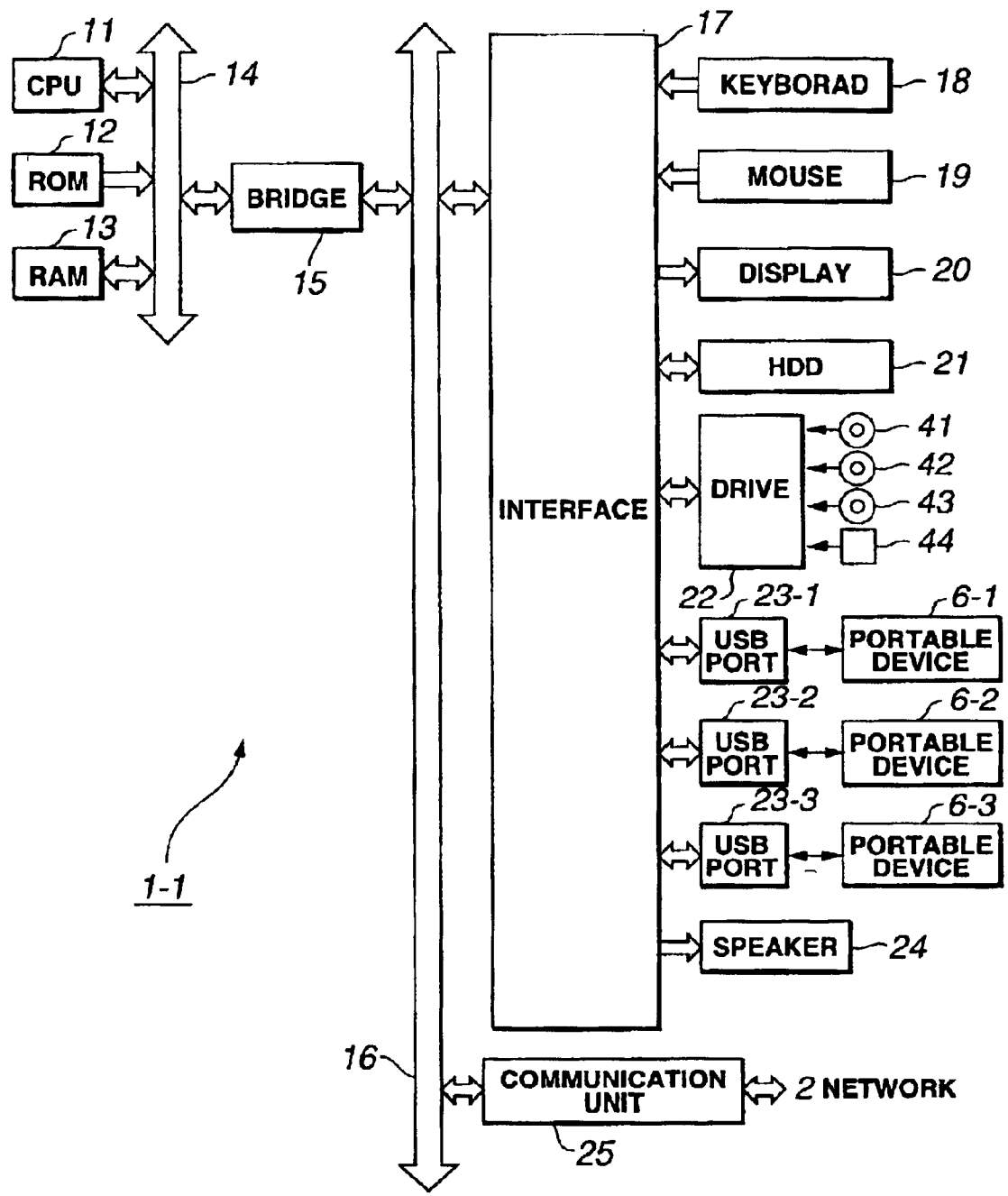
FIG. 2 shows the architecture of a personal computer used in the music data management system in FIG. 1.

The program storage medium to store programs installed in a computer and executable by the computer may be formed from the magnetic disc 41 or 91 (including floppy disc), optical disc 42 or 92 (including CD-ROM (compact disc read-only memory), DVD (digital versatile disc)), magneto-optical disc 43 or 93 (including MD (mini disc)), package medium such as semiconductor memory 44 or 94, ROM 12 or 62 in which the programs will be stored provisionally or permanently, or HDD 21 or 71, as shown in FIGS. 2 and 3. The programs are stored into the program storage medium via an interface such as communications unit 25 or 73 using a cable or radio communications medium such as network 2 including a local area network or Internet, or digital satellite broadcasting.

Note that the steps of operation concerning a program stored in the program storage medium, described herein, include operations which are effected time-serially in the described sequence as well as operations not effected time-serially but in parallel or individually.

Also note that the "system" referred to herein covers an entire assembly of a plurality of apparatuses.

INDUSTRIAL APPLICABILITY

According to the present invention having been described in the foregoing, since a predetermined number of types of data about sound contents is recorded and other types of data about the contents than the above types of data are recorded as data which increase the types of data, it is possible to record a variety of data about contents flexibly and quickly.

What is claimed is:

1. An information processor comprising:
   a first recording means for recording a predetermined number of types of data related to a first content as a first main data group, and the first recording means recording a predetermined number of types of data related to a second content as a second main data group;
   a second recording means for recording data of types related to the first content but not in the first main data group as a sub data group, and the second recording means recording data of types related to the second content but not in the second main data group as the sub data group;
   means for determining, when reading data about a content, whether a type of data to be read is that of data recorded in either the main data group or the sub data group; and
   means for searching for data from a plurality of main data groups or sub data groups based on the result of the data type determination.

2. The apparatus according to claim 1, wherein the second recording means records a usage rule for the first and second contents as a particular type of data.

3. The apparatus according to claim 1, wherein the second recording means records, as a particular type of data, data used to control a device using the first and second contents.

4. An information processing method comprising:
   recording a predetermined number of types of data related to a first content as a first main data group;
   recording a predetermined number of types of data related to a second content as a second main data group;
   recording data of types related to the first content but not in the first main data group as a sub data group;
   recording data of types related to the second content but not in the second main data group as the sub data group;
   determining whether a type of data to be read is that of data recorded in either the main data group or the sub data group, when reading data about a content; and
   searching for data from a plurality of main data groups or sub data groups based on the result of the data type determination.

5. A program storage medium having stored therein computer-readable program for use in an information processing apparatus and method, the program comprising:

recording a predetermined number of types of data related to a first content as a first main data group;

recording a predetermined number of types of data related to a second content as a second main data group;

recording data of types related to the first content but not in the first main data group as a sub data group;

recording data of types related to the second content but not in the second main data group as the sub data group;

determining whether a type of data to be read is that of data recorded in either the main data group or the sub data group; and searching for data from a plurality of main data groups or sub data groups based on the result of the data type determination.

6. An information processor, comprising:

at least first and second recording means for recording a predetermined number of types of data related to at least first and second contents, the first recording means enabling recording of said predetermined number of types of data related to the first content as a first main data group, and the second content as a second main data group, the second recording means enabling recording of said predetermined number of types of data related to said at least first and second contents not in the first and second main data groups as a sub data group without changing the configuration of the first and second main data group; and means for determining, when reading data about a content, whether the type of data to be read is that of data recorded in either the first and second main data group or the sub data group.

7. The information processor of claim 6, further comprising means for searching for data from a plurality of main data groups or sub data groups based on the result of the data type determination.

8. An information processing method, comprising:

recording a predetermined number of types of data related to a first content as a first main data group, and a second content as a second main data group;

recording a predetermined number of types of data related to at least first an second contents not in the first and second main data groups as a sub data group without changing the configuration of the first and second main data group; and determining, when reading data about a content, whether the type of data to read is that of data recorded in either the first and second main data group or the sub data group.

9. The information processing method of claim 8, further comprising searching for data from a plurality of main data groups or sub data groups based on the result of the data type determination.

* * * * *